United States Patent
Rapaport et al.

(10) Patent No.: US 11,816,743 B1
(45) Date of Patent: Nov. 14, 2023

(54) INFORMATION ENHANCING METHOD USING SOFTWARE AGENTS IN A SOCIAL NETWORKING SYSTEM

(71) Applicant: Jeffrey Alan Rapaport, Ho Chi Minh (VN)

(72) Inventors: Jeffrey Alan Rapaport, Ho Chi Minh (VN); Seymour Rapaport, Los Altos, CA (US); Kenneth Allen Smith, Fremont, CA (US); James Beattie, San Ramon, CA (US); Gideon Gimlan, Los Gatos, CA (US)

(*) Notice: Subject to any disclaimer, the term of this patent is extended or adjusted under 35 U.S.C. 154(b) by 7 days.

(21) Appl. No.: 17/985,881

(22) Filed: Nov. 13, 2022

Related U.S. Application Data

(63) Continuation of application No. 12/854,082, filed on Aug. 10, 2010, now abandoned.

(51) Int. Cl.
| | | |
|---|---|---|
| *G06F 3/14* | (2006.01) | |
| *G06Q 30/06* | (2023.01) | |
| *G06Q 50/00* | (2012.01) | |
| *G06Q 30/02* | (2023.01) | |

(52) U.S. Cl.
CPC .............. *G06Q 50/01* (2013.01); *G06Q 30/02* (2013.01)

(58) Field of Classification Search
CPC .................................................... G06Q 50/01
USPC ....... 715/753; 705/7.29, 26.1, 400; 709/204; 707/E17.05
See application file for complete search history.

(56) References Cited

U.S. PATENT DOCUMENTS

| | | |
|---|---|---|
| 1,996,516 A | 4/1935 | Kinkead |
| 2,870,026 A | 1/1959 | Keller |
| 3,180,760 A | 4/1965 | Rauter |
| 3,676,937 A | 7/1972 | Janson |
| 3,749,870 A | 7/1973 | Oakes |
| 5,047,363 A | 9/1991 | Hickernell |
| 5,337,233 A | 8/1994 | Hofert |
| 5,659,742 A | 8/1997 | Beattie |
| 5,754,939 A | 5/1998 | Herz et al. |
| 5,793,365 A | 8/1998 | Tang et al. |
| 5,828,839 A | 10/1998 | Moncreiff |
| 5,848,396 A | 12/1998 | Gerace |

(Continued)

FOREIGN PATENT DOCUMENTS

| | | |
|---|---|---|
| CN | 102004999 A | 4/2011 |
| EP | 1736902 A1 | 12/2006 |

(Continued)

OTHER PUBLICATIONS

PCT International Preliminary Report on Patentability, PCT US2010/023731, dated Aug. 16, 2011.

(Continued)

*Primary Examiner* — Ruay Ho

(57) ABSTRACT

An information enhancing method for use with a social networking system using a plurality of machine systems comprising: causing a software agent that is structured to be able to search for new content data to add to the social networking system which is organized by topics; measuring current focus and implicit vote values of the users to detect type of user interaction; in response to the current focus and implicit vote value measurements, automatically repeating updates to content data and trending data corresponding to the topics; and determine what to present to the users.

2 Claims, 11 Drawing Sheets

(56) References Cited

U.S. PATENT DOCUMENTS

| | | |
|---|---|---|
| 5,873,076 A | 2/1999 | Barr |
| 5,890,152 A | 3/1999 | Rapaport et al. |
| 5,930,474 A | 7/1999 | Dunworth et al. |
| 5,950,200 A | 9/1999 | Sudai et al. |
| 5,961,332 A | 10/1999 | Joao |
| 6,041,311 A | 3/2000 | Chisienko |
| 6,047,363 A | 4/2000 | Lewchuk |
| 6,061,716 A | 5/2000 | Moncrieff |
| 6,064,971 A | 5/2000 | Hartnett |
| 6,081,830 A | 6/2000 | Schindler |
| 6,154,213 A | 11/2000 | Rennison |
| 6,180,760 B1 | 1/2001 | Takai et al. |
| 6,229,542 B1 | 5/2001 | Miller |
| 6,256,633 B1 | 7/2001 | Dharap |
| 6,272,467 B1 | 8/2001 | Durand et al. |
| 6,425,012 B1 | 7/2002 | Trovato et al. |
| 6,442,450 B1 | 8/2002 | Inoue |
| 6,446,113 B1 | 9/2002 | Ozzie et al. |
| 6,480,885 B1 | 11/2002 | Olivier |
| 6,496,851 B1 | 12/2002 | Morris |
| 6,577,329 B1 | 6/2003 | Flickner et al. |
| 6,611,881 B1 | 8/2003 | Gottfurcht |
| 6,618,593 B1 | 9/2003 | Drutman et al. |
| 6,633,852 B1 | 10/2003 | Heckerman |
| 6,651,086 B1 | 11/2003 | Manber et al. |
| 6,745,178 B1 | 6/2004 | Emens et al. |
| 6,757,682 B1 | 6/2004 | Naimark et al. |
| 6,766,374 B2 | 7/2004 | Trovato et al. |
| 6,873,314 B1 | 3/2005 | Campbell |
| 6,879,994 B1 | 4/2005 | Matsliach et al. |
| 6,978,292 B1 | 12/2005 | Murakami et al. |
| 6,981,021 B2 | 12/2005 | Takakura et al. |
| 6,981,040 B1 | 12/2005 | Konig |
| 7,034,691 B1 | 4/2006 | Rapaport |
| 7,219,303 B2 | 5/2007 | Fish |
| 7,386,796 B1 | 6/2008 | Simpson et al. |
| 7,394,388 B1 | 7/2008 | Light et al. |
| 7,395,507 B2 | 7/2008 | Robarts et al. |
| 7,401,098 B2 | 7/2008 | Baker |
| 7,424,541 B2 | 9/2008 | Bourne |
| 7,430,315 B2 | 9/2008 | Yang et al. |
| 7,472,352 B2 | 12/2008 | Liversidge et al. |
| 7,610,287 B1 | 10/2009 | Dean et al. |
| 7,630,986 B1 | 12/2009 | Herz et al. |
| 7,640,304 B1 | 12/2009 | Goldscheider |
| 7,647,098 B2 | 1/2010 | Prichep |
| 7,720,784 B1 | 5/2010 | Froloff |
| 7,730,030 B1 | 6/2010 | Xu |
| 7,788,260 B2 | 8/2010 | Lunt et al. |
| 7,848,960 B2 | 12/2010 | Rampeli et al. |
| 7,853,881 B1 | 12/2010 | Aly Assal et al. |
| 7,860,928 B1 | 12/2010 | Anderson |
| 7,865,553 B1 | 1/2011 | Anderson |
| 7,870,026 B2 | 1/2011 | Krishnan et al. |
| 7,878,390 B1 | 2/2011 | Batten |
| 7,881,315 B2 | 2/2011 | Haveson et al. |
| 7,899,915 B2 | 3/2011 | Reisman |
| 7,904,500 B1 | 3/2011 | Anderson |
| 7,945,861 B1 | 5/2011 | Karam |
| 7,966,565 B2 | 6/2011 | Dawson et al. |
| 8,024,328 B2 | 9/2011 | Dolin et al. |
| 8,150,868 B2 | 4/2012 | Richardson et al. |
| 8,180,760 B1 | 5/2012 | Carver |
| 8,249,898 B2 | 8/2012 | Schoenberg |
| 8,274,377 B2 | 9/2012 | Smith et al. |
| 8,380,902 B2 | 2/2013 | Howard |
| 8,484,191 B2 | 7/2013 | Maghoul |
| 8,676,937 B2 | 3/2014 | Rapaport |
| 8,732,605 B1 | 5/2014 | Falaki |
| 8,743,708 B1 | 6/2014 | Robertson |
| 8,843,835 B1 | 9/2014 | Busey et al. |
| 8,874,477 B2 | 10/2014 | Hoffberg |
| 8,949,250 B1 | 2/2015 | Garg |
| 9,015,093 B1 | 4/2015 | Commons |
| 9,135,663 B1 | 9/2015 | Heiferman |
| 9,183,285 B1 | 11/2015 | Brown |
| 9,749,870 B2 | 8/2017 | Kadel |
| 2001/0053694 A1 | 12/2001 | Igarashi |
| 2002/0072955 A1 | 6/2002 | Brock |
| 2003/0037110 A1 | 2/2003 | Yamamoto |
| 2003/0052911 A1 | 3/2003 | Cohen-Solal |
| 2003/0055897 A1 | 3/2003 | Brown et al. |
| 2003/0069900 A1 | 4/2003 | Hind |
| 2003/0076352 A1 | 4/2003 | Uhlig |
| 2003/0078972 A1 | 4/2003 | Tapissier |
| 2003/0092428 A1 | 5/2003 | Awada |
| 2003/0154186 A1 | 8/2003 | Goodwin |
| 2003/0160815 A1 | 8/2003 | Muschetto |
| 2003/0195928 A1 | 10/2003 | Kamijo et al. |
| 2003/0225833 A1 | 12/2003 | Pilat et al. |
| 2003/0234952 A1 | 12/2003 | Dawson et al. |
| 2004/0075677 A1 | 4/2004 | Loyall |
| 2004/0076936 A1 | 4/2004 | Horvitz |
| 2004/0078432 A1 | 4/2004 | Manber et al. |
| 2004/0174971 A1 | 9/2004 | Guan |
| 2004/0205651 A1 | 10/2004 | Dutta et al. |
| 2004/0228531 A1 | 11/2004 | Fernandez et al. |
| 2005/0004923 A1 | 1/2005 | Park |
| 2005/0054381 A1 | 3/2005 | Lee |
| 2005/0086610 A1 | 4/2005 | MacKinlay et al. |
| 2005/0149459 A1 | 7/2005 | Kofman et al. |
| 2005/0154693 A1 | 7/2005 | Ebert |
| 2005/0246165 A1 | 11/2005 | Pettinelli |
| 2005/0259035 A1 | 11/2005 | Iwaki et al. |
| 2006/0020662 A1 | 1/2006 | Robinson |
| 2006/0026111 A1 | 2/2006 | Athelogou |
| 2006/0026152 A1 | 2/2006 | Zeng |
| 2006/0080613 A1 | 4/2006 | Savant |
| 2006/0093998 A1 | 7/2006 | Vertegaal |
| 2006/0156326 A1 | 7/2006 | Goronzy et al. |
| 2006/0161457 A1 | 7/2006 | Rapaport |
| 2006/0176831 A1 | 8/2006 | Greenberg et al. |
| 2006/0184566 A1 | 8/2006 | Lo |
| 2006/0213976 A1 | 9/2006 | Inakoshi et al. |
| 2006/0224593 A1 | 10/2006 | Benton et al. |
| 2006/0270419 A1 | 11/2006 | Crowley |
| 2007/0005425 A1 | 1/2007 | Bennett |
| 2007/0013652 A1 | 1/2007 | Kim |
| 2007/0016585 A1 | 1/2007 | Nickell et al. |
| 2007/0036292 A1 | 2/2007 | Selbie et al. |
| 2007/0094601 A1 | 4/2007 | Greenberg |
| 2007/0100938 A1 | 5/2007 | Bagley et al. |
| 2007/0112719 A1 | 5/2007 | Reich |
| 2007/0113181 A1 | 5/2007 | Blattner |
| 2007/0149214 A1 | 6/2007 | Walsh |
| 2007/0150281 A1 | 6/2007 | Hoff |
| 2007/0150916 A1 | 6/2007 | Begole et al. |
| 2007/0168446 A1 | 7/2007 | Keohane et al. |
| 2007/0168448 A1 | 7/2007 | Garbow et al. |
| 2007/0168863 A1 | 7/2007 | Blattner |
| 2007/0171716 A1 | 7/2007 | Wright |
| 2007/0214077 A1 | 9/2007 | Barnes |
| 2007/0239566 A1 | 10/2007 | Dunnaboo et al. |
| 2007/0265507 A1 | 11/2007 | de Lemos |
| 2007/0273558 A1* | 11/2007 | Smith .................. G08G 1/0962 340/995.1 |
| 2007/0282724 A1 | 12/2007 | Barnes |
| 2008/0005252 A1 | 1/2008 | Della Pasqua |
| 2008/0034040 A1* | 2/2008 | Wherry ................ G06Q 10/107 709/204 |
| 2008/0034309 A1 | 2/2008 | Louch et al. |
| 2008/0040474 A1 | 2/2008 | Zuckerberg |
| 2008/0052742 A1 | 2/2008 | Kopf et al. |
| 2008/0065468 A1 | 3/2008 | Berg et al. |
| 2008/0082548 A1 | 4/2008 | Betts |
| 2008/0091512 A1 | 4/2008 | Marci et al. |
| 2008/0097235 A1 | 4/2008 | Ofek et al. |
| 2008/0114737 A1 | 5/2008 | Neely et al. |
| 2008/0114755 A1 | 5/2008 | Wolters et al. |
| 2008/0133664 A1 | 6/2008 | Lentz |
| 2008/0154883 A1 | 6/2008 | Chowdhury |
| 2008/0168376 A1 | 7/2008 | Tien |
| 2008/0183750 A1 | 7/2008 | Lee |
| 2008/0189367 A1 | 8/2008 | Okumura |

(56) References Cited

U.S. PATENT DOCUMENTS

| | | |
|---|---|---|
| 2008/0209343 A1 | 8/2008 | Macadam et al. |
| 2008/0209350 A1 | 8/2008 | Sobotka et al. |
| 2008/0222295 A1 | 9/2008 | Robinson |
| 2008/0234976 A1 | 9/2008 | Wittkowski |
| 2008/0262364 A1 | 10/2008 | Aarts |
| 2008/0266118 A1 | 10/2008 | Pierson et al. |
| 2008/0281783 A1 | 11/2008 | Papkoff et al. |
| 2008/0288437 A1 | 11/2008 | Siregar |
| 2008/0313108 A1 | 12/2008 | Carrabis |
| 2008/0319827 A1* | 12/2008 | Yee ................. G06Q 30/02 705/7.29 |
| 2008/0320082 A1 | 12/2008 | Kuhike et al. |
| 2009/0037443 A1* | 2/2009 | Athale ............. G06F 16/2246 707/E17.05 |
| 2009/0077064 A1 | 3/2009 | Daigle |
| 2009/0089678 A1 | 4/2009 | Sacco et al. |
| 2009/0094088 A1 | 4/2009 | Chen |
| 2009/0100469 A1 | 4/2009 | Conradt et al. |
| 2009/0112696 A1 | 4/2009 | Jung et al. |
| 2009/0112713 A1 | 4/2009 | Jung et al. |
| 2009/0119173 A1 | 5/2009 | Parsons et al. |
| 2009/0119584 A1 | 5/2009 | Herbst |
| 2009/0164916 A1 | 6/2009 | Jeong |
| 2009/0179983 A1 | 7/2009 | Schindler |
| 2009/0204714 A1 | 8/2009 | Ferrara |
| 2009/0215469 A1 | 8/2009 | Fisher |
| 2009/0216773 A1* | 8/2009 | Konopnicki ........ G06F 16/9535 |
| 2009/0233623 A1 | 9/2009 | Johnson |
| 2009/0234727 A1 | 9/2009 | Petty |
| 2009/0234876 A1 | 9/2009 | Schigel et al. |
| 2009/0249244 A1 | 10/2009 | Robinson et al. |
| 2009/0254662 A1 | 10/2009 | Lee |
| 2009/0260060 A1 | 10/2009 | Smith et al. |
| 2009/0276705 A1 | 11/2009 | Ozdemir |
| 2009/0288012 A1 | 11/2009 | Hertel et al. |
| 2009/0325615 A1 | 12/2009 | McKay |
| 2009/0327417 A1 | 12/2009 | Chakra et al. |
| 2010/0030734 A1 | 2/2010 | Chunilal |
| 2010/0037277 A1 | 2/2010 | Flynn-Ripley et al. |
| 2010/0057857 A1 | 3/2010 | Szeto |
| 2010/0058183 A1 | 3/2010 | Hamilton, II |
| 2010/0063993 A1 | 3/2010 | Higgins |
| 2010/0070448 A1 | 3/2010 | Omoigui |
| 2010/0070758 A1 | 3/2010 | Low et al. |
| 2010/0070875 A1 | 3/2010 | Turski |
| 2010/0073133 A1 | 3/2010 | Conreux |
| 2010/0094797 A1 | 4/2010 | Monteverde |
| 2010/0114684 A1 | 5/2010 | Neged |
| 2010/0138452 A1 | 6/2010 | Henkin |
| 2010/0153453 A1 | 6/2010 | Knowles |
| 2010/0159909 A1 | 6/2010 | Stifelman |
| 2010/0164956 A1 | 7/2010 | Hyndman et al. |
| 2010/0169766 A1 | 7/2010 | Duarte et al. |
| 2010/0180217 A1 | 7/2010 | Li |
| 2010/0191727 A1 | 7/2010 | Malik |
| 2010/0191741 A1 | 7/2010 | Stefik |
| 2010/0191742 A1 | 7/2010 | Stefik |
| 2010/0198633 A1 | 8/2010 | Guy et al. |
| 2010/0205541 A1 | 8/2010 | Rapaport |
| 2010/0217757 A1* | 8/2010 | Fujioka ............. G06F 16/9535 705/26.1 |
| 2010/0223157 A1 | 9/2010 | Kalsi |
| 2010/0250497 A1 | 9/2010 | Redlich |
| 2010/0293104 A1 | 11/2010 | Olsson et al. |
| 2011/0016121 A1 | 1/2011 | Sambrani |
| 2011/0029898 A1 | 2/2011 | Malik |
| 2011/0040155 A1 | 2/2011 | Guzak |
| 2011/0041153 A1 | 2/2011 | Simon |
| 2011/0047119 A1 | 2/2011 | Kaplan |
| 2011/0047487 A1 | 2/2011 | DeWeese et al. |
| 2011/0055017 A1 | 3/2011 | Solomon et al. |
| 2011/0055734 A1 | 3/2011 | Borst et al. |
| 2011/0055735 A1 | 3/2011 | Wood et al. |
| 2011/0070758 A1 | 3/2011 | Low et al. |
| 2011/0082907 A1 | 4/2011 | Anderson |
| 2011/0087540 A1 | 4/2011 | Krishnan et al. |
| 2011/0087735 A1 | 4/2011 | Anderson |
| 2011/0125661 A1 | 5/2011 | Hull et al. |
| 2011/0137690 A1 | 6/2011 | Louch et al. |
| 2011/0137921 A1 | 6/2011 | Inagaki |
| 2011/0137951 A1 | 6/2011 | Baker |
| 2011/0142016 A1 | 6/2011 | Chatterjee |
| 2011/0145570 A1 | 6/2011 | Gressel et al. |
| 2011/0153761 A1 | 6/2011 | Anderson |
| 2011/0154224 A1 | 6/2011 | Bates et al. |
| 2011/0161164 A1 | 6/2011 | Anderson |
| 2011/0161177 A1 | 6/2011 | Anderson |
| 2011/0179125 A1 | 7/2011 | Lee et al. |
| 2011/0184886 A1* | 7/2011 | Shoham ............. G06Q 30/0283 705/400 |
| 2011/0185025 A1 | 7/2011 | Cherukuri et al. |
| 2011/0197123 A1 | 8/2011 | Caine et al. |
| 2011/0197146 A1 | 8/2011 | Goto et al. |
| 2011/0201423 A1 | 8/2011 | Borst et al. |
| 2011/0219015 A1 | 9/2011 | Kim |
| 2011/0246306 A1 | 10/2011 | Blackhurst |
| 2011/0246908 A1 | 10/2011 | Akram et al. |
| 2011/0246920 A1 | 10/2011 | Lebrun |
| 2011/0252121 A1 | 10/2011 | Borgs et al. |
| 2011/0270618 A1 | 11/2011 | Banerjee |
| 2011/0270830 A1 | 11/2011 | Stefik |
| 2012/0042263 A1 | 2/2012 | Rapaport et al. |
| 2012/0047447 A1 | 2/2012 | Haq |
| 2012/0079045 A1 | 3/2012 | Plotkin |
| 2012/0102130 A1 | 4/2012 | Guyot |
| 2012/0124486 A1 | 5/2012 | Robinson et al. |
| 2012/0158633 A1 | 6/2012 | Eder |
| 2012/0158715 A1 | 6/2012 | Maghoul et al. |
| 2012/0259240 A1 | 10/2012 | Llewellynn |
| 2012/0265528 A1 | 10/2012 | Gruber et al. |
| 2012/0323691 A1 | 12/2012 | McLaughlin |
| 2012/0323928 A1 | 12/2012 | Bhatia |
| 2013/0018685 A1 | 1/2013 | Parnaby |
| 2013/0041696 A1 | 2/2013 | Richard |
| 2013/0079149 A1 | 3/2013 | Fletcher |
| 2013/0086063 A1 | 4/2013 | Chen |
| 2013/0196685 A1 | 8/2013 | Griff |
| 2013/0275405 A1 | 10/2013 | Maghoul |
| 2013/0325755 A1 | 12/2013 | Arquette |
| 2014/0321839 A1 | 10/2014 | Armstrong |
| 2015/0026260 A1 | 1/2015 | Worthley |
| 2015/0066910 A1 | 3/2015 | Bleach |
| 2015/0121495 A1 | 4/2015 | Gao |

FOREIGN PATENT DOCUMENTS

| | | |
|---|---|---|
| JP | 200533337 A | 12/2005 |
| JP | 2007004807 A | 1/2007 |

OTHER PUBLICATIONS

Advance E-Mail. PCT Notification Transmittal of International Preliminary Report on Patentability, PCT US2010/023731, dated Aug. 25, 2011.

Joshua Schnell, Macgasm, http://www.macgasm.net/2011/06/09/apple-smartphones-smarter-patent/, Oct. 6, 2011.

PCT Search Report, PCT/US2010/023731, dated Jun. 4, 2010.

D. Bottazzi et al., "Context-Aware Middleware for Anytime, Anywhere Social Networks", IEEE Computer Society, pp. 23-32 (2007).

Miluzzo et al., "Sensing Meets Mobile Social Networks: the Design, Implement. and Evaluat. of the CenceMe Appl.", ACM, Nov. 2008, p. 337.

Mark-Shane Scale."Facebook as a Social Search Engine and the Implications for Libraries in the 21st Century". (Nov. 2008), https://www.researchgate.net/publication/235322898.

* cited by examiner

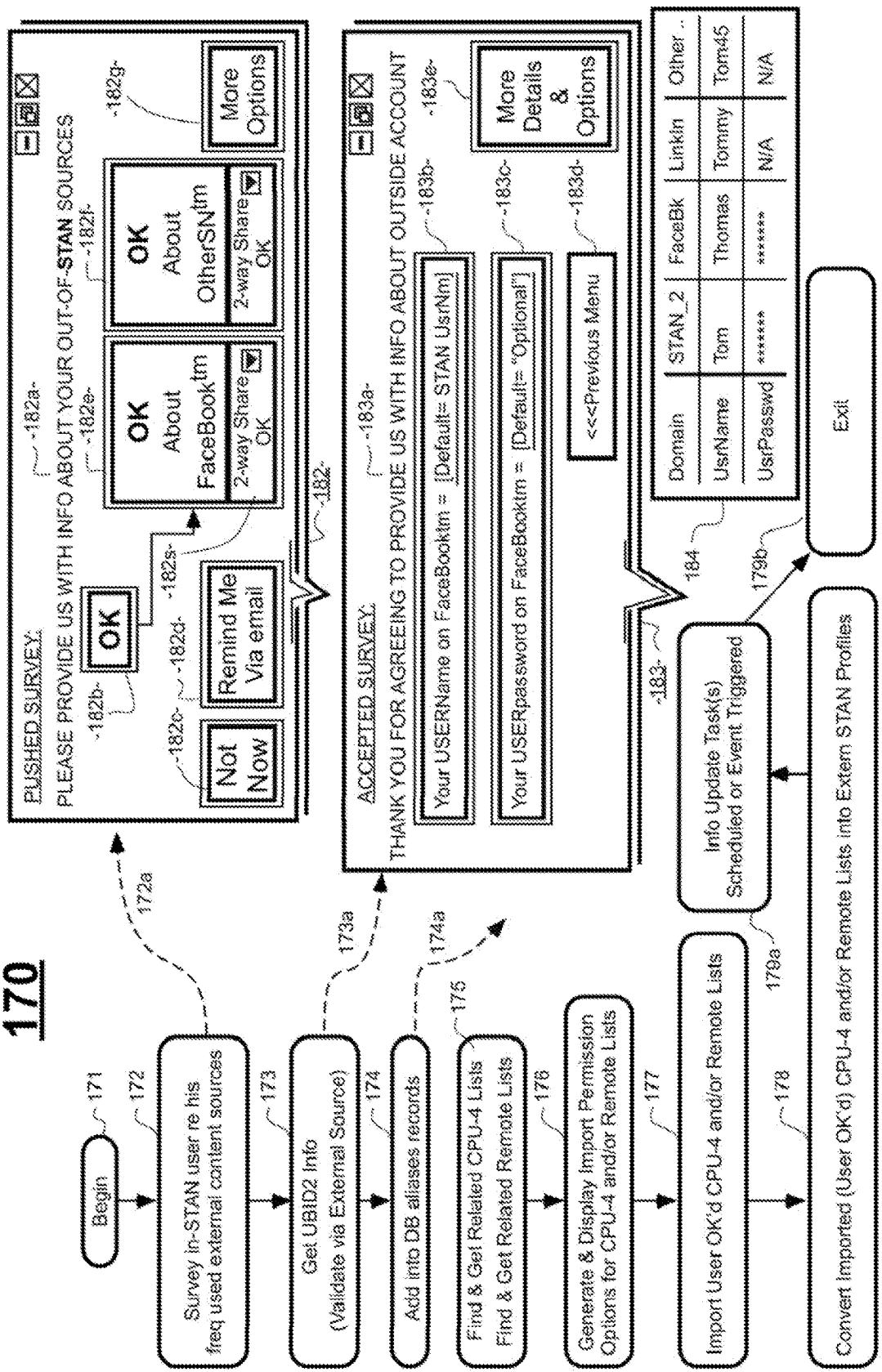

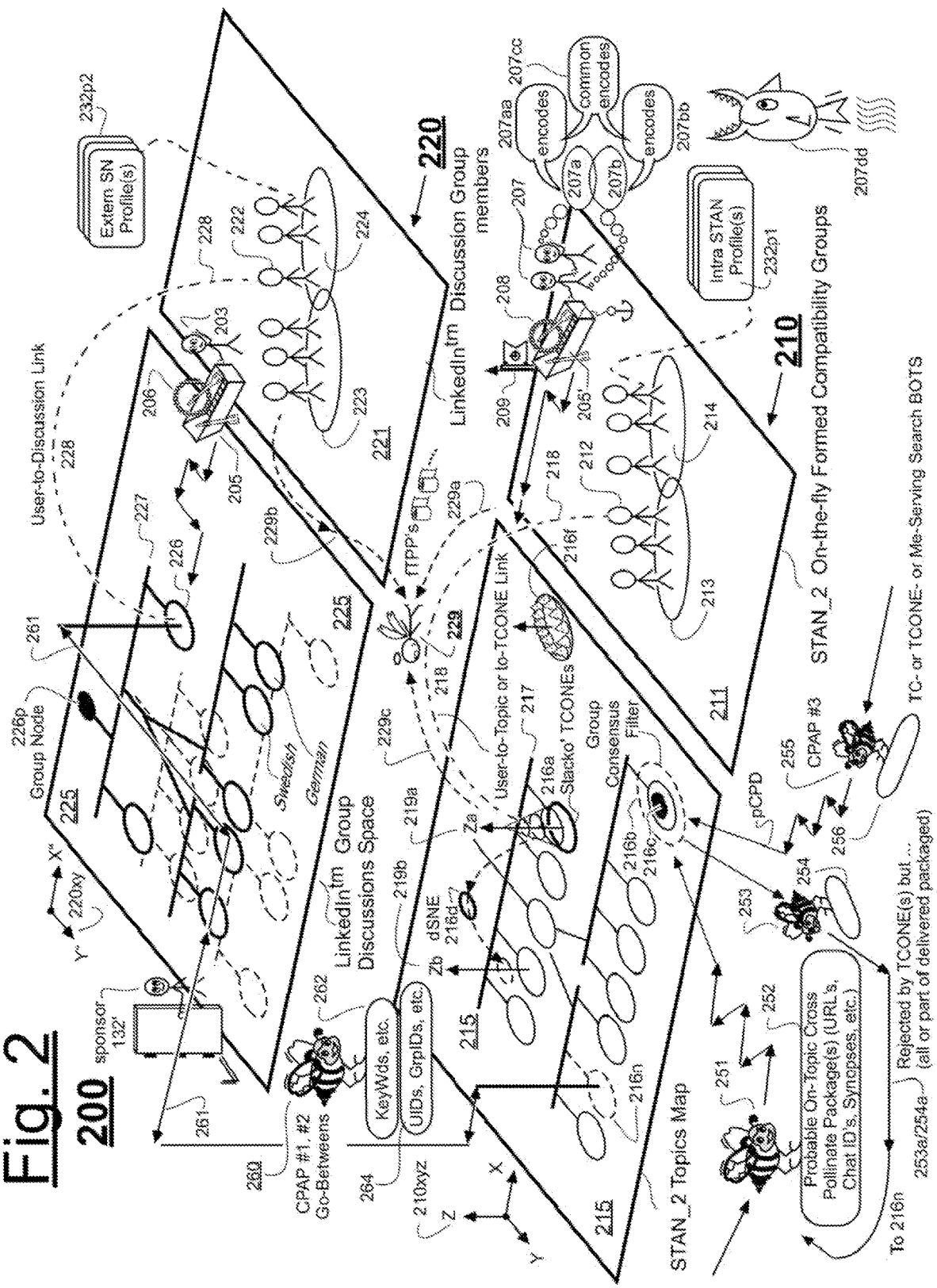

Fig. 4C

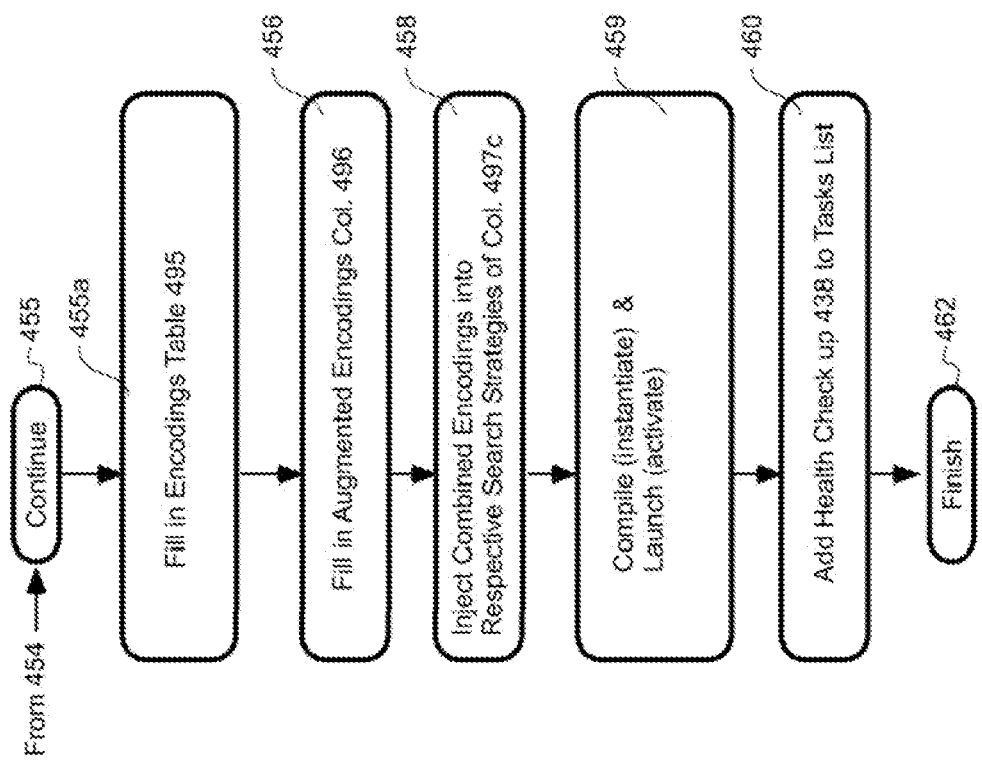

INFORMATION ENHANCING METHOD USING SOFTWARE AGENTS IN A SOCIAL NETWORKING SYSTEM

CROSS REFERENCE TO RELATED APPLICATIONS

This application is a Continuation of U.S. patent application Ser. No. 12/854,082, filed Aug. 10, 2010.

CROSS REFERENCE TO CO-OWNED APPLICATION

The following copending U.S. patent application is owned by the owner of the present application, and its disclosure is incorporated herein by reference in its entirety as originally filed:

(A) Ser. No. 12/369,274 filed Feb. 11, 2009 by Jeffrey A. Rapaport et al. and which is originally entitled, Social Network Driven Indexing System for Instantly Clustering People with Concurrent Focus on Same Topic into On Topic Chat Rooms and/or for Generating On-topic Search Results Tailored to User Preferences Regarding Topic.

CROSS REFERENCE TO PATENTS/PUBLICATIONS

The disclosures of the following U.S. patents or Published U.S. patent applications are incorporated herein by reference:

(A) U.S. Pat. App. 2008/0,065,468 A1, published Mar. 13, 2008 on behalf of Berg; Charles John; et al. and entitled "Methods for Measuring Emotive Response and Selection Preference".

FIELD OF DISCLOSURE

The present disclosure of invention relates generally to online networking systems and uses thereof. The disclosure relates more specifically to social networking (SN) systems and in particular to cases where one or more social-topical networking (STN) systems are cooperatively coupled to other kinds of online networking and/or content providing systems.

Definitions

As used herein, the terms "software", "software agent", "BOT", "virtual BOT", "virtual agent", and the like do not mean a purely nonphysical abstraction. Claims appended hereto which use terms such as "software", "software agent", "BOT", "virtual BOT", "virtual agent", and the like do not preclude others from thinking about, speaking about or similarly non-usefully using abstract ideas, laws of nature or naturally occurring phenomenon. When in an active (e.g., an executing) mode, a "software" entity, be it a BOT, a spyware program or the alike is understood to be a physical ongoing process being carried out in one or more real physical machines where the machine(s) entropically consume(s) electrical power and/or other forms of real energy per unit time as a consequence of said physical ongoing process being carried out there within. When in a static (e.g., non-executing) mode, an instantiated "software" entity, be it an instantiated BOT, instantiated spyware program or the alike is understood to be embodied as a substantially unique and functionally operative pattern of transformed physical matter preserved in a more than elusively transitory manner in one or more physical memory devices so that it can functionally cooperative interact with a software instructable machine as opposed to being merely descriptive and nonfunctional matter, where the one or more physical memory devices include, but not limited to, memory devices which utilize electrostatic effects to represent stored data, memory devices which utilize magnetic effects to represent stored data, memory devices which utilize magnetic and/or other phase change effects to represent stored data, memory devices which utilize optical and/or other phase change effects to represent stored data, and so on.

As used herein, the terms, "signaling", "transmitting", "informing" "indicating", "logical linking", and the like do not mean purely nonphysical and abstract events but rather physical and not elusively transitory events where the former physical events are ones whose existence can be verified by modern scientific techniques. Claims appended hereto that use the aforementioned terms, "signaling", "transmitting", "informing", "indicating", "logical linking", and the like or their equivalents do not preclude others from thinking about, speaking about or similarly using in a non-useful way abstract ideas, laws of nature or naturally occurring phenomenon.

BACKGROUND AND DESCRIPTION OF RELATED TECHNOLOGY

The above identified and herein incorporated by reference U.S. patent application Ser. No. 12/369,274 (filed Feb. 11, 2009) discloses a type of Social-Topical Adaptive Networking (STAN) System (hereafter, also referred to as "Sierra #1" and "STAN_1") which enables isolated online users of a network (or even strangers at a social gathering, e.g., a large business conference) to automatically join with one another (electronically or otherwise). The joinder may occur at times when they are in the mood to do so (to join in a so-called Notes Exchange session) and when they have roughly concurrent focus on same or similar content and/or when they have approximately concurrent interest in a same or similar particular topic or topics and/or when they have current personality co-compatibility for instantly chatting with, or for otherwise exchanging information with one another in short order online (or even in person) and for example with regard to the content and/or topic of shared current focus or with regard simply to a likelihood that they have current personality co-compatibility for instantly chatting online (or even in person) with each other and potentially developing focus on a particular topic of common interest. Because the network system (STAN_1) disclosed in Ser. No. 12/369,274 operates to adaptively change a topics defining map thereof (which has physically represented topic nodes or the like defined by recorded data signals) according to changing moods of user populations as well as individual users (e.g., user mood or other current user persona), it may be referred to as a Social-Topical 'Adaptive' Networking (STAN) system.

In the case where two or more online users join (make contact) with one another (e.g., electronically) based on commonality of topic(s) of concurrent interest, the joint activity between the users may be termed as "Social-Topical Networking" (STN). In one embodiment, the place for such an over-the-line exchange of notes may be termed as a "TCONE" (Topic Center Owned Notes Exchange), which terminology will be elucidated on below as being directed to a physical meeting mechanism such as an online chat room where that room is primarily "owned" by a topic defining mechanism known as a topic node or a topic center (TC).

The STAN-mediated or in-TCONE activity can be differentiated from conventional "Social Networking" (SN). In the conventional form of social networking (SN), instantiation of a private dialog often requires the existence of a pre-defined and pre-recorded "buddies" list or "accepted friends" list or "accepted contacts" list before participants can join electronically and privately with one another on a spur of moment and in a so-called, online discussion group to discuss no pre-ordained topic in particular. In other words, in the conventional form of social networking (SN), there is no system-driven automated mechanism for defining Topic Centers (TC's, also referred to herein as 'Topic Nodes') and for generating adaptive association data wherein a private or public Social Notes Exchange (SNE) is primarily "owned" by a first topic center but may adaptively drift so as to be primarily owned by a different TC if and when, for example, the electronically-facilitated exchange of notes (or of other data) drifts onto a different or narrower or broader topic.

As those skilled in the art of conventional online social networking (SN) will appreciate, the so-called "accepted friends" list is an operative part of the widely-used FaceBook™ online system. Similarly, the "buddies" list is an operative part of the earlier developed AOL™ Instant Messaging (AIM™) system. A similar mechanism exists in the also well-known, MySpace™ SN system and LinkedIn™ system. In these mentioned examples there are pre-defined "friends", "buddies", vouched-for "contacts" listed on co-mutual and pre-recorded friend/buddy permission lists. Based on the current permission settings, one friend/buddy may be allowed to (or not, if he/she has been "de-friended") join electronically for a "private" conversation (e.g., a "behind the (privacy) wall" conversation) with another friend/buddy for an online chat or an alike online social interaction that has no pre-ordained topic in particular to be discussed.

By contrast, according to one aspect of the "Social-Topical Networking" (STN) approach disclosed in the here incorporated "STAN_1" patent application (Ser. No. 12/369,274), people who are substantially strangers to each other rather than being pre-recorded as "buddies" or "friends" or known "contacts" may nonetheless meet electronically (or otherwise) and privately or semi-privately (where 'semi-privacy' may be due to constraints on who and how many can enter an STNE (Social-Topical Notes Exchange)) for a mutually beneficial exchange based on machine-determined mutuality of a concurrent topic of interest (TOI) as well as based on other filtering criteria (e.g., overlap of chat co-compatibilities, of expertise requirements, etc.). In one embodiment, the STAN_1 system automatically invites co-compatible strangers (but they could be friends as well) to privately or semi-privately meet up online with one another. The system may be viewed as one that provides real time "in-STAN-vitations"™ to plural people based on mutuality of a concurrent topic of interest (as guessed at by automated means of the STAN_1 system) and usually based on overlap of current content being focused upon by them and possibly based on a number of other invitation filtering criteria (e.g., co-compatibility to now chat with one another, level of expertise, trustworthiness, etc.).

The above identified and herein incorporated U.S. patent application Ser. No. 12/369,274 (filed Feb. 11, 2009) ("STAN_1") also provides as one embodiment thereof, a cloud computing system that evolves with use (in other words, it is adaptive) so as to provide real time changing, topic indexing trees having hierarchically interconnected nodes (topic nodes, which terminology is herein used interchangeably with the terminology, topic centers or TC's) representing both broad and narrower topics of interest of STAN_1 users, where the configuration of the tree can change adaptively and dynamically in response to real time reactions of the STAN_1 system users to online or otherwise shareable content they are detected to be focusing upon as well as new contributions by STAN_1 system users. Real time reactions of the STAN_1 system users are determined in one embodiment by means of uploaded, Current Focus indicating record signals (CFi's) and Current Vote indicating record signals (CVi's). In one embodiment, nodes of the STAN_1-maintained topic-nodes tree correspond to topics in a dynamically changing topics space and the nodes link to on-topic private, semi-private or public chat rooms (in other words, to gathered groups of on-topic focusing users) and/or to on-topic other content sources. If a logged-in user connects to a first topic node within the STAN_1 tree, he (or she) can then use the tree hierarchy structure to navigate to nearby parent, child or sibling topic nodes so as to then connect (via logical linking) through those other nodes to further content that is sourced through those other topic nodes. Over-the-line conversations (SNE's) that are monitored by the STAN_1 system (using the CFi, CVi mechanism) can drift from one topic node to another as the central topic of the respective conversation drifts. In one embodiment, participants in the conversation can vote implicitly or explicitly on which one or more STAN_1 topic nodes the conversation should primarily belong to and if so, to what degree of linkage. A STAN_1 system tracked Notes Exchange session (e.g., chat room session) can swing in Tarzan-like style from being primarily logical linked (tethered) to one topic node and then a next and yet another one.

In one variation, the STAN_1 system assumes that all its users will be logged-in (registered and STAN_1-tracked via CFi's or CVi's) into the STAN_1 cloud computing system. In one variation, the STAN_1 system assumes that most in-STAN_1 users will be using on-topic chat rooms sponsored by, entry-wise controlled by and tracked by the STAN_1 system (in other words, persistently ties to a STAN_1 maintained topic node) to interact with one another and to gain access to on-topic content sourced through the on-topic chat room or through a topic node with which the chat room is logically associated (logically associated by association data stored and maintained by the STAN_1 system).

However, the Internet is a vast network of many different kinds of computerized networks and content sources, used by a vast number of different people and thus the Internet can be hosting numerous topic-directed exchanges (e.g., tweets, emails, social games, Gmails™, GoogleWaves™, GoogleBuzz(es)™, Google Social Search(es)™, FriendFeed(s)™, blogs, Wikipedia™ posts and discussions, Stumbles™, ClearSpring™ shares, Yelps™, list-serves, etc.) and these can be providing numerous on-topic content sources and/or on-topic notes exchanging sessions where a bulk of these lie outside of the finite set of STAN_1 sponsored chats being tracked by, controlled by, and indexed (in its topics tree) by the STAN_1 cloud computing environment. For example, registered users of a social networking system known as LinkedIn™ can spontaneously form Groups and then form Discussion threads under Discussion Group Domains. The discussions which take place in the LinkedIn™ Discussion threads space (where LinkedIn™ is here mentioned merely as an illustrative example) may by happenstance co-relate to broad or narrow topics being simultaneously covered by STAN_1-sponsored chat rooms. It may be mutually beneficial for users of the heretofore separate systems (e.g., the STAN_1 system and the LinkedIn™ system) to learn of one another's existence and of their concurrent interest in a specific common topic and it may be mutually beneficial for them to join into larger or re-shuffled group exchanges of information, opinions and so forth about the common topic of interest under the auspices of either one or both of a Social-Topical Adaptive Networking (such as the STAN_2 system disclosed herein) and/or a more conventional social networking (SN) system such as that of a vintage year 2009 FaceBook™, MySpace™ or LinkedIn™ system. The here given example of on-topic Notes Exchange sessions occurring within LinkedIn™ discussion groups is understood to be non-limiting. On-topic Notes Exchange sessions may take place in online role playing and/or social networking games such as SecondLife™ and the like wherein, despite the fact that role-playing characters or avatars are portrayed as animated beings, the information output by and exchanged between such player characters is controlled by character-driving human beings.

It is to be understood that this background of technology section is intended to provide useful background for understanding the here disclosed inventive technology and as such, the technology background section may and probably does include ideas, concepts or recognitions that were not part of what was known or appreciated by those skilled in the pertinent art prior at corresponding invention dates of invented subject matter disclosed herein. As such, this background of technology section is not to be construed as an admission regarding what is or is not prior art.

SUMMARY

In accordance with one aspect of the present disclosure, cross-pollination (CP) is provided manually and/or automatically as between two or more social networking (SN) systems where at least one of the systems is a Social-Topical Adaptive Networking (STAN) system. The cross-pollination may be of a kind that improves, expands, advances or helps to evolve one or more of: (a) user-to-user associations (U2U) regarding common topics of interests, (b) user-to-topic associations (U2T—in both directions; so therefore topic-to-user as well), (c) topic-to-topic associations (T2T) and (d) topic-to-content associations (T2C—in both directions) as may be provided by cooperative exchanges of information allowed between the two or more social networking (SN) systems.

More specifically, in accordance with a first aspect of the present disclosure, techniques are provided for causing one or more of the following machine-implemented processes to take place: (a) an automated software agent (a 'BOT') automatically brings from out in the 'untracked/unmonitored' field and to a so-called STAN_2 system, a proposed-content package (a pCPD package) containing for example, hyperlinks (e.g., URL's) to potentially on-topic content that exists in an external platform but which probably co-relate to current topics of one or more topic centers (TC's) defined by and maintained as stored data signals in a topic space of the STAN_2 system; (b) the relevance of the BOT-brought content (as linked to or carried by the proposed-content package) to the topic of the TC (or to the specific topic of a TC-owned, TCONE) is voted on by in-node users (or by the in-TCONE users) and/or by an automated content-intake filtering mechanism of the TC or TCONE such that the most relevant-to-topic content of the pCPD package (or relevant-to-TCONE content) is logically absorbed into and logically positioned (ranked as being) as being closer to a core center point of the topic center (TC) or of the TCONE and such that less relevant-to-topic content of the pCPD package is either rejected or logically positioned (ranked) farther away from the node's or TCONE's core center point; (c) the ranking of most to least relevant-to-topic content is repeatedly updated over time as the population of in-node users (or in-TCONE users) changes and as newer BOT-brought content is proposed for addition to the on-topic node and it is voted on (ranked) for corresponding rejection or acceptance and logical positioning within the TC or TCONE; (d) STAN_2 users who are currently focusing upon a given topic (which focus is in one embodiment determined automatically and in the background by machine-implemented processes) preferably do not navigate directly to a content-supplying one URL but instead they navigate to the on-topic STAN_2 node (topic center or TC) which has been cross-pollinated with the freshest on-topic cross-pollinating content packages and the topic center (TC) is then used as a logical linking source for conveying the latest on-topic content (including on-topic dialogs) to those STAN_2 users who are interested in learning the latest about the corresponding topic. The STAN_2 users typically enter as participants into a TCONE (topic center owned note exchange, e.g., chat room) whose entry criterion (e.g., level of expertise) closely matches their current status (e.g., current level of expertise).

As alluded to above, the current topic of interest of a given user may be determined automatically and in the background by one or more machine-implemented processes which attempt to reduce ambiguity as to which specific topic the user is most probably now thinking about (consciously or subconsciously) by gathering and processing (e.g., competitively ranking) a dynamic flow of so-called "encodings" which encodings can provide contextual clues as to what the user is most likely thinking to be his or her current topic of interest. An example of one "encoding" in a stream of encodings can be a single keyword that the user appears to be intensely and primarily physically focusing upon (e.g., with his/her eyes) at the moment. Another example of an "encoding" in a stream of other kinds of encodings can be a facial grimace or other significant facial expression (as defined for example by the user's active PEEP record—the user's pre-recorded Personal Emotion Expression Profile) that an automated facial expressions detection sub-system of the here disclosed STAN_2 system picks up as having been made by that user in conjunction with his physically focusing upon a primary keyword encoding.

Suppose for example that the primary keyword of focus is the one word, "bridge". Suppose the user is determined by the machine system to have significantly raised an eyebrow in conjunction with this intensely focused upon primary keyword. However, even with those two determinations as givens, a term like "bridge" can be highly ambiguous. What specific version of "bridge" is the user thinking about and perhaps raising an eyebrow over? Is it a card game called "bridge"? Is it a road structure that crosses over a river, a room on board a ship from where the ship's captain commands, a portion of the human nose, some other noun that qualifies as "bridge" or perhaps none of the above and instead the verb sense of "bridge" or its adjective sense (e.g., bridge loan)?

More peculiarly, what if "bridge" at this moment means a magical kind of bridge that has one end thereof connected to the given user and the other end extending through a fog to unseen shores but nonetheless automatically swinging to connect to content and/or people which/who are highly relevant to a topic the given user is currently thinking about? What if this magic bridge has a pushbutton at the user's end that says "Bring it on"? What if the given user merely has to provide a single primary keyword and then simply press the single magical button ("Bring it on") at his end of the "bridge" and then in response, the magic "bridge" automatically conveys a stream of informational traffic to the given user where that stream puts the user into virtual contact with on-topic content and/or with co-compatible people who are now exchanging discussion or other forms of signaled notes (also referred to herein as Notes Exchange session) on the same topic the user intended when he supplied his end of the magical bridge with the one primary keyword (e.g., "bridge") and then pressed the "Bring it on" pushbutton?

In accordance with the present disclosure, an automated machine system (e.g., the STAN_2 system) is provided that automatically seeks to do something like that. However the here disclosed machine system does not operate by magic. Instead it automatically tries to disambiguate ambiguous first encodings (e.g., a primary keyword such as "bridge) by trying to collect additional and/or substantially cotemporaneous further "encodings" that give more context to one or more primary, but often ambiguous encodings (e.g., the exemplary primary keyword, "bridge). The disambiguating other encodings may be automatically collected signals that indicate where the given user is in terms of time, space, planning and/or perhaps emotional moods. In one embodiment, a continuous flow of encodings surrounding the user either physically and/or logically are persistently being collected and analyzed by the STAN_2 system (when so-called "monitoring" is turned on) for the purpose of reducing or eliminating the ambiguity as to which specific topic the user currently has in mind (consciously or subconsciously). The persistently collected other "encodings" may include identifications of on-screen or off-screen other information that appears currently or in recent usage history of the user (in the dynamic flow of the user's recent life) to be correlated to current primary encodings (e.g., to the primary keyword, "bridge"). These additional encodings can help place the primary keyword(s) (e.g., "bridge") in better context for the machine system and can thus enable the automated machine system (the STAN_2 system) to appear as if it has intuitively guessed what was on the user's mind without subjecting the user to an endless list of ambiguity reducing questions.

More specifically, and by way of a first example, suppose the here described system (the STAN_2 system) automatically acquires from the user's in-hand, personal data processing device (e.g., his GPS-enabled, Apple iPhone™) a signal indicating he is currently located at coordinates (including altitude and/or building floor number) matching those of owned properties of a branch office of a banking company. Suppose the here described STAN_2 system also automatically acquires from the user's personal data processing device (e.g., his iPhone™) a second signal indicating that his iPhone™ is in close proximity (e.g., 6 feet or less away) from an information-sharing second personal computer (could also be an iPhone™) that reports itself to belong to a loan officer of the bank's. Suppose the here described STAN_2 system also automatically determines that it is 10:00 AM on a Monday morning (for the user) and the STAN_2 system further automatically acquires from a meeting-calendaring file of the user that he was scheduled to meet with a bank loan officer on this Monday morning to negotiate a bridge loan for his business.

All these contextually enriching and automatically collected encodings acquired by the STAN_2 system increase the probability that the primary keyword, "bridge", if so presented by that user at that time and place to his personal data processing device (e.g., his palm-held computer phone) is intended to mean that the user is thinking about a "bridge loan" and not about a bridge that crosses a river.

However, suppose further that a so-called history of recent topics of interest (rTOI's) of the given user exists and this recorded and machine system readable history indicates the user has been recently using a STAN_2 topic node directed to the question of what lowest rate can someone like himself obtain for a bridge loan. In that case, the STAN_2 system can further automatically deduce that the more specific topic of interest (TOI) on the given user's mind probably is: "What is the lowest rate that I can negotiate for myself right now and here when trying to obtain a bridge loan from this banking company, and perhaps even from this particular loan officer?" Accordingly, and in response to the given user having submitted just the single keyword, "bridge", the STAN_2 system can automatically present to the user an informational offering (also referred to herein as a "content source recommendation") that basically says, "Press here to obtain more informational content and/or to obtain online connection to other STAN_2 users who are currently interested in the question of "What is the lowest rate that I can negotiate for myself right now and here when trying to obtain a bridge loan from this banking company?"

But that is not all. Suppose that the STAN_2 instant offering to connect the user with on-topic content sources (e.g., instant chat opportunities corresponding to the specific exemplary topic of "What is the lowest . . . bridge loan from this banking company?") include not only instant chat opportunities (and/or other Notes Exchange sessions) that are being supported by STAN_2 system resources (e.g., STAN_2 server computers or STAN_2 cloud computing data centers) but also Notes Exchange sessions that are being supported by external platforms and are nonetheless on-topic. How can that be done? It will be disclosed herein how the STAN_2 system can operate to automatically and persistently enrich its so-called topic nodes or topic centers (TC's) with additional, on-topic and cross-pollinating, and substantially cotemporaneous data obtained from out-of-STAN resources.

Given the above example (the "bridge loan" example) and in further summary thereof, in one embodiment, the here-disclosed machine system automatically seeks to determine where and when the user is disposed in terms for example of one or more of physical location, proximity to other persons or things, in terms of time zone, calendar date and pre-scheduled events—which calendar date could be a holiday or a scheduled vacation day (and optionally in terms of other metrics such as what velocity, acceleration, owned real estate spaces) and in terms of topics of interest (TOI's) recently declared by the user (implicitly or explicitly) to be recent topics of interest (rTOI's) of that user. The STAN_2 system may further seek to determine what sounds, smells, additional content, or other attributes currently surround the user (physically and/or virtually) so as to better be able to determine the user's current topic of interest. Is the user at home, at work, driving a car, visiting a bank or at the eye glass store (for example)? This work of determining most probable current topic of interests (cTOI) is preferably performed in the background by machine-implemented automated processes so that the user is not distracted by having to answer infrastructural questions and instead the machine system gives the appearance to the user of being able to intuitively read the user's mind and understand from one or a few keywords (e.g., "bridge") or other such encodings what the user is thinking about; and better yet to guide that user to, or recommend to the user, content sources (including recommended instant chat rooms to connect to or recommended people to contact for example) that are, with a high degree of probability, on-topic with and highly relevant to what the user is currently thinking about.

The above is to be contrasted with machine systems that force the user to consciously and explicitly define his or her current topic of interest (cTOI) at the infrastructural level (e.g., by explicitly modifying the search strategy). When the mind is forced to jump to an infrastructural level of detail, it can often lose track of the higher-level, substantive material it was concentrating on. More specifically, suppose the user is thinking about Wheatstone bridges (these are a type of sensitive electronic measuring circuits) but the search engine the user is employing comes back annoyingly and asks: "Did you mean Whitestone Bridge?" (where the latter is a popular river crossing in New York City). Needless to say, the user is now distractingly thrown off his/her main track of thought and has to annoyingly deal with the infrastructural mechanics of getting the automated search tool to navigate away from its incorrect guess and towards the correct current topic of interest (cTOI). The better approach would be to have an automated machine system which seems to intuitively know that when "this" user (who for example is currently logged in as "Stanley the Engineer") uses the word "bridge" in his current location (e.g., the office at the electronics design company) and at this time (e.g., normal business hours) he probably means, "bridge" as in the topic of Wheatstone type bridge circuits and not some other topic that might have "bridge" as one of its keywords (or tags, or meta-tags, etc.). Various means by way of which an automated machine system can be made to appear to have such intuition are described herein.

In accordance with another aspect of the present disclosure, various user interface techniques are provided for allowing a user to conveniently interface with resources of the STAN_2 system.

Other aspects of the disclosure will become apparent from the below detailed description.

BRIEF DESCRIPTION OF THE DRAWINGS

The below detailed description section makes reference to the accompanying drawings, in which:

FIG. 1B is a combination of a first process flow chart, of sample pop-up windows which may be displayed to a user of the STAN_2 sub-network system of FIG. 1A and of an aliases cross-referencing data structure generated by the flow charted process;

FIG. 2 is a perspective view type of mapping diagram showing how topic-to-topic associations (T2T), user-to-topic associations (U2T), user-to-user associations (U2U) and/or topic-to-content associations (T2C) may be enhanced by actions for example of Cross-Pollinating Automated Persona bots (CPAP's) which are automatically generated by the STAN_2 sub-network system of FIG. 1A and sent out into the field to bring back proposed on-topic-content;

FIGS. 4C-4D are a combination flow chart and data structure showing diagram illustrating how an initially formed (instantiated) mission guiding template can be augmented with alternate language and/or alternate disciplinary area encodings and pointers to alternate areas of search.

DETAILED DESCRIPTION

Figure 1A:
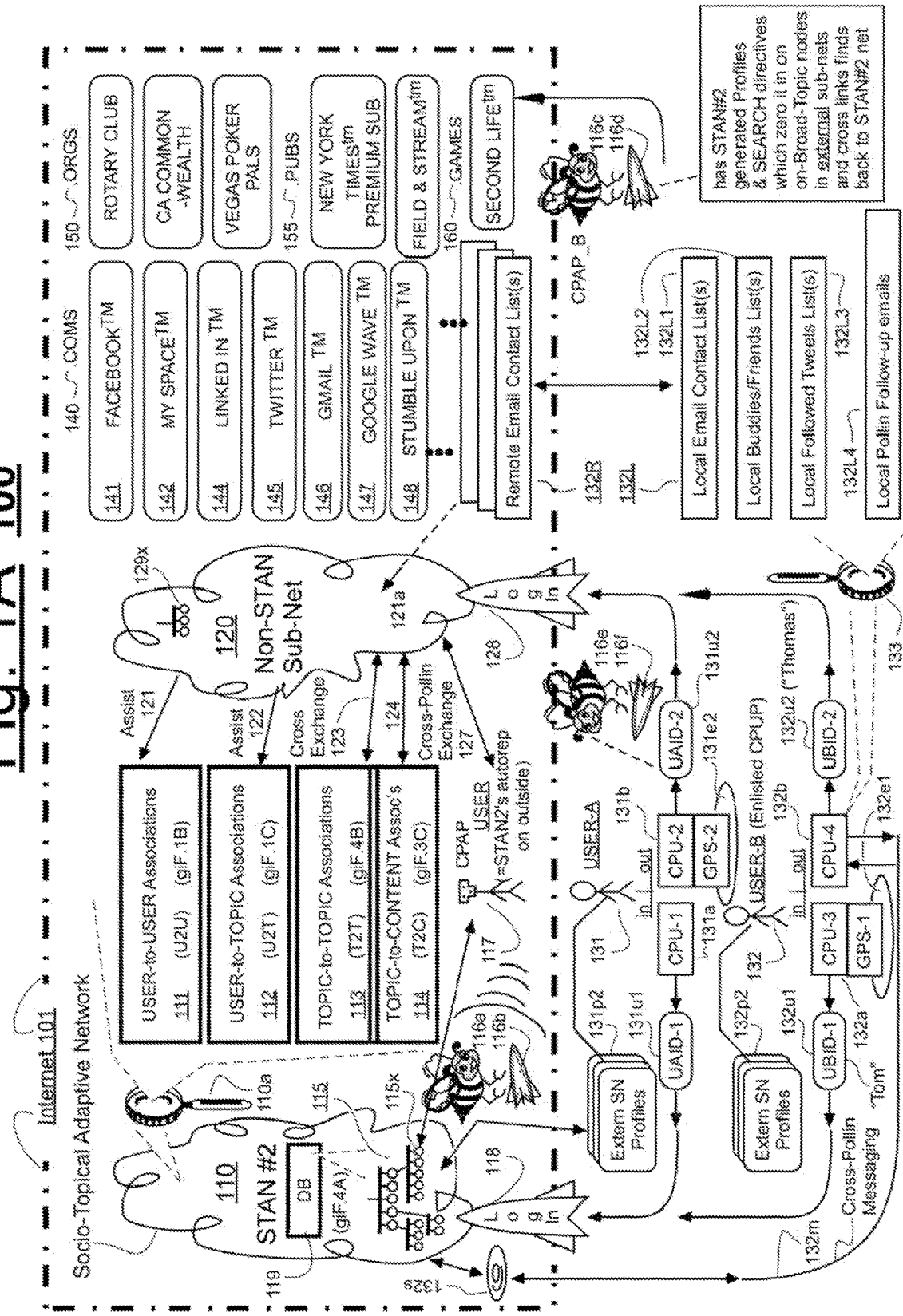
FIG. 1A is a block diagram of an electromagnetically linked (e.g., electronically and/or optically linked) networking environment that includes a Social-Topical Adaptive Networking (STAN_2) sub-system in accordance with the present disclosure and includes other network sub-systems whose resources may be used for cross-pollination and for thereby improving benefits obtained by users of the one or more of the sub-networks due to cross-pollination actions provided by the STAN_2 sub-system.

FIG. 1A is a block diagram of an electromagnetically inter-linked (e.g., electronically and/or optically linked) networking environment 100 that includes a Social-Topical Adaptive Networking (STAN_2) sub-system 110 in accordance with the present disclosure and which environment 100 includes other sub-network systems (e.g., Non-STAN subnet 120) and whose resources may be used to enhance online experiences of real person users (e.g., 131, 132) of the one or more of the sub-networks 110, 120, etc. due to cross-pollination actions instigated by the STAN_2 sub-network system 110.

Background descriptions on how a Social-Topical Adaptive Networking (STAN) sub-system may operate can be found in the above-cited and here incorporated U.S. application Ser. No. 12/369,274 filed Feb. 11, 2009 by Jeffrey A. Rapaport et al. and originally entitled, "Social Network Driven Indexing System for Instantly Clustering People with Concurrent Focus on Same Topic into On Topic Chat Rooms and/or for Generating On-topic Search Results Tailored to User Preferences Regarding Topic". As such, a detailed repetition of said incorporated by reference material will not be provided here. For sake of avoiding confusion between the drawings of Ser. No. 12/369,274 and the figures of the present application, drawings of Ser. No. 12/369,274 will be identified by the prefix, "giF." (which is Fig. written backwards) while figures of the present application will be identified by the normal figure prefix, "Fig.".

In brief, giF. 1A of the here incorporated '274 application shows how topics of current interest to (not to be confused with content being currently 'focused upon' by) individual online participants may be automatically determined based on detection of certain content being currently and emotively 'focused upon' by the respective online participants and based upon pre-developed profiles of the respective users (e.g., registered and logged-in users of the STAN_1 system). (Incidentally, in the here disclosed STAN_2 system, the notion is included of determining what a user is not, or is less focusing upon as well as what the user is most focusing upon for automatically determining most probable topic(s) of current interest. For example, if a user's personal profile records (e.g., DsCCp's) indicate that focus upon Topic 'A' usually occurs when the user is focusing on both URL1 and keyword2, but it is clear that in the instance the user is not focusing on URL1, then the STAN_2 system can for some users automatically determine that the user's thought patterns are probably not focusing upon Topic 'A' but rather on some alternate topic that is also heavily linked to the same keyword2.)

Further in brief, giF. 1B of the incorporated '274 application shows a data structure of a first stored chat co-compatibility profile that can change with changes of user persona (e.g., change of mood); giF. 1C shows a data structure of a stored topic co-compatibility profile that can also change with change of user persona (e.g., change of mood, change of surroundings); and giF. 1E shows a data structure of a stored personal emotive expression profile of a given user, whereby biometrically detected facial or other biotic expressions of the profiled user may be used to deduce emotional involvement with on-screen content and thus degree of emotional involvement with focused upon content. One embodiment of the STAN_1 system disclosed in the here incorporated '274 application uses uploaded CFi (current focus indicator) packets to automatically determine what topic or topics are most likely ones that each user is currently thinking about based on the content that is being currently focused upon with above-threshold intensity. The determined topic is logically linked by operations of the STAN_1 system to topic nodes (herein also referred to as topic centers or TC's) within a hierarchical parent-child tree represented by data stored in the STAN_1 system.

Yet further and in brief, giF. 2A of the incorporated '274 application shows a data structure of a stored CFi record while giF. 2B shows a data structure of an implied vote-indicating record (CVi) which may be automatically extracted from biometric information obtained from the user. The giF. 3B diagram shows an exemplary screen display wherein so-called chat opportunity invitations (herein referred to as In-STAN-Vitations™) are provided to the user based on the STAN_1 system's understanding of what topics are currently of prime interest to the user. The giF. 3C diagram shows how one embodiment of the STAN_1 system (of the '274 application) can automatically determine what topic or domain of topics might most likely be of current interest for a given user and then responsively can recommend, based on likelihood rankings, content (e.g., chat rooms) which are most likely to be on-topic for that user and compatible with the user's current status (e.g., level of expertise in the topic).

Moreover, in the here incorporated '274 application, giF. 4A shows a structure of a cloud computing system that may be used to implement a STAN_1 system on a geographic region by geographic region basis. Importantly, each data center of giF. 4A has an automated Domains/Topics Lookup Service (DLUX) executing therein which receives up- or in-loaded CFi data packets (Current Focus identifying records) from users and combines these with user histories uploaded form the user's local machine and/or user histories already stored in the cloud to automatically determine probable topics of current interest then on the user's mind. In one embodiment the DLUX points to so-called topic nodes of a hierarchical topics tree. An exemplary data structure for such a topics tree is provided in giF. 4B which shows details of a stored and adaptively updated topic mapping data structure used by one embodiment of the STAN_1 system. Also each data center of giF. 4A further has one or more automated Domain-specific Matching Services (DsMS's) executing therein which are selected by the DLUX to further process the up- or in-loaded CFi data packets and match alike users to one another or to matching chat rooms and then presents the latter as scored chat opportunities. Also each data center of giF. 4A further has one or more automated Chat Rooms management Services (CRS) executing therein for managing chat rooms or the like operating under auspices of the STAN_1 system. Also each data center of giF. 4A further has an automated Trending Data Store service that keeps track of progression of respective users over time in different topic sectors and makes trend projections based thereon.

The here incorporated '274 application is extensive and has many other drawings as well as descriptions that will not all be briefed upon here but are nonetheless incorporated herein by reference.

Referring now to FIG. 1A of the present disclosure, in the illustrated environment 100 which includes a more advanced STAN_2 system 110, a first real and living user 131 (also USER-A, also "Stan") is shown to have access to a first data processing device 131a (also CPU-1). The first user 131 may routinely log into and utilize the illustrated STAN_2 Social-Topical Adaptive Networking system 110 by causing CPU-1 to send a corresponding user identification package 131u1 (e.g., user name and user password data signals) to a log-in interface portion 118 of the STAN_2 system 110. In response to validation of such log-in, the STAN_2 system 110 automatically fetches various profiles of the logged-in user (131, "Stan") from a database (DB, 119) thereof for purpose of determining the user's currently probable topics of prime interest, moods, chat co-compatibilities and so forth. In one embodiment, a same user (e.g., 131) may have plural personal log-in pages, for example, one that allows him to log in as "Stan" and another which allows that same user to log-in under the alter ego identity of say, "Stewart" if that user is in the mood to assume the "Stewart" persona at the moment rather than the "Stan" persona. If a user (e.g., 131) logs-in via interface 118 with a second alter ego identity (e.g., "Stewart") rather than with a first alter ego identity (e.g., "Stan"), the STAN_2 Social-Topical Adaptive Networking system 110 automatically activates personal profile records (e.g., CpCCp's, DsCCp's, PEEP's) of the second alter ego identity (e.g., "Stewart") rather than those of the first alter ego identity (e.g., "Stan"). Topics of current interest to the logged-in persona may be identified as being logically associated with specific nodes (herein also referred to as TC's or topic centers) on a topics domain-parent/child tree structure such as the one schematically indicated at 115 within the drawn symbol that represents the STAN_2 system 110 in FIG. 1A. A corresponding stored data structure that represents the tree structure in the earlier STAN_1 system (not shown) is illustratively represented by drawing number giF. 4B. The topics defining tree 115 as well as user profiles of registered STAN_2 users may be stored in various parts of the STAN_2 maintained database (DB) 119 and/or in the user's local and/or remotely-instantiated data processing equipment (e.g., CPU-1, CPU-2, etc.). The database (DB) 119 may be a centralized one or one that is semi-redundantly distributed over different service centers of a geographically distributed cloud computing system. In the distributed cloud computing environment, if one service center becomes non-operational or overwhelmed with service requests, another somewhat redundant service center can function as a backup (yet more details are provided in the here incorporate STAN_1 patent application).

As used herein, the term, "local data processing equipment" includes data processing equipment that is remote from the user but is nonetheless controllable by a local means available to the user. More specifically, the user (e.g., 131) may have a so-called net-computer (e.g., 131*a*) in his local possession where that net-computer is operatively coupled to a virtual computer or desktop instantiated in one or more servers on a connected to network (e.g., the Internet 101) and through operations of the relatively minimally equipped net-computer that cooperate with greater computing resources (hardware and/or software) available in the instantiating server(s), the user is made to feel as if he a has a much more resourceful computer locally in his possession (more resourceful in terms of hardware and/or software, both of which are physical manifestations as those terms are used herein) even though that might not be true. For example, the user's locally possessed net-computer (e.g., 131*a*) may not have a hard disk or a key pad but rather only a touch-sensitive display screen. However the server (or cloud) instantiated virtual machine that services that net-computer can project itself as having an extremely large hard disk and a versatile keyboard that appears with context variable keys on the user's touch-responsive display screen. Occasionally the term "downloading" will be used herein under the assumption that the user's personally controlled computer (e.g., 131) is receiving the downloaded content. However, in the case of a net-book or the like, downloaded is to be understood as including the more general notion of inloaded, wherein a virtual computer on the network (or in a cloud computing system) is inloaded with the content rather than having that content being "downloaded" from the network to an actual local and complete computer. Of course, certain resources such as the illustrated GPS-2 peripheral of CPU-2 may not always be capable of being operatively mimicked with an in-net or in-cloud virtual counterpart; in which case it is understood that the GPS resource is local. (On the other hand, cell phone triangulation technology and/or other technologies may be used to mimic the effect of having a GPS unit although one might not be present.)

It is to be understood that the CPU-1 device (131*a*) used by first user 131 when interacting with (e.g., being tracked in real time by) the STAN_2 system 110 is not limited to a desktop computer having for example a "central" processing unit (CPU), but rather that many varieties of data processing devices having appropriate minimal intelligence capability are contemplated as being usable, including laptop computers, palmtop PDA's, tablet computers, net-computers, 3rd generation or higher smart-phones (e.g., an iPhone™, and Android™ phone) and so on. The CPU-1 device (131*a*) used by first user 131 may have any number of different user interface (UI) and environment detecting devices included therein such as, but not limited to, one or more integrally incorporated webcams (one of which may be robotically aimed to focus on what off screen view the user appears to be looking at), one or more integrally incorporated audio (e.g., Bluetooth™) interfacing devices, an integrally incorporated GPS (Global Positioning System) location identifier and/or other automatic location identifying means, an integrally incorporated accelerometer and/or other such MEMs devices (micro-electromechanical devices), various biometric sensors (e.g., pulse, respiration rate, eye blink rate, eye focus angle) that are operatively coupleable to the user 131 and so on. As those skilled in the art will appreciate from the here incorporated STAN_1 disclosure, automated location determining devices such as integrally incorporated GPS and/or audio pickups may be used to determine user surroundings (e.g., at work versus at home, alone or in noisy party) and to thus infer from this sensing of environment, the current user persona (e.g., mood, frame of mind, etc.). One or more (e.g., stereoscopic) first sensors may be provided in one embodiment for automatically determining what off-screen or on-screen object(s) the user is currently looking at; and if off-screen, a robotically amiable further sensor (e.g., a webcam) may be automatically trained on the off-screen view in order to identify and categorize it. In one embodiment, an automated image categorizing tool such as GoogleGoggles™ may be used to automatically categorize imagery that the user appears to be focusing upon. The categorization data of the automatically categorized image may then be used as an additional "encoding" for assisting the STAN_2 system 110 in determining what topic or finite set of topics the user (e.g., 131) currently most probably has in mind. It is within the contemplation of the present disclosure that alternatively or in addition to having an imaging device near the user and using an automated image categorizing tool such as GoogleGoggles™ other encoding detecting devices and automated categorizing tools may be deployed such as, but not limited to, sound detecting, analyzing and categorizing tools; ambient chemistry and temperature detecting, analyzing and categorizing tools (e.g., What human olfactorable and/or unsmellable vapors, gases are in the air surrounding the user and at what changing concentration levels?); velocity and/or acceleration detecting, analyzing and categorizing tools (e.g., Is the user in a moving vehicle and if so, heading in what direction?); and virtually-surrounding or physically-surrounding other people detecting, analyzing and categorizing tools (e.g., Is the user in virtual and/or physical contact with other personas, and if so what are their current attributes?).

Each user (e.g., 131, 132) may project a respective one of different personas (e.g., an "inside" versus "outside" persona) based on the specific environment (including presence of other people virtually or physically) that the user finds him or herself in. For example, there may be an at-the-office or work-site persona that is different from an at-home or an on-vacation persona. More specifically, one of the many personas that the first user 131 may have is one that predominates in a specific environment 131*e*2 (e.g., as geographically detected by integral GPS-2 device of CPU-2). When user 131 is in this environmental context (131*e*2), that first user 131 may choose to identify him or herself with (or have his CPU device automatically choose for him/her) a different user identification (UAID-2, also 131*u*2) than the one utilized (UAID-1, also 131*u*1) when typically interacting in real time with the STAN_2 system 110. A variety of automated tools may be used to detect, analyze and categorize user environment (e.g., place, time, calendar date, velocity, acceleration, surroundings—objects and/or people, etc.). These may include but are not limited to, webcams, GPS, electronic time keeper, MEMs, chemical sniffers, etc.

When operating under this alternate persona (131*u*2), the first user 131 may choose (or pre-elect) to not be monitored in real time by (and through the CFi, CVi mechanisms) or to otherwise be generally interacting with the STAN_2 system 110. Instead, the user 131 may elect to log into a different kind of social networking (SN) system 120 or other content providing system (e.g., 148, 160) and to fly, so-to-speak, solo inside that external platform 120. While so interacting with the alternate SN system 120 (e.g., FaceBook™, MySpace™, LinkedIn™, YouTube™, GoogleWave™, ClearSpring™, etc.), the user may develop user-to-user associations (U2U, see block 111) that are different than those developed under real time tracking auspices of the STAN_2 system 110. Moreover, the user 131 may, while interacting only with the alternate SN system 120 (and possibly under an alternate ID and/or persona 131*u2*—i.e. "Stewart" instead of "Stan"), develop user-to-topic associations (U2T, see block 112) that are different than those developed under auspices of the STAN_2 system 110. Also, topic-to-topic associations (T2T, see block 113) that are operative within the context of the alternate SN system 120 may be different from those that at the same time have developed inside the STAN_2 system 110. Additionally, topic-to-content associations (T2C, see block 114) that are operative within the context of the alternate SN system 120 may be different from those that at the same time have developed inside the STAN_2 system 110.

Before providing a more concrete example of how a given user (e.g., Stan/Stew 131) may have multiple personas and may interact differently when influenced by contexts of different social networking (SN) or other platforms, a brief discussion about those possible other SN's or other platforms is provided here. There are many well known dot. COM websites (140) that provide various kinds of social interaction services. One of the currently most well known and used ones is the FaceBook™, system 141 (hereafter also referred to as FB). FB users establish an FB account and set up various permission options that are either "behind the wall" and thus relatively private or are "on the wall" and thus viewable by any member of the public. Only pre-identified "friends" (e.g., friend-for-the-day, friend-for-the-hour) can look at material "behind the wall". FB users can manually "de-friend" and "re-friend" people depending on who they want to let in on a given day or other time period to the more private material behind their wall.

Another well known SN site is MySpace™ (142) and it is somewhat similar to FB. A third SN platform that is gaining popularity amongst so-called "professionals" is the LinkedIn™ platform (144). LinkedIn™ users post a public "Profile" of themselves which typically appears like a resume and publicizes their professional credentials in various areas of professional activity. LinkedIn™ users can form networks of linked-to other professionals. The system automatically keeps track of who is linked to whom and how many degrees of linking separation, if any, are between people who appear to the LinkedIn™ system to be strangers to each other because they are not directly linked to one another. LinkedIn™ users can create Discussion Groups and then invite various people to join those Discussion Groups. Online discussions within those created Discussion Groups can be monitored (censored) or not monitored by the creator (owner) of the Discussion Group. For many Discussion Groups, an individual has to be pre-accepted into the Group (for example, accepted by the Group moderator) before the individual can see what is being discussed behind the wall of the members-only Discussion Group. Accordingly, as is the case with "behind the wall" conversations in FaceBook™, Group Discussions within LinkedIn™ may not be viewable to relative "strangers" who have not been accepted as a linked-in friend or contact for whom an earlier member of the LinkedIn™ system sort of vouches for by "accepting" them into their inner ring of direct (1st degree of operatively connection) contacts.

The Twitter™ system (145) is somewhat different because any member of the public can "follow" the "tweets" output by so-called "tweeters". A "tweet" is conventionally limited to only 140 characters. Twitter™ followers can sign up to automatically receive indications that their favorite "tweeters" have tweeted something new and then they can look at the output "tweet" without need for any special permissions. Typically, celebrities such as movie stars output many tweets per day and they have groups of fans who regularly follow their tweets. It could be said that the fans of these celebrities consider their followed "tweeters" to be influential persons and thus the fans hang onto every tweeted output sent by their worshipped celebrity (e.g., movie star).

The Google™ Corporation (Mountain View, Calif.) provides a number of well known services including their famous online and free to use search engine. They also provide other services such a Google™ controlled Gmail™ service (146) which is roughly similar to many other online email services like those of Yahoo™, EarthLink™, AOL™, Microsoft Outlook™ Email, and so on. The Gmail™ service (146) has a Group Chat function which allows registered members to form chat groups and chat with one another. GoogleWave™ (147) is a project collaboration system that is still maturing at the time of this writing. Incidentally, Microsoft Outlook™ in whole also provides calendaring and collaboration scheduling services whereby a user can propose, declare or accept proposed meeting or other events to be placed on the user's computerized schedule. It is within the contemplation of the present disclosure for the STAN_2 system to periodically import calendaring and/or collaboration/event scheduling data from the user's Microsoft Outlook™ and/or other alike scheduling databases (irrespective of whether those scheduling databases and/or their support software are physically local within a user's computer or they are provided via a computing cloud; and if importation is permitted by the user) so that the STAN_2 system can use such imported scheduling data to infer at the scheduled dates, the user's more likely environment. Incidentally, it is within the contemplation of the present disclosure that essentially any database and/or automated service that is hosted in and/or by one or more of a user's physically local data processing device, a website's web serving and/or mirroring servers and parts or all of a cloud computing system or equivalent can be ported in whole or in part so as to be hosted in and/or by different one of such physical mechanisms. With net-computers, palm-held convergence devices (e.g., iPhone™, iPad™ etc.) and the like, it is usually not of significance where specifically the physical processes of data processing take place but rather that timely communication and connectivity are provided so that the user experiences substantially same results. Of course, some acts of data acquisition and/or processing may by necessity have to take place at the physical locale of the user such as the acquisition of user responses (e.g., touches on a touch-sensitive tablet screen) and of local user encodings (e.g., what the user's local environment looks, sounds and/or smells like). Returning back to the digressed-away from method of automatically importing scheduling data to thereby infer at the scheduled dates, the user's more likely environment, a more specific example can be this: If the user's scheduling database indicates that next Friday he is scheduled to be at the Social Networking Developers Conference (a hypothetical example) and more particularly at events 3, 5 and 7 in that conference at the respective hours of 3:00 PM, 5:00 PM and 7:00 PM, then when that date and corresponding time segment comes around, the STAN_2 system may use such information as one of its gathered encodings for then automatically determining the user's likely mood, surroundings and so forth. On the other hand, if the user's scheduling database indicates that next Friday he is planning to take off from work and go to a named vacation resort, the STAN_2 system may use that alternate imported information for automatically determining the user's likely mood, surroundings and so forth at the corresponding dates and times.

Additionally, the Microsoft Outlook™ product also provides a Tasks tracking function wherein various to-do items and their criticalities (e.g., flagged as a must-do today, must-do next week, etc.). It is within the contemplation of the present disclosure for the STAN_2 system to periodically import Task tracking data from the user's Microsoft Outlook™ and/or other alike task tracking databases (if permitted by the user) so that the STAN_2 system can use such imported task tracking data to infer during the scheduled time periods, the user's more likely environment and moods. More specifically, if the user's task tracking database indicates that the user has a high priority, high pressure work task to be completed by end of day, the STAN_2 system may use this imported information to deduce that the user's mind is most likely focused on topics related to the must-be-done task(s) as their deadlines approach and they are listed as not yet complete. Similarly, the user may have Customer Relations Management (CRM) software that the user regularly employs and the database of such CRM software might provide exportable information (if permitted by the user) about specific persons, projects, etc. that the user will more likely be involved with during certain time periods and/or when present in certain locations. It is within the contemplation of the present disclosure for the STAN_2 system to periodically import CRM tracking data from the user's CRM tracking database(s) (if permitted by the user) so that the STAN_2 system can use such imported CRM tracking data to infer the user's more likely environment and moods based on detected time and place and/or then-in-contact other persons.

The StumbleUpon™ system (148) allows registered users to recommend websites to one another. Users can click a thumb-up icon to vote for a website they like and can click on a thumb-down icon to indicate they don't like it. The voted upon websites can be categorized by use of "Tags" which generally are one or two short words to give a rough idea of what the website is about.

Another well known social networking (SN) system is the so-called SecondLife™ network (160). The SecondLife™ network presents itself to its users as an alternate, virtual landscape in which the users appear as "avatars" (e.g., animated 3D cartoon characters) and they interact with each other as such. The SecondLife™ system allows for Non-Player Characters (NPC's) to appear within the SecondLife™ landscape. These are avatars that are not controlled by a real life person but are rather computer controlled automated characters. The avatars of real persons can have interactions within the SecondLife™ landscape with the avatars of the NPC's.

Aside from these various kinds of social networking (SN) platforms (e.g., 141-148, 160), other social interactions may take place through email exchanges, list-serve exchanges, comments posted on "blogs". Various organizations (dot.org's, 150) and content publication institutions (155) may publish content directed to specific topics (e.g., to outdoor nature activities such as those followed by the Field-and-Streams™ magazine) and that content may be freely available to all members of the public or only to subscribers in accordance with subscription policies generated by the various content providers.

A user (e.g., 131) of the STAN_2 system 110 may also be a user of one or more of these various other social networking (SN) and/or other content providing platforms (120, 140, 150, 155, 160, etc.) and at times the user (e.g., 131) may choose to be disconnected from (e.g., not logged-into and/or not monitored by) the STAN_2 system 110 while instead interacting with one or more of these various social networking (SN) and other content providing platforms (120, 140, 150, 155, 160, etc.). So now a hypothetical example will be studied where User-A (131) is going to be interacting with an out-of-STAN_2 subnet 120 (where the latter could be any one of outside platforms like 141, 142, 144 etc.).

In this hypothetical example, the same first user 131 (USER-A) employs the username, "Stanley" (or "Stan" for short) when logged into and being tracked in real time by the STAN_2 system 110 (and may use a corresponding Stanley-associated password) while on the other hand, the same first user 131 employs the username, "Stewart" (or "Stew" for short) when logging into the alternate SN system 120 (e.g., FaceBook™, MySpace™, LinkedIn™, etc.) and he then may use a corresponding Stewart-associated password. The Stewart persona (131$u$2) may favor focusing upon topics related to music and classical literature whereas the Stanley persona (131$u$1) may favor focusing on topics related to science and politics (this being merely a hypothesized example). Accordingly, the Stewart persona (131$u$2) may more frequently join and participate in music/classical literature discussion groups when logged into the alternate SN system 120. By contrast, the Stanley persona (131$u$1) may more frequently join and participate in science/politics topic groups when logged into or otherwise being tracked by the STAN_2 system 110. The local interface devices (e.g., CPU-1, CPU-2) used by the Stanley persona (131$u$1) and the Stewart persona (131$u$2) may be a same device (e.g., same laptop computer) or different ones or a mixture of both depending on hardware availability and mood of the user. The environments (e.g., work, home, coffee house) used by the Stanley persona (131$u$1) and the Stewart persona (131$u$2) may also be same or different ones depending on a variety of circumstances.

Despite the possibilities for such difference of persona and interests, there may be instances where user-to-user associations (U2U) and/or user-to-topic associations (U2T) developed by the Stewart persona (131$u$2) while operating exclusively under the auspices of the SN system 120 environment and outside the tracking radar of the STAN_2 system 110 may be of cross-pollination value to the Stanley persona (131$u$1)—and/or to other users (e.g., 132$u$1) of the STAN_2 system 110.

More specifically, a cross-discipline discussion may erupt within a given Discussion Group (e.g., node 129$x$) of the external SN system 120 (e.g., LinkedIn™) that involves both politics and classical literature. (Recall that the 'Stewart' persona likes literature while the 'Stanley' persona of user 131 likes politics.) In such a case, it may be beneficial to join together (by invitation) some of the out-of-STAN2 participants in the given external Discussion Group (e.g., 129$x$) with some in-STAN2 participants who are currently interacting under a co-related topic node (115$x$, understood to be a node of the in-STAN_2 topics tree 115) and are equally enthusiastically involved in the same point of interest that encompasses a cross-discipline crossover between politics and classical literature.

But how is such a joinder of out-of-STAN2 participants (coupled to node 129$x$) and in-STAN2 participants (coupled to node 115$x$) to take place? It should be recalled that the first user 131 is operating under his Stewart persona (131$u$2) when participating enthusiastically in this hypothetical example with the out-of-STAN2 Discussion Group (e.g., 129$x$) of the external SN system 120. In the heat of discussion at node 129*x*, it may never occur to user 131 (in his Stewart persona) to think of alerting an in-STAN2 participant of node 115*x* to come take a look at what is happening at the moment inside discussion node 129*x*. Moreover, a random in-STAN2 participant of node 115*x* might not be a member of the out-of-STAN2 platform 120 and thus cannot quickly and easily pop in to take a look. (That other user may first have to register and get "accepted" as a friend, buddy etc. where all this takes time.)

Suppose that at a later time, long after the heated discussion about politics and classical literature erupted at outside node 129*x*, the first user 131 finally logs-in (via interface 118) into the STAN_2 system 110. By that time, this first user 131 may have already forgotten what transpired inside discussion node 129*x* of external SN system 120. Moreover, that first user 131 may not at this time navigate his topic focus to coincide with the topic covered by in-STAN2 node 115*x*. So the participants of the out-of-STAN2 Discussion Group (e.g., 129*x*) do not get an opportunity to link together with the participants of the in-STAN2 node 115*x* even though such cross-platform linkage might beneficially enhance the Internet using experiences of all involved. If this kind of failure-to-link was happening under auspices of the older, STAN_1 system (not shown), the STAN_1 system might have no way of knowing that it should "invite" the Stanley persona (131*u*1) of user 131 to take another look internal node 115*x* and also at external discussion 129*x* even if the STAN_1 system (not shown) were cognizant of the existence of that external discussion node 129*x*.

However, the STAN_2 system 110 (FIG. 1A) is different as compared to the older STAN_1 system (not shown).

Firstly, the STAN_2 system 110 actively tries to develop and store so-called External SN Profile records 131*p*2, 132*p*2 for each of its registered members (e.g., 131, 132 respectively). The External SN Profile records (e.g., 131*p*2, 132*p*2) may reflect user compatibility characteristics (e.g., co-compatibilities to other users, compatibilities to specific topics) of one or more external personas (e.g., 131*u*2, 132*u*2) of registered members of the STAN_2 system 110 who agree to have their out-of-STAN_2 characteristic indicating records automatically scanned into (imported into) and periodically re-scanned by the STAN_2 system 110. In one embodiment, the out-of-STAN_2 characteristic indicating records may alternatively or additionally be partly or wholly manually entered into records of the STAN_2 database (DB) 119 and optionally validated by entry checking software or other means and thereafter incorporated into the user's External SN Profile records.

The external profile importing mechanism is more clearly illustrated for the case of second user 132. In one embodiment, while this second user 132 was logged-in into the STAN_2 system 110 (e.g., under his STAN_2 persona as "Tom", 132*u*1), a somewhat intrusive and automated first software agent (BOT, see process 170 of FIG. 1B) of system 110 invited the second user 132 to reveal by way of a survey his UBID-2 information (his user name, "Thomas" and optionally his corresponding password) which he uses to log into interface 128 of the Out-of-STAN other system 120, and if applicable; to reveal the identity and grant access to the alternate data processing device (CPU-4) that user 132 uses when logged into the Out-of STAN other system 120. The automated software agent (not explicitly shown in FIG. 1A) then recorded an alias record into the STAN_2 database (DB 119) where the stored record (see 184 of FIG. 1B) logically associates the user's UAID-1 of the 110 domain with his UAID-2 of the 120 domain. Yet another alias record would make a similar association between the UAID-1 identification of the 110 domain with some other identifications, if any, used by user 132 in yet other external domains (e.g., 141, 142, 144, etc.) Then the agent began scanning that alternate data processing device (CPU-4) for local friends and/or buddies lists 132L2 stored in the local memory of CPU-4. The automated importation scan may also cover local email contact lists 132L1 and Tweet following lists 132L3 held in that alternate data processing device (CPU-4). If it is given the alternate site password for temporary usage, the STAN_2 automated agent also logged into the Out-of-STAN domain 120 while pretending to be "Thomas" (with user 132's permission to do so) and began scanning that alternate contacts/friends/followed tweets/etc. listing site for remote listings 132R of Thomas's email contacts, Gmail™ contacts, buddy lists, friend lists, accepted contacts lists, followed tweet lists and so on depending on predetermined knowledge held by the STAN_2 system of how the external content site 120 is structured. Different external content sites (e.g., 120, 141, 142, 144, etc.) may have different mechanisms for allowing logged-in users to access their private (behind the wall) and public friends, contacts and other such lists based on unique privacy policies maintained by the various external content sites. In one embodiment, database 119 of the STAN_2 system 110 stores accessing know-how data (e.g., knowledge base rules) for known ones of the external content sites. In one embodiment, a registered STAN_2 user (e.g., 132' of FIG. 2) is enlisted to serve as a sponsor into the Out-of STAN platform for automated agents output by the STAN_2 system 110. In one embodiment, cooperation agreements are negotiated and signed as between operators of the STAN_2 system 110 and operators of one or more of the Out-of STAN other platforms (e.g., external platforms 120, 141, 142, 144, etc.) that permit automated agents output by the STAN_2 system 110 or live agents coached by the STAN_2 system to enter the other platforms and operate therein in accordance with restrictions set forth in the cooperation agreements.

Referring now to FIG. 1B, shown is a machine-implemented and automated process 170 by way of which user 132 might be coaxed into allowing the STAN_2 system 110 to import all or a filter-criteria determined subset of the second user's external lists, 132L, 132R into STAN_2 stored profile records 132*p*2 of that second user 132.

Process 170 is initiated at step 171 (Begin). The initiation might be in automated response to the STAN_2 system determining that user 132 is not heavily focusing upon any on-screen content of his CPU (e.g., 132*a*) at this time and therefore this would likely be a good time to push an unsolicited usage survey or favor request on user 132.

The unsolicited usage survey push begins at step 172. Dashed logical connection 172*a* points to a possible survey dialog box 182 that might then be displayed to user 132 as part of step 172. The illustrated content of dialog box 182 may provide one or more conventional control buttons such as a virtual pushbutton 182*b* for allowing the user 132 to quickly respond to the pushed (e.g., popped up) survey proposal 182. Reference numbers like 182*b* do not appear in the popped-up survey dialog box 182. Embracing hyphens like the ones around reference number 182*b* (e.g., "-182*b*-") indicate that it is a nondisplayed reference numbers. A same use of embracing hyphens is used in other illustrations herein of display content to indicate nondisplay thereof.

More specifically, introduction information 182*a* of dialog box 182 informs the user of what he is being asked to do. Pushbutton 182*b* allows the user to respond affirmatively in a general way. However, if the STAN_2 has detected that the user is currently using a particular content site (e.g., Face- Book™, MySpace™, LinkedIn™, etc.) more heavily than others, the popped-up dialog box 182 may provide a suggestive and more specific answer option 182e for the user whereby the user will not have to push a sequence of numerous answer buttons to navigate to his desired conclusion. If the user does not want to be now bothered, he can click on (or otherwise activate) the Not-Now button 182c. In response to this, the STAN_2 system will understand that it guessed wrong on user 132 being in an idle mode and thus ready to participate in such a survey. The STAN_2 system will adaptively alter its survey option algorithms for user 132 so as to better guess when in the future (through a series of trials and errors) it is better to bother user 132 with such pushed (unsolicited) surveys. Pressing of the Not-Now button 182c does not mean user 132 never wants to be queried about such information, just not now. The task is rescheduled for a later time. User 132 may alternatively press the Remind-me-via-email button 182d. In the latter case, the STAN_2 system will automatically send an email to a pre-selected email account of user 132 inviting him to engage in the same survey (182, 183) at a time of his choosing. The More-Options button 182g provides user 132 with more action options and/or more information. The other social networking (SN) button 182f is similar to 182e but guesses as to an alternate network account which user 132 might now want to share information about. In one embodiment, each of the more-specific affirmation (OK) buttons 182e and 182f includes a user modifiable options section 182s. More specifically, when a user affirms (OK) that he or she wants to let the STAN_2 system import data from the user's FaceBook™ account(s) or other external platform account(s), the user may simultaneously wish to agree to permit the STAN_2 system to automatically export (in response to import requests from those identified external accounts) some or all of shareable data from the user's STAN_2 account(s). In other words, it is conceivable that in the future, external platforms such as FaceBook™, MySpace™, LinkedIn™, GoogleWave™, GoogleBuzz™, Google Social Search™, FriendFeed™, blogs, ClearSpring™, YahooPulse™, Friendster™, Bebo™, etc. might evolve so as to automatically seek cross-pollination data from the STAN_2 system and by future agreements such is made legally possible. In that case, the STAN_2 user might wish to leave the illustrated default of "2-way Sharing is OK" as is. Alternatively, the user may activate the options scroll down sub-button within area 182s of OK virtual button 182e and pick another option (e.g., "2-way Sharing NOT OK"—option not shown).

If in step 172 the user agreed to now being questioned, then step 173 is next executed. Otherwise, process 170 is exited in accordance with an exit option chosen by the user in step 172. As seen in the next popped-up and corresponding dialog box 183, the user is again given some introductory information 183a about what is happening in this proposed dialog box 183. Data entry box 183b asks the user for his user-name as used in the identified outside account. A default answer may be displayed such as the user-name (e.g., "Tom") that user 132 uses when logging into the STAN_2 system. Data entry box 183c asks the user for his user-password as used in the identified outside account. The default answer may indicate that filling in this information is optional. In one embodiment, one or both of entry boxes 183b, 183c may be automatically pre-filled by identification data automatically obtained from the encodings acquisition mechanism of the user's local data processing device. For example a built-in webcam automatically recognizes his/her face, a built-in audio pick-up automatically recognizes his/ her voice and/or a built-in wireless key detector automatically recognizes presence of the user possessed key device whereby manual entry of the user name and/or password is not necessary and step 173 can be performed automatically without the user's awareness. Pressing button 183e provides the user with additional information and/or optional actions. Pressing button 183d returns the user to the previous dialog box (182). In one embodiment, if the user provides the STAN_2 system with his password (183c), an additional pop-up window asks the user to give STAN_2 some time (e.g., 24 hours) before changing his password and then advices him to change his password thereafter for his protection.

Although interfacing between the user and the STAN_2 system is shown illustratively as a series of dialog boxes like 182 and 183 it is within the contemplation of this disclosure that various other kinds of control interfacing may be used to query the user and that the selected control interfacing may depend on user context at the time. For example, if the user (e.g., 132) is currently focusing upon a SecondLife™ environment in which he is represented by an animated avatar, it may be more appropriate for the STAN_2 system to present itself as a survey-taking avatar (e.g., a uniformed NPC with a clipboard) who approaches the user's avatar and presents these inquiries in accordance with that motif. On the other hand, if the user (e.g., 132) is currently interfacing with his CPU (e.g., 132a) by using a mostly audio interface (e.g., a BlueTooth™ microphone and earpiece), it may be more appropriate for the STAN_2 system to present itself as a survey-taking voice entity that presents its inquiries (if possible) in accordance with that predominantly audio motif, and so on.

If in step 173 the user provided one or more of the requested items of information (e.g., 183b, 183c), then in subsequent step 174 the obtained information is automatically stored into an aliases tracking portion (e.g., record(s)) of the system database (DB 119). An exemplary DB record structure is shown at 184. For each entered data column, the top row identifies the associated SN or other content providing platform (e.g., FaceBook™, MySpace™, LinkedIn™, etc.). The second row provides the username or other alias used by the queried user (e.g., 132) when logged into that platform (or presenting himself otherwise on that platform). The third row provides the user password and/or other security key used by the queried user (e.g., 132) when logging into that platform (or presenting himself otherwise for validate recognition on that platform). Since providing passwords is optional in data entry box 183c, some of the password entries in DB record structure 184 are recorded as not-available (N/A) this indicating the user (e.g., 132) chose not to share this information. As an optional substep in step 173, the STAN_2 system 110 may first grab the user-provided username (and optional password) and test these for validity by automatically presenting them for verification to the associated outside platform (e.g., FaceBook™, MySpace™, LinkedIn™, etc.). If the outside platform responds that no such username and/or password is valid on that outside platform, the STAN_2 system 110 flags an error condition to the user and does not execute step 174. Although exemplary record 184 is shown to have only 3 rows of data entries, it is within the contemplation of the disclosure to include further rows with additional entries such as, alternate UsrNm and password (optional) used on the same platform, user name of best friend(s) on the same platform, user names of currently being "followed" influential personas on the same platform, and so on.

In next step 175, the STAN_2 system uses the obtained username (and optional password and optional other information) for locating and beginning to access the user's local and/or online (remote) friend, buddy, contacts, etc. lists (132L, 132R). The user may not want to have all of this contact information imported into the STAN_2 system for any of a variety of reasons. After having initially scanned the available contact information and how it is grouped or otherwise organized in the external storage locations, in next step 176 the STAN_2 system presents a set of import permission options to the user, including the option of importing all, importing none and importing a more specific and user specified subset of what was found to be available. The user makes his selection(s) and then in next step 177, the STAN_2 system imports the user-approved portions of the externally available contact information into a STAN_2 data storage area (not shown). The STAN_2 system checks for duplicates and removes these.

Then in step 178 the STAN_2 system converts the imported external contacts data into formats that conform to data structures used within the External STAN Profile records (131$p2$, 132$p2$) for that user. With completion of step 178 for each STAN_2 registered user (e.g., 131, 132) who has allowed for external contacts information to be imported, the STAN_2 system 110 can now automatically inform that user of when his friends, buddies, contacts, best friends, followed influential people, etc. as named in external sites are already present within or are being co-invited to join a chat opportunity such as 315$b$ and 315$c$ in below described FIG. 3A. This kind of additional information (e.g., displayed as 315$b1$ and 315$c1$ and 315$d1$ in FIG. 3A) may be helpful to the user (e.g., 132) in determining whether or not he wishes to accept a given In-STAN-Vitation™ (e.g., a STAN-provided content source recommendation like 315$b$ and/or 315$c$) to view a recommended content source and/or to save (e.g., into 336) some associated data of that given In-STAN-Vitation™. Additionally, the External STAN Profile records (131$p2$, 132$p2$) for the corresponding user (e.g., 132) can now be used as part of the co-compatibility and desirability analysis when the STAN_2 system is automatically determining in the background the rankings of chat or other connect-to opportunities that STAN_2 system might be recommending to the user for example in the opportunities banner area 315 of the display screen 300 shown in FIG. 3A (which area 315 is incidentally optionally out-and-in scrollable as an opaque or shadow shade—described below) based on the monitored activities (e.g., as reported by up- or in-loaded CFi's) of the user in for example, open windows 317 (the user's FaceBook™ account data), 330$a$ (the user's research results from using the GoogleWave™ tool) and 330$d$ (the user's research results from using the Google-Goggles™ tool).

When the STAN_2 system 110 is processing various ones of possible connect-to recommendations (e.g., chat opportunities like 315$b$) in the background to thereby determine which connect-to recommendations should be ranked as highest priority for recommending to the user and which as lower ranked and thus perhaps not even presented, recommendations to the user, the STAN_2 system may be generating ranking scores based on data provided in: (a) the user's Current Personality-based Chat Compatibility profiles (CpCCp's, as described in conjunction with giF. 1B of the STAN_1 application); (b) the user's Domain Specific Current Chat compatibility Profiles (DsCCp's, as described in conjunction with giF. 1C of the STAN_1 application); (c) the user's Personal Emotion Expression Profile (PEEP, as described in conjunction with giF. 1E of the STAN_1 application); and (d) the user's Current Focus Indicators (CFi's, as described in conjunction with giFs. 2A and 3C of the STAN_1 application). The STAN_2 system 110 may be cross-correlating data and/or preference rules extracted from such CpCCp's (a), DsCCp's (b), PEEP's (c), CFi's (d) with attributes and/or joinder rules of possibly matching topic nodes (such node 450' of giF. 3C) and/or on-topic chat rooms as defined within the STAN_2 system's topics tree (115 of FIG. 1A of this application, see also 215 of FIG. 2). In one embodiment, the automated cross-correlating and automated recommendation making rules of the STAN_2 system include rules (where these rules are configured for use by corresponding rule-driven knowledge base algorithms) that are selectively activated if the user has corresponding data contained in the user's External STAN Profile record (e.g., 131$p2$, 132$p2$).

One default, but over-rideable, knowledge base rule might say: IF user's External STAN Profile record exists and includes imported FaceBook™ friends AND topic node under consideration has at least one such friend connected to that topic node THEN increase compatibility score of that topic node by +1, and IF the topic node under consideration has at least three such friends now connected to that topic node THEN increase compatibility score of that topic node by an additional +3. In other words, by default, the STAN_2 system 110 automatically begins to give greater preference toward recommending connect-to opportunities (e.g., on-topic chat rooms) if the user's external site "friends" (and better yet, "best friends") are already connected to the content source that is being considered as a connect-to recommendation.

In one embodiment, premium subscription users of the STAN_2 system 110 are allowed to override the default external friends rules with specific rules of their choosing or creation. It may be that a given user prefers not to be connected to (or given the recommendation to do so) to a content source (e.g., an online chat room) in accordance with a user provided exception rule such as: IF Topic=Vacation Plans AND Contacts already connected to potential content source (e.g., chat room) include LinkedIn™ contacts THEN add −5 to Recommendation Score. In other words, for a certain topic and/or if certain people are already at the target site (e.g., chat room), this user prefers to not connect to that site and/or not to have that content source recommended to him by the STAN_2 system. Specialized knowledge base rules that use data from the user's External STAN Profile record may be incorporated within the STAN_2 system into: (a) the user's Current Personality-based Chat Compatibility profiles (CpCCp's, see 175 of giF. 1B); (b) the user's Domain Specific Current Chat compatibility Profiles (DsCCp's, see 195 of giF. 1C); and (c) the user's Personal Emotion Expression Profile (PEEP, see 199 of giF. 1E but add to it a friend-related rule such as: IF Ken54 (TPP) is present THEN increase Gladness by +5). (Here, TPP stands for influential Tipping Point Persona as shall be better explained immediately below.)

Figure 3A:
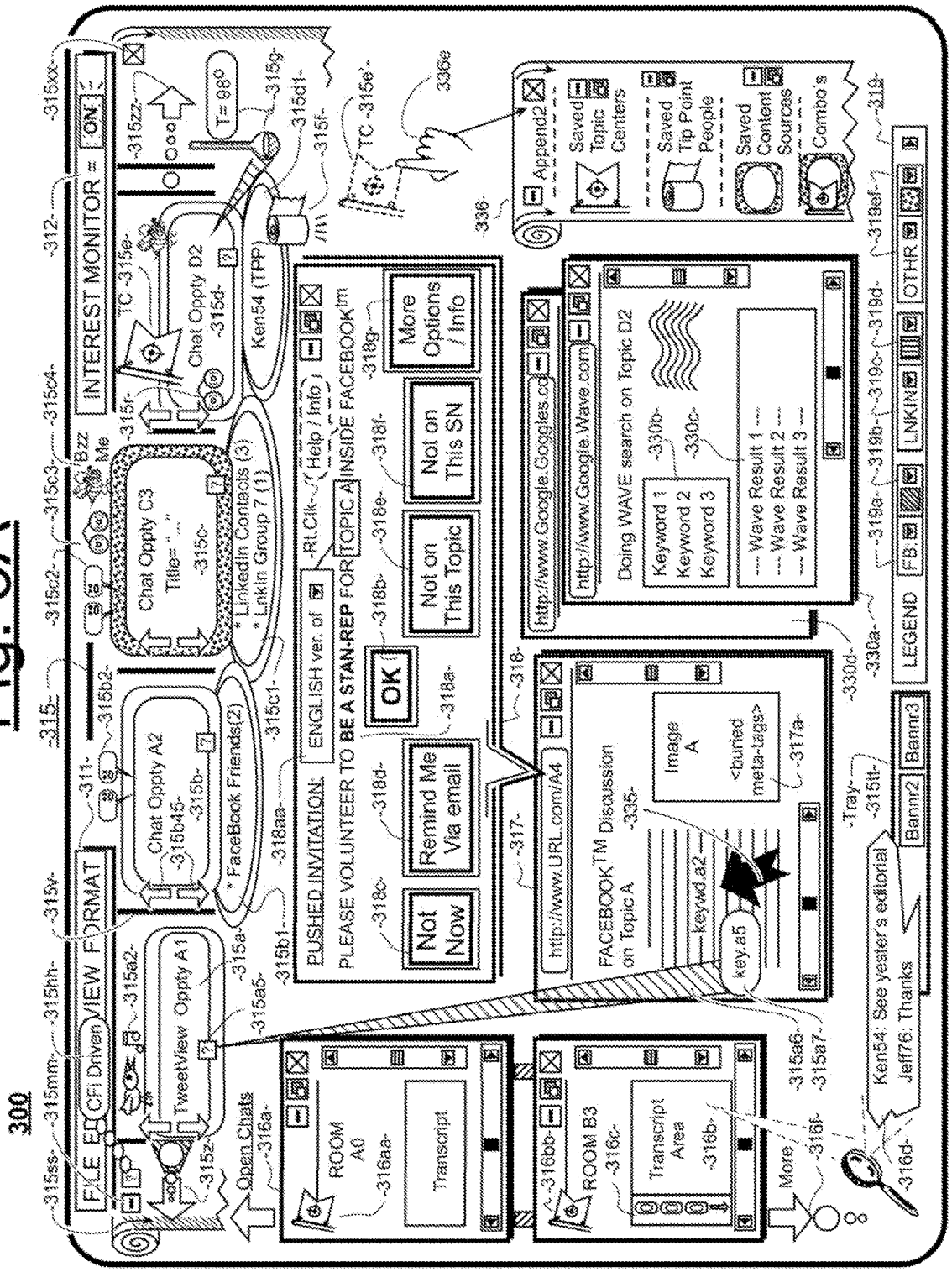
FIG. 3A is a diagram showing a drag-and-drop operation and also showing one possible on-screen presentation whereby a live user is invited to enlist as a cross-pollinating un-artificial persona (CPUP) at times when this CPUP will be using an external SN system while his focus is not being tracked in real time by the STAN_2 sub-network system.

In one embodiment, premium subscription users of the STAN_2 system are allowed to categorize their imported friends or other contacts, as for example, "Tipping Point" Personalities (TPP's) and more specifically, categorized as "Tipping Point" Early Adapter/Salesman, "Tipping Point" Maven and "Tipping Point" Influential Connector in conformance with for example with the book, "The Tipping Point: How Little Things Can Make a Big Difference" (ISBN 0-316-31696-2) by Malcolm Gladwell, whose concepts are incorporated herein by reference. As explained in the book, "Tipping Point" people can be critical to getting an emerging meme to take root and there are different categories of "Tipping Point" people: Salesmen, Mavens, and Connectors. By categorizing their imported friends using a categorizing function like this of the STAN_2 system 110, users enable the STAN_2 system to specially flag out such people with a TP icon (e.g., the flashing Toilet Paper icon at 315*f* in FIG. 3A). Such system flagging of a given person as being a recognized TPP may be based on consensus voting by numerous users instead of, or in addition to such designation by an individual user. Consensus-wise elected TPP's may be specially flagged out as sTPP's (super Tipping Point persons). Then if a user spots such a TPP-indicating icon (315*f*) or an sTTP-indicating icon (not shown), the user can elect to drag and drop an attribute of the Connect-to Recommendation (e.g., of Chat Opportunity 315*d*) into a Favorites or Saved attributes list (e.g., 336 of FIG. 3A). In one embodiment, the savable attributes include one or more of: (a) a link to the topic node (also called Topic Center or TC) that is associated with the Connect-to Recommendation; (b) an identification of another user such as a "Tipping Point" person 315*f* displayed in associated with the Connect-to Recommendation; and (c) a link to the content source (e.g., Chat Room D2—not shown but to be popped open if user double clicks on center area of 315*d*) that the Connect-to Recommendation (e.g., Chat Opportunity 315*d*) is recommending. In the example of FIG. 3A, the user is shown at 315*e*' to be using his mouse (having counterpart hand icon 336*e*) to drag and drop a copy of TC flag 315*e* into the Saved Topic Centers area of scrollable list 336. The user could have instead dragged and dropped a copy of TP icon 315*f* or a copy of the Chat Opportunity border to list 336. More will be said on this when FIG. 3A is discussed in yet further detail.

Incidentally, "Tipping Point" Personalities (TPP's and sTPP's) are a nonlimiting example of personas who may be logically linked to a given chat room (e.g., pointed to by 315*d*) or to another form of recommended content source (e.g., a blog, a listserve, etc.) and/or who may be logically linked to a given topic center (TC) and/or to a given TCONE (topic center owned note exchange). Depending on topic and context, consensus-wise elected authors of publications (e.g., peer reviewed publications), lecturers (e.g., college professors), expert witnesses (e.g., those who have testified in courtroom cases) and so on (including medical professional who specialize for example in esoteric diseases) may be so logically linked to a TC or TCONE within the STAN_2 system 110/210. One process that can usefully exploit such logical linking to TC's and/or TCONE's will be detailed when bounce back operation 229*c* of the FIG. 2 is explained below. Briefly, in one example, a general practice physician who is trying to diagnose a patient with an unusual set of symptoms navigates to a medicine-related topic center (TC), retrieves identifications of topic center noted experts and then contacts the experts in hopes of obtaining from them directly-on-topic advice about the unusual set of symptoms.

Referring again to FIG. 1B, after an external list of friends, buddies, contacts and/or the alike have been imported for a first external social networking (SN) platform (e.g., FaceBook™) and the imported contact identifications have been optionally categorized (e.g., as TPP's and/or other), the process can be repeated for other external content resources (e.g., MySpace™, LinkedIn™, etc.). As a last step 179*a* before exiting process 170 for each external resource, in one embodiment, the user is asked to schedule an updating task for later updating the imported information. Alternatively, the STAN_2 system automatically schedules such an information update task. In yet another variation, the STAN_2 system alternatively or additionally, provides the user with a list of possible triggering events that may be used to trigger an update attempt at the time of the triggering event. Possible triggering events may include, but are not limited to, detection of idle time by the user, detection of the user registering into a new external platform (e.g., as confirmed in the user's email—i.e. "Thank you for registering into platform XP2, please record these as your new username and password . . . "); detection of the user making a major change to one of his external platform accounts (e.g., again flagged by a STAN_2 accessible email that says—i.e. "The following changes to your account settings have been submitted. Please confirm it was you who requested them . . . "). When a combination of plural event triggers are requested such as account setting change and user idle mode, the user idle mode may be detected with use of a user watching webcam as well as optional temperature sensing of the user wherein the user is detected to be leaning back, not inputting via a user interface device for a predefined number of seconds and cooling off after an intense session with his machine system. Of course, the user can also actively request initiation (171) of an update. The information update task may be used to add data (e.g., user name and password in 184) for newly registered into external platforms and new, nonduplicate contacts that were not present previously, to delete undesired contacts and/or to recategorize various friends, buddies, contacts and/or the alike as different kinds of "Tipping Point" persons (TPP's) and/or as other kinds of noteworthy personas. The process then ends at step 179*b* but may be re-begun at step 171 for yet a another external content source when the STAN_2 system 110 determines that the user is probably in an idle mode and is probably willing to accept such a pushed survey 182.

Referring again to FIG. 1A, it may now be appreciated how some of the major associations 111-114 can be enhanced by having the STAN_2 system 110 cooperatively interacting with external platforms (120, 141, etc.) by, for example, importing external contact lists of those external platforms. More specifically, the user-to-user associations (U2U) 111 can be strengthened by virtue of a displayed window such as 300 of FIG. 3A being able to now alert the user as to when friends, buddies, contacts and/or the alike of an external platform (e.g., 141, 144) are already associated with a displayed Connect-to Recommendation (e.g., 315*b*, 315*c* of FIG. 3A). The user-to-topic associations (U2T) 112 can be strengthened by virtue of a displayed window such as 300 of FIG. 3A being able to now show the viewing user how certain influential individuals (e.g., Ken54 TPP) are associated with a specific topic center (e.g., TC 315*e*) due to their being associated with a Connect-to Recommendation (e.g., 315*d*) that comes under the flag (315*e*) of that topic center (e.g., TC 315*e*).

Referring next to FIG. 2, it will now be explained from a different perspective how cross-pollination actions instigated by the STAN_2 system 110 can work to enhance (enhancement shown as action 121) user-to-user associations (U2U, 111), to enhance (122) user-to-topic associations (U2T, 112), to expand/evolve (123) topic-to-topic associations (T2T, 113), and to expand/evolve (124) topic-to-content associations (T2C, 114). Two platforms, 210 and 220 are respectively represented in the multiplatform space 200 of FIG. 2. A first of the platforms, 210 (corresponding to 110 of FIG. 1A) is schematically represented as a 3-dimensional lower prismatic structure having a respective 3D axis frame 210*xyz*. A second of the platforms, 220 (corresponding to 120 of FIG. 1A) is schematically represented as a 2-dimensional upper planar structure having respective 2D axis frame 220xy. Each of the first and second platforms, 210 and 220 is shown to respectively have a compilation-of-users-of-the-platform space, 211 and 221; and a messaging-rings supporting space, 215 and 225 respectively.

The planar first platform 220 will be described first because it follows a conventional approach such as that of FaceBook™ and LinkedIn™ for example. Assume first that the upper messaging-rings supporting space, 225 of platform 220 is completely empty (it has no rings like 226). A single circle-creating user 203 starts things going by launching (for example in a figurative boat 205) a nascent discussion proposal 206 from space 221 into space 225. In the LinkedIn™ environment this is known as simply starting a discussion by attaching a headline message to it (example: "What do you think about what the President said today?") and pushing it (206 in its outward bound boat 205) out into the then empty space 225 where it can be seen by other members (e.g., 222) of a predefined Discussion Group 224. The launched discussion proposal 206 transforms into a fixedly attached child ring 226 of parent node 226p (attached with linking branch 227), where 226p is merely an identifier of the Discussion Group but does not have message exchange rings like 226 inside of it. Typically, child rings like 226 attach to growing branch 227 according to date of attachment. The LinkedIn™ platform will thus have proposed discussions posted thereon according to date and ID of its launcher (e.g., posted 5 days ago by discussion leader Jones).

At this stage the launched and attached discussion proposal 226 has only one member of the discussion group 224 associated with it, namely, its single launcher 203. If no one else (e.g., a friend, a discussion group co-member) joins into that solo-launched discussion proposal 226, it remains empty and just sits there, aging at its attached position along growing branch 227 and under parent node 226p. On the other hand, if another member 222 of the discussion group 224 jumps into (228) the affixed discussion proposal 226 (e.g., "What do you think about what the President said today?") by posting a responsive comment inside that ring 226, for example, "Oh, I think what the President said today was good.", then the discussion has begun. The discussion launcher/leader 203 may post a counter comment or other members of the discussion group 224 may also jump in and add their comments. Irrespective of how many other members of the discussion group 224 jump into the ring 226 or later leave the ring 226, that ring 226 stays affixed to the parent node 226p in the historical position where it originally attached. Some discussion rings in LinkedIn™ can grow to have hundreds of comments and a like number of members commenting therein. Other launched discussion rings (206) of LinkedIn™ may remain forever empty while still remaining affixed to the parent node in their historical position and having only the one discussion launcher 203 logically linked to that otherwise empty discussion ring.

It is to be understood that not all discussion group rings like 226 need to be carried out in a single common language such as lay-person's English. It is quite possible that some discussion groups conduct their internal exchanges in respective other languages such as, but not limited to, German, French, Italian, Swedish, Japanese, Chinese or Korean. It is also possible that some discussion groups have members who are multilingual and thus conduct internal exchanges within certain discussion groups with mixed use of several languages, for example, throwing in French or German loan phrases (e.g., Schadenfreude) into a mostly English discourse where no English word quite suffices. It is also possible that some discussion group keywords are of a mixed or alternate language type. It is also possible that some discussion groups have members who are experts in certain esoteric arts (e.g., patent law, computer science, medicine, economics, etc.) and use art-based jargon that lay persons not skilled in such arts would not normally understand or use.

The birth (instantiation) in the lower platform space 210 (corresponding to the STAN_2 system 110) of a messaging ring (irrespective of whether its discourse is to be conducted in lay English, French or mixed languages or specialized jargon) is often (there are exceptions) a substantially different affair. Firstly, a nascent messaging ring 208 is generally not launched by only one member of platform 210 but rather by at least two such members 207 (assumed to both be ordinary-English speaking in this example). In other words, at the time of launch (of figurative boat 205') the two or more launchers 207 of the nascent messaging ring 208 have already agreed to enter into an ordinary-English based discussion (or another form of "Notes Exchange" which is the NE suffix of the TCONE acronym) within ring 208. Accordingly, as a general rule, ring 208 never launches with a solo-rower and as a having-no-joined other members-therein ring, as its boat (205') floats into the messaging-rings supporting space 215 of platform 220. Instead and as a general proposition herein (there could be exceptions such as if one launcher immediately drops out for example or when a credentialed expert launches a course-to-be taught ring), each nascent messaging ring like 208 enters a corresponding ring-supporting and mapping (e.g., indexing) space 215 while already having at least two members joined in discussion (or in another form of mutually understandable "Notes Exchange") therein as its figurative boat 205' sets temporary anchor in a not-fixed floating position within the topics supporting space 215 of platform 220. Discussion about how an initially launched (instantiated) and anchored (moored) Social Notes Exchange (SNE) can become a drifting one that swings from one anchoring node (TC) to a next, in other words, it become a dSNE 216d will be provided shortly.

First however, it is to be observed that the birth of a messaging ring (e.g., 208) in the lower platform space 210 not only often involves at least two joined launchers 207 (typically using a common and mutually understood exchange language, e.g., lay person's English) but also that it involves the attachment of a temporary topic center flag 209 to the launched boat 205'. It is the two or more joined launchers 207 who initially decide (directly or indirectly; consciously or subconsciously) what the initial "topic" of their jointly launched messaging ring 208 will be. The launched messaging ring 208 is not necessarily married for life to one or more of its birthing launchers. All the initial launchers can abandon ship (so to speak) and other STAN_2 members can jump onboard and take control as new captains over the drift direction of that already launched messaging ring 208. This too will be explained shortly. In one embodiment, each discussion ring (a.k.a. TCONE) within topic space 215 is recorded by the STAN_2 system as having a named set of birthing launchers (e.g., 207) and first anchored position (birth place), a named set of current anchor-controlling members (a.k.a. current captains, can be same 207 or different members) with corresponding current anchored-to position or positions, and a named set of currently most influential mutineers who wish to drift the boat so it becomes more so anchored (tethered) to one or more new positions (different TC's). These respective birthers (207), current captains and rebels (those seeking change of course and/or mooring points) can be identified in many other ways besides by their user names (e.g., by STAN_2 issued unique user identification numbers). Stated otherwise, each TCONE is tracked where the tracking records store the identifications of two or more of its initial parents and initial one or more anchoring positions in topic space 215, identifications of one or more of its current captains and current anchoring positions in topic space (plus optionally, current drift direction) and identifications of one or more of its want-to-be-new captains and their desired new anchoring position(s) in topic space (plus optionally, new drift direction).

It is assumed that when original launchers 207 first join in a Notes Exchange session (or are invited by STAN_2 to do so), each launcher has a respective, on-topic thought pattern (207*a* and 207*b* respectively, and not necessarily expressed verbally and/or visually) in his her mind. The on-topic portion of the thought pattern (207*a* or 207*b*) may be subconscious or conscious or both. Each launcher is understood to "encode" his respective on-topic thought pattern(s) (207*a* and 207*b*) with a corresponding one or more topic-directed and objectively detectable "encodings" (207*aa* and 207*bb* respectively). A nonlimiting example of such encodings may be a respective keyword proposed by each launcher for what the topic is "about". More specifically, launcher-A might first say, 'I think the keyword for our shared topic is Apples' while launcher-B might first say, 'I think the keyword for our shared topic is Oranges' and thereafter they may agree that a better set of keywords for defining the topic of their mutually launched TCONE (208) is 'Apples, Oranges and like fruit'. Later, if the instantiated boat is taken over by new captains, they may redefine what topic(s) the launched boat most closely is tethered to as being 'all fruit'. This of course, is a relatively simplistic example. If the boat's topic is switched to 'all fruit', the machine-implemented definition of what topic node(s) the boat is now tethered to may jump up a level in a hierarchical topic tree where 'Apples' and 'Oranges' are two discrete topic nodes that are children of broader and thus parent, "All Fruits" topic node.

Keyword-based encoding of the topic definition (as agreed to implicitly or explicitly by discussion boat launchers 207) is but one of many options. Another for—example could be pictures or sounds. Launcher-A might first explicitly or implicitly indicate (e.g., through his up- or inloaded CFi's): 'I think attached image-A and SoundTrack-A best represent our common topic'. On the other hand, Launcher-B might first explicitly or implicitly indicate: 'No, I think attached image-B and SoundTrack-C best represent our common topic'. As indicated, the encodings of the on-topic thought patterns may be generated consciously, subconsciously or by both ways. Uploaded (or in-loaded) CFi's and CVi's from TCONE members who currently control topic definition may be combined (through a voting process or otherwise) to implicitly indicate the consensus topic definition. More generally speaking, topic defining and/or topic-directed "encodings" (207*aa* and 207*bb*) may be expressed in the form of any one or more encoded (and thus storable and transmittable) expression-representing signals including, but not limited to, on-topic keywords; on-topic tags; on-topic meta-tags; on-topic graphic images; on-topic whole or partial content pointed to by a URL; on-topic sound tracks; on-topic haptics (e.g., tactile sensations) on-topic kinesics (e.g., muscles tensings), on-topic olfactics (e.g., smells, tastes as detected and characterized by standardized chemical sniffing or tasting devices), identifications of key (e.g., famous) persons associated with the topic and their association to it, hyper-links to the foregoing, and so on. As already explained in the here incorporated STAN_1 application, up- or in-loaded CFi's and CVi's may be used to automatically convey these various expressible encodings to an automated encodings-weighting and encodings-processing device that then automatically defines the probable "initial topic" for each launcher (of respective thought patterns 207*a*, 207*b*) based on predetermined profiles (e.g., CpCCp's, DsCCp's) of the respective launchers 207. Often there will be at least one or more common encodings (207*cc*) that are shared by the launchers 207 (e.g., "fruit") because, for example, they both encoded with a same keyword and/or a same tag/meta-tag and/or by emotively focusing on same whole or partial content (e.g., an image of a fruit store) pointed to by a common URL or equivalent URL's pointing to similar content or because their respective but different encodings (207*a*, 207*b*) nonetheless logically group under a same encompassing other encoding 207*dd* (e.g., apples and oranges are fruit) where the definition of the encompassing encoding (e.g., fruit) and its encompassed sub-encodings (e.g., apples, oranges, bananas) is stored in DB 119, maintained therein (automatically updated) and automatically consulted by the STAN_2 system 220. The preceding are non-limiting examples. The STAN_2 system 210 can use the common encodings 207*cc* and/or its own logical linked and augmenting-wise provided and/or encompassing encoding(s) 207*dd* to automatically determine where in topic space 215 the initially launched topic 209 initially should be tethered to.

Yet another example of not-just-keyword-based encoding of topic definition may play out like this. A first jazz musician is sitting at his music keyboard in a New Orleans Cajun restaurant (he's getting ready for tonight's show) and taking in the sights, sounds, smells (e.g., cooking smells) and tastes (e.g., nibbling on a Cajun dish before him) of his environment and because of that he gets a notion for a new variation on a jazz musical score he had been collaborating with a friend across town. He calls up his friend using his newest convergence type palm-held data processing device (in the nature of an advanced iPhone™, Android™ device) and says, 'Turn on your sniff-onometer, I want you to feel this and help me out with this new musical idea I have'. His friend's convergence type palm-held or forearm worn data processing device has a standardized chemical sniffing/tasting device built into it (e.g., using MEMs style chemical detection technology) that outputs chemical composition detection and concentration signals similar to those of the first musician's device whereby, as the second musician moves around a Cajun kitchen he happens to work at, he can find a spot that smell-wise and/or taste-wise feels roughly the same as that of the first musician. This is so because the two convergence type palm-held data processing devices can upload respective chemical signature signals to a common and automated analysis and comparison machine system (e.g., included in one embodiment of the STAN_2 system 210) and the smell/taste analysis and comparison machine system can feedback indications of how far apart their surrounding smell/taste environments are. A high quality audio pick up on the first musician's palm-held or forearm worn data processing device relays the new music track he is playing to the sound output of the second musician's wireless device where the relay flows through the STAN_2 system (of this embodiment). At least one of the musicians has his STAN-monitoring control (like 312 of FIG. 3A) turned ON. This means that the STAN_2 system is monitoring the CFi's up or in-loaded from that at least one musician's and is looking for corresponding chat or other Notes Exchange sessions to recommend as being intuitively on-topic. The up or in-loaded CFi's include the sound tracks and sniff-onometer's output signals. The STAN_2 system automatically infers from the encodings (see again 207*aa*) it is receiving from the at least one being-monitored musician's device and from his personal profiles (e.g., DsCCp's) that his current on-mind topic is most likely experimental jazz and that he probably would like to share the on-topic experience with other co-compatible jazz musicians who are also currently being similarly monitored by the STAN_2 system. As a result, the STAN_2 system automatically finds a third jazz musician who is at the moment substantially on-topic (based on his up or in-loaded and possibly nonverbal encodings) with the first two jazz musicians and automatically makes a recommendation (e.g., like 315*d* of FIG. 3A) that they should virtually connect based on their current co-compatibilities as to topic and direction of its development. As a result, all three musicians collaborate and come up with a new music innovation.

It is to be understood that the above example of three collaborating musicians could instead have involved collaborating chefs whose convergence type palm-held or forearm worn data processing devices with standardized chemical sniffing/tasting devices built into them also had radiant temperature detectors as well as steam tolerant webcams so that the chefs can cross-exchange nonverbal notes about cooking temperatures, odors and visuals of their ongoing cooking efforts with one another on-the-fly and so that an embodiment of the STAN_2 system 210 can recommend online joinder with similarly situated other chefs, thereby providing for online meeting and collaboration based at least in part on nonverbal encodings. And of course, over-the-net jamming musicians and over-the-net collaboratively cooking chefs are but two examples of many other such cross-collaborations that can be instigated on the basis of nonverbal encodings (e.g., optionally within 207*aa* and 207*bb* of FIG. 2). Other examples of cross-collaborations that might be instigated by the STAN_2 system on the basis of non-verbal encodings may include: wine tasters, cigar smokers, bird watchers (who use long distance sound pickups) and clothing or other apparel buyers. In the case of clothing/apparel buyers, the specific textures (haptically detected and analyzed) of different cloths or other worn materials may be an important factor as well as possibly smells and visuals. Thus in the latter cases, their convergence type palm-held or forearm worn data processing devices with standardized chemical sniffing/tasting devices built into them may also have standardized texture detecting and reporting devices incorporated into them where the texture reporting signals are up or in-loaded into the STAN_2 system so that remote seekers of same or similar clothes and/or other apparels (e.g., shoes, purses, etc.) may compare their findings online with similarly interested, co-compatible and STAN_2 found users. The palm-held or forearm worn data processing devices may also include software means for deciphering 2D and/or 3D (e.g., holographic) bar codes and up or in-loading those to the STAN_2 system so that brand name products can be compared based on online specifications. More specifically, the scenario may play out like this. A shopaholic is out shopping at her favorite apparel store for a new sweater, blouse, shoes, etc. She finds something that appears to be of value but she is not sure about price and quality. Her iPhone™ like device has a cloth texture feeler and cloth chemicals sniffer. She uses an embodiment of the STAN_2 system to hook up (via chat room or otherwise) with a similar but remote shopaholic who is studying a similar item of similar texture, chemical off-gassing attributes and in roughly the same price range. They exchange notes and each decides based on those exchanged notes whether to buy her being-examined item. This is another example where spaced apart users of the STAN_2 system who may previously be strangers to one another can nonetheless find one another for mutually beneficial (e.g., mutually supportive) sharing of experience and of impressions about things that are of current interest to both (or all) of them.

Referring back to the TCONE-birthing parents 207 of FIG. 2 and for sake of simplicity, let it be assumed that launching parents 207 have agreed (by consensus, e.g., by means of commonly shared encodings 207*cc* and/or encompassing but STAN_2 provided encoding(s) 207*dd*) that their launched ring 208 should initially buoy itself (tether itself) to a pre-existing topic center 219*a* located as a "topic node" somewhere on a hierarchical topics tree data structure maintained in space 215 by the supporting platform 210 (where 210 can be 110 of FIG. 1A and where topic space 215 is defined by data records stored in database (DB) 119 of system 110). When their boat 205' arrives and anchors at topic center 219*a*, the launchers may be surprised to discover that there are other rings already moored to (tethered to), or stacked up along a Z-axis pole 219*a* of that topic space location. The launchers' ring 208 will be automatically stacked up by the STAN_2 system onto that shared Z-axis pole 219*a* along with other rings that have chosen for themselves (directly or indirectly) to anchor at that same "topic node". For sake of example, let us assume that the collectively defined topic of shared Z-axis pole 219*a* is: "What do you think about what the President said today?" (Common keywords or tags for this topic might include the words: U.S.A., President, speech and latest.) However, not all rings (216*a*) stacked up on Z-axis pole 219*a* are the same in their respective attributes. Some of the messaging rings (or "TCONEs" as they are alternatively here referred to) require all members inside that messaging ring to have a high degree of expertise in the subject matter that the President was talking about (let it be assumed to be foreign affairs). Such expertise demanding rings may be visualized as having relatively small diameters because only a rare few members qualify to enter into discussion within that ring (e.g., chat room). By contrast, others of the "topic center owned note exchanges" (TCONEs) 216*a* may have much looser restrictions on who can enter the ring (e.g., chat room) and participate in its discussion. The latter may be visualized as having relatively larger diameters because a larger number of members qualify to enter into discussion within those less restrictive rings.

The stacked collection of rings (TCONEs) 216*a* centered on the Za pole 219*a* (where such stacking implies that pole 219*a* is the controlling or primary tethering node for those rings) may be visualized as forming a 3D cone composed of removable hoops or rings of varying diameters. For any given Z-pole in topic space 215 there does not have to be a hoop at the Z=0 level and hoops may be disposed in negative Z territory as well as or in opposition to other hoops disposed in positive Z territory. More specifically and by way of example, hoops in positive Z territory may be constrained to discussion groups that lean one way politically and hoops in negative Z territory may be constrained to discussion groups that lean in an opposed direction politically. This is just an example. The stacked hoops do not have to form a cone shape (i.e. a single cone) in any given territory of the Z-axis. There could be cylinders, undulating forms and so on. It would have been convenient if the acronym, TCONE corresponded to the 3D cone shown at 219*a*. But it does not. The TCONE, or more fully, the Topic Center Owned Note Exchange ring, is just one Z-pole ringing hoop (or tethered thereto hoop) among a potentially large number of other such figurative hoops that are currently (but not necessarily permanently) primarily "owned" by the Topic Center (TC) 219a.

Because in the general case, the topic center Z-pole 219a can have a large number of primarily-owned TCONEs hooped onto it, the topic center Z-pole 219a can have a life of its own that becomes independent of the life of any one TCONE hooped around it. A topic center Z-pole 219a can start to "drift" in one direction on an XY plane of 3D axis 210xyz while one or a few (but not all) of its hoops (i.e. drift-apart hoop 216d) drift off in an opposed direction and attach more strongly to (tether to) other Z-poles. The mechanisms that make this possible are already spelled out in the here incorporated STAN_1 application and thus will not be repeated. The STAN_1 application described the phenomenon as akin to a Tarzan character using vines to swing from one tree to a next, where at one point in the swing the Tarzan character can of course simultaneously be holding onto the vines of two trees. Briefly and in more detail, members of an individual TCONE (e.g., a chat room) can vote to change the definition of topic of their individual TCONE (e.g., 216d). At the same time the collective members of a stack of TCONEs hooped around one topic center Z-pole 219a can collectively vote to change the definition of topic of their collectively hooped Z-pole 219a. Accordingly, a rogue individual TCONE (e.g., 216d) can drift off in one direction and the rest of the hooped Z-pole 219a can drift off in a different direction. In one embodiment, the controlling majority of members whose TCONEs are hooped around a given topic node (a.k.a. TC) such as that of Z-pole 219a can vote implicitly (e.g., with their CVi's) and/or explicitly so as to constantly and dynamically redefine how the topic of the TC is encoded (e.g., via its Top N keywords, its Top N' meta-tags, its Top P pointers (e.g., URL's) to on-topic content and so on).

In the STAN_2 system (as represented by lower space 210 of FIG. 2), a registered member (e.g., 212) can be In-STAN-Vitated™ to join a recommended one TCONE among the stack 216a of TCONEs hooped onto Z-pole 219a. Briefly, this is done in the embodiment 300 of FIG. 3A (detailed below) by the user double-clicking (opening up) on a banner-displayed TweetView-Opportunity glyph such as 315a, in which case a corresponding content displaying window like 316a opens up (could be a Tweet™ stream instead of a chat room transcript) and the invitation accepting user can then view content provided by, and/or can interact with the members already linked with the content of the newly-opened window 316a. This is an example of a STAN_2 member entering into the discussion ring of a given TCONE. (In one embodiment, each so-opened Notes Exchange session; e.g., Room A0 (316a), Room B3 (316b), has a topic center flag gadget (e.g., 316aa, 316bb respectively) attached to it and, as will be better detailed for flag gadget 315e below, activation of the TC flag gadget initiates navigation to a corresponding topic node in system topic space.) As indicated in exemplary banner 315, the opened Notes Exchange session can be a Tweet™ stream (315a), or an instant chat room (315b), or a blog commenting area (icon not shown in the recommendations banner area 315) or any other appropriate online mechanism by way of which members can exchange on-topic notes, data, pointers, etc. with one another in real time or over prolonged periods of time (e.g., in the sense for example of chess players exchanging next moves with one another by way of once-a-day emails). In one embodiment, prior to opening up a Notes Exchange session such as 316a (Room A0) by double clicking on a headline recommendation (e.g., 315a) of banner 315, the user may first actuate (e.g., by left clicking on it) an encoding inquiry tool portion of the recommendation (e.g., 315a) such as by actuating the boxed question mark tool 315a5 of headline recommendation area 315a. In response to this actuation, the user interface mechanism automatically presents an indication (e.g., connection flaring 315a6) of which, on-screen one or more keywords (e.g., 315a7), tags or other encodings are being deemed as being primarily representative of the topic of the correspondingly headlined TweetView-Opportunity (315a) or of the corresponding other such content source recommendation (e.g., 315b, 315c, 315d). In the illustrated example, actuation of the encoding inquiry tool 315a5 causes a color coded and translucent connection flaring 315a6 to be temporarily displayed while at the same time the corresponding on-screen encoding (e.g., keyword 315a7) is also highlighted (e.g., color reversed, or flashed or otherwise differentially flagged out). Release of depression of the mouse button and/or removal of the cursor from hovering over the encoding inquiry tool 315a5 causes the temporarily flared connection beam (315a6) to disappear and also the temporary flagging (315a7) of the corresponding encoding (e.g., key.a5) to be undone. In an alternate embodiment, the temporarily flared connection beam 315a6 is not presented and instead only the corresponding encoding (e.g., key.a5) is temporarily flagged out (315a7). In the same or an alternate embodiment, depressing the keyboard Control key while hovering over any boxed question mark tool (like 315a5 of glyph 315a) of any of the presented content source recommendations (e.g., 315b, 315c, 315d) causes differently colored connection beams (like 315a6) from all the respective recommendation glyphs to extend from those glyphs to all corresponding topic-related encodings then present on the screen. Thus a user can quickly tell, if he wants to, which on-screen encodings (e.g., keywords, tags, images, etc.) belong to a given one or more of the then presented recommendations (e.g., 315a, 315b, 315c, 315d).

It is also within the contemplation of the present disclosure to have the logical link between a given encoding and a corresponding one or more recommendation glyphs (e.g., 315a, 315b, 315c, 315d) temporarily light up (e.g., with use of a reverse flaring beam like 315a6) when the user hovers the cursor (335) over a selected and potential encoding (e.g., 315a7) and the user hits a predefined hot keys combination. If the suspected encoding (e.g. key.a5) is indeed logically linked to one or more of the then displayed recommendation glyphs (e.g., 315a) the suspected encoding becomes temporarily flagged out (e.g., with flag out mechanism 315a7) and the reverse connection beam (like 315a6) flares from the suspected encoding to the correlated recommendation glyphs (e.g., 315a). If the suspected encoding (e.g. key.a5) is not logically linked to any of the recommendation glyphs then basically nothing happens (the user's compute may however sound a failure bell tone). Logical linkage between a suspected encoding (e.g. key.a5) and its corresponding recommendation glyphs (e.g., 315a, 315b, 315c, 315d) may be temporarily indicated in a variety of other ways including a case where the reverse flaring beam (like 315a6) is not displayed.

In one embodiment, the nature and type of each Notes-Exchange that is being recommended in the recommendations banner area 315 (an optionally scrollable area) of FIG. 3A is indicated by a showing of a given title (e.g., as shown in 315c) for the corresponding content and by showing of an appropriate Notes Exchange session-type indicating icon. For example, an icon showing a singing bird 315a2 may be displayed as attached to the Tweet™ recommending area 315*a* to intuitively indicate to the user that this recommended content source points to a Tweet™ or to a stream of on-topic Tweets. By way of another example, a pair of talking balloon heads 315*b*2 may be displayed as attached to the chat room recommending area 315*b* to intuitively indicate to the user that this content source recommendation 315*b* logically links to a corresponding on-topic chat room (which room will be automatically opened and displayed in side area 316*a*-316*f* of the screen if the user double clicks on recommendation providing area 315*b*). In one embodiment, a wide variety of intuitive type-of-source indicators and gadget icons may be displayed as being attached to a corresponding content source recommendation glyph. For example, source recommendation glyph 315*c* is shown to have the talking balloon heads 315*c*2 attached to it as well as a transcript recording gadget 315*c*3 and a BuZZ-Me gadget 315*c*4. Moreover, source recommendation glyph 315*d* is shown to have TC gadget 315*e* attached to it as well as transcript recording gadget 315*r* and temperature-indicating gadget 315*g* and a TP flag 315*f*. Some of these indicators or gadgets have been described above and some may be described in more detail below. Displaying all indicators or gadgets at once can create undesired clutter in the recommendations banner area 315. Accordingly, in one embodiment, the user is given access to a banner display options menu (not shown) through which the user can specify which indicators or gadgets are to be displayed and if so, in what manner (e.g., large icons, small icons, with or without text labels, with or without unique color codings, etc.). In one embodiment, when the user hovers his cursor (e.g., 335) over, or right clicks on the desired source recommending (source headlining) glyph (e.g., 315*b*, 315*c*, 315*d*), one of the options displayed to the user is that of controlling settings for all, or specific types of source recommending glyphs where the settings specify what indicators or gadgets will be displayed by default for that type and if so, in what manner. Another option is that of now showing all indicators or gadgets for the hovered-over or right-clicked on recommendation glyph as being attached to that glyph or alternatively displayed in a sideline frame (not shown).

In the illustrated example of the recommendations-providing banner 315, the banner is organized like a top-headlines showing, multi-column newspaper (e.g., a four column headlined format in the case of FIG. 3A) where a headlining having the implied message of "click-here-to-read-more" is provided in the displayed horizontally extending area of banner 315 in the form of a limited number of currently hottest and headlined recommendations (e.g., the four shown respectively at 315*a*, 315*b*, 315*c*, 315*d*). Banner 315 acts as a sort of hottest-now radar screen that lets the user know what additional Notes Exchange sessions (besides the sessions already popped open on his main screen, e.g., at 316*a*, 316*b*, 317) the user might want to take a look at because those additional Notes Exchange sessions (a.k.a. in one form as chat opportunities) are now deemed by the STAN_2 system to be on-topic with what currently uploading CFi's are indicating as being the topics that are now most prominent on the user's mind. If a newer topic shifts into the apparent top focused upon ones of the user (because his CFi's have started implying the newer topic) and one of the previous top topics drops out of favor (again because the user's latest CFi's have started implying that) then the falling out of favor headline (one of recommendations 315*a*, 315*b*, 315*c*, 315*d*) is seen to slowly fall down in its respective newspaper column while a newer headline descends to take its place in the respective, newspaper like column. In this way the user is given the intuitive understanding that the previous recommendation (the before headline) has dropped down in rating and the newer one has dropped in to take its place. However, if the user wants to keep the older, or before recommendation—say it is 315*b*—still on his top headlines row of banner 315, in one embodiment, the user clicks on the down scroll arrow of arrow pair 315*b*45 and the older recommendation scrolls back up while a bottom piece of the newer recommendation remains displayed in that newspaper-like column to remind the user there is newer and deemed more "hot" recommendation awaiting above. The user may later click on the up-pointing scroll arrow of arrow pair 315*b*45 to see the next newer one, or even one above that, as desired. Each of the newspaper-like columns of banner 315 has its own respective set of up and down scroll control arrows like the arrow pair 315*b*45 identified in opportunity recommending area 315*b*. In the illustrated example, the separations between the newspaper-like columns of banner 315 are indicated by thickened separation lines (vertical lines) 315*v*. Left and right pointing arrow tools to the left (315*z*) and to the right (315*zz*) of the four central newspaper-like columns of banner 315 allow the user to see other side columns which the STAN_2 system is determining to be less on-topic with what the user probably has in mind. Sometimes, of course, the STAN_2 system can be wrong in its guesses as to what specific topics (e.g., top 1, 2, 3 or 4 topics) are on the user's mind and by scrolling left (315*z*) or right (315*zz*) and clicking on one of those off-center newspaper-like columns, the user implicitly lets the STAN_2 system know (and lets the STAN_2 system adaptively alter itself accordingly) that it is the more side-lined topic that the user actually had in mind.

The exemplary newspaper-like headlined columns format of banner 315 is just one of many possible formats that can be used and is not to be seen as limiting. In one embodiment, the user is allowed to change the banner (e.g., 315) to have a different format, for example, a four quadrant Picture-in-Picture format where the four quadrant PiP structure (not shown) floats as a moveable and resizeable window on the main screen 300 along with other windows like windows 317, 330*a* and 330*d*.

Still referring to the method wherein the user double-clicks on (and thus indicates a desired opening up operation) on a banner-displayed TweetView-Opportunity recommendation glyph such as 315*a*, there is a more advanced action that a STAN_2 member can take. Rather than jumping right into the midst of a system-recommended first TCONE (e.g., one recommended by a glyph such as 315*a* or 315*d*), the user can elect to instead navigate himself to the primary Z-pole 219*a* (herein also referred to as the topic center or topic node) of the system-recommended TCONE and to browse about the neighborhood of that primary Z-pole 219*a* (or optionally about the neighborhood of a secondary Z-pole if the TCONE is tethered to more than one). Such a navigating to, and browsing about operation, may encompass the STAN_2 system generating a 3D or 2D displayable image that maps the TC or TCONE neighborhood onto a local view screen for viewing by the user. The displayed map image may very well include coned shaped 3D structures such as that shown 219*a* of FIG. 2. The displayed map image may also include 3D fractal structures such as that represented by glyph 216*f*, where the latter will be described below. The STAN_2 system generated representation of its topic space 215 may of course take on other forms including, but not limited to, two-dimensional or multi-dimensional tabular representations.

In one embodiment, each system-recommended Social Notes Exchange (SNE; a.k.a. discussion ring or TCONE) that is iconically recommended on the user's data processing device (e.g., CPU-1 of FIG. 1A) also has a gadget icon connected to it that represents the location of the topic center (the TC prefix of the TCONE acronym) within the topic nodes tree map (215) of the STAN_2 system 110/210. More specifically, in FIG. 3A, the TC flag 315e that pokes up from the block representing Chat Opportunity A2 (315d) may be double clicked on and then in response the system automatically displays a section of the topics tree map (215) to the user that shows the corresponding Z-pole 219a and the TCONEs that are currently tethered to that pole, and also some neighboring poles like Zb (219b) and the TCONEs that are currently tethered to that other pole. In one embodiment, the TC flag icon 315e includes a circle and a cross-hair centered on that circle so as to intuitively indicate that it flags out a center point. Right clicking on the flag icon 315e provides the user with some synopsis information about the targeted topic node (e.g., 219a, 219b) without yet opening up a map of the corresponding area in the topic nodes space (215). More specifically, the synopsis information may provide the user with a name and brief description of the topic of that TC (topic center), an indication of how many TCONEs (e.g., chat rooms or other Social Notes Exchanges (SNEs)) are currently tethered to that TC, and an indication of various TCONE entry restrictions (example: "Minimum level of expertise needed to enter least restrictive chat room here is High School Diploma, Minimum level of expertise needed to enter most restrictive chat room here is PhD in World History").

Once a user (e.g., 212) has navigated his way (e.g., via path 218 of FIG. 2) to the Z-pole (219a) of a chosen topic center, the user may request admittance into any one of the displayed TCONEs (e.g., chat rooms). In one embodiment, Premium service subscribers to the STAN_2 system get to see more displayed TCONEs than base service registrants. In one embodiment, the STAN_2 system automatically prevents display to a user (e.g., 212) who has navigated to a TC point on the map 215 of TCONEs which the user clearly cannot gain participating admittance into because his currently active user profiles (e.g., CpCCp's, DsCCp's) and more current CFi's indicate he does not qualify to enter and/or he would not want to enter. A user (e.g., 212) who has navigated (218) to a TC point on the map 215 of TCONEs may not succeed in gaining entry as an active participant (with commenting privileges) into one or more of the displayed TCONEs for any number of reasons including, but not limited to, that the limit of allowed active participants in that TCONE (ring) has been reached or that the user does not meet the stringent restriction rules established for participating entry or even watching/lurking entry into that TCONE. For those TCONEs that the user manages to obtain at least watching/lurking entry into, the user can learn the user names of the active participants in that TCONE and can see (or otherwise perceive, or get a copy of) what they are discussing or otherwise exchanging notes about (including on-topic content data and/or links to on-topic content data and/or links to other on-topic or near-topic nodes of mapped space 215 and, in one embodiment, to nodes of outside platform space 225 that are on-topic or near-topic).

A user (e.g., 212) who has navigated his way (e.g., via path 218 of FIG. 2) to the Z-pole (e.g., 219a, 219b) of a chosen topic center, need not request admittance into any one of the displayed TCONEs (e.g., chat rooms) in order to make use of the visited topic center (TC, a.k.a. Z-pole). Many of the topic centers (a.k.a. topic nodes) will have their own content and pointers to content where the topic center's content and/or pointers are directed to the general topic of that topic center and access to this material is not restricted by potential access restrictions of specific TCONEs now tethered to that TC. Aside from having its own (not TCONE controlled) content and pointers, a visited TC may have, as logically linked thereto and stored as such in the DB 119, various encodings (e.g., keywords, tags, meta-tags, etc.) that define the general topic of that TC taken in whole (in the averaged aggregate) as opposed to the in-TCONE topic definitions of specific ones of the rings now tethered to that TC. A user who is browsing just to the TC itself and not into any of the specific TCONEs currently owned by the TC may take advantage of the TC's general on-topic content and/or topic definitions.

The following is an exemplary but non-limiting example of such usage. A general practice physician (GP MD) has a patient who has been taking drugs D and P for a long time to treat chronic conditions. However recently, the patient has begun to exhibit allergic reactions to drug P, this indicating that P is now Poisonous in so far as the allergically reacting patient is concerned. The GP MD is thinking about prescribing a new drug named N to the patient to replace the now poisonous P. However the GP MD is worried about possible adverse interactions as between drugs D and N. Usage of the combination of the D and N is not widespread in the population and thus there are no generally-available guidelines on such a unique drug combination (D and N). The GP MD is not sure how to phrase a keyword search looking for esoteric online articles about unique drug combination D+N. The GP MD uses the STAN_2 system to navigate (browse) to a topic node (a TC) that has both of D and N as its keywords are other primary encodings (e.g., as its tags, meta-tags, etc.). When browsing at such a topic center (e.g., Z-pole 219a), the GP MD finds additional keywords, tags, meta-tags, etc. that the physician feels will be useful for isolating esoteric online content addressing his unique problem. While still logically linked to this TC, the GP MD user requests instantiation and launch of a so-called Me-Serving Search BOT (see 255 of FIG. 2) from that TC and on behalf of himself. In response, the STAN_2 system automatically asks the GP MD to specify the primary encodings (e.g., keywords, tags, meta-tags, etc.) that will be loaded into a mission guiding data structure of the to be launched, Me-Serving Search BOT (255).

A better representation of such a mission guiding data structure is provided as icon 116b in FIG. 1A and shown to be logically linked to an instantiated BOT 116a being launched from node 115x of the STAN_2 system 110. When a BOT 116a (a virtual robotic or software agent) is armed with such a mission guiding data structure 116b and launched as such a combination (116a plus 116b) from the corresponding launch point (e.g., 115x), the launched BOT combination 116a/116b may be viewed as morphing into a launched CPAP 117 (a Cross-Pollinating Artificial Persona). The logically attached mission guiding data structure (116b) may instruct the CPAP 117 as to where out there on vast territory of the Internet 101 to start searching and how to search and what to look for. More will be said about this below in conjunction with FIGS. 4C-4D. However, for purpose of the present hypothetical where the GP MD user has asked the STAN_2 system to launch a Me-Serving Search BOT (255), the identification of the requesting user is logically attached to the launched BOT and the BOT is aimed towards out-of-STAN and/or in-STAN content sources that the visited TC (e.g., 219a) generally points to as having on-topic content (e.g., its Top P pointers to on-topic content sources). Accordingly, the launched Me-Serving Search BOT (e.g., 255) is being pointed to search areas that have likelihood of possessing on-topic content (because those areas have been vetted to be such on-topic content sources by earlier users of the visited TC, e.g., 219a). At the same time the launched Me-Serving Search BOT is loaded with a search-narrowing specific search request formulated by the GP MD user and thus the Me-Serving Search BOT will search the probably on-topic areas for presence of the more narrowly defined and specifically sought content. In one embodiment, the STAN_2 system automatically augments the specific search request formulated by the GP MD user, for example by adding cross-language translations and cross-disciplinary frame translations to the mission guiding data structure (116b). That aspect will be explained below in conjunction with FIGS. 4C-4D. When the launched Me-Serving Search BOT (a.k.a. CPAP) returns to the node (e.g., TC 219a) from which it was originally launched, an email or alike other alert is automatically sent to the search requesting GP MD user to let him know useful results may now be available.

The package contents 256 brought back by the returning Me-Serving Search BOT 255 will all be accessible to the user (the general practice physician or GP MD) who requested its specific instantiation and launching. In one embodiment, the alert email sent to the GP MD includes a first hyperlink to the TC or TCONE (216c) from within whose jurisdiction the user requested the launching and a second hyperlink to all the returned contents 256 being brought back by the automated BOT 255. Using the second hyperlink, the user can browse through the returned material 256 and determine whether any of it helps answer his problem. The returned material 256 may include, but is not limited to: (a) hyperlinks to external platform nodes (e.g., 226) whose content cross-correlated well with the user's search criteria, (b) lists of the alternate keywords or alternate encodings which the user may wish to employ in the future within his search criteria in place of, or in additional to the keywords and/or other encodings he submitted, (c) identifications of STAN_2 internal user names and/or of user names on external platforms (where names are attached to external platform ID) where postings by those users appear to cross-correlated well with the user's search criteria, and (d) short summaries or synopses or biographies of the found on-topic material and on-topic other users. The request generating GP MD may then go through this returned material and determine which is on-point and credible and which, in his opinion, is to be rejected. Additionally, the request generating GP MD may next formulate an improved search request based on the BOT-returned material 256. Alternatively or additionally, the request generating GP MD may try to contact the other users whose user names (or other ID's) were returned by the Me-Serving Search BOT 255 in hope that those other users will be willing to and able to help him with his inquiry. In one embodiment, expert other users who respond to such requests are automatically given monetary or other rewards for their cooperation. In one embodiment, the STAN_2 system 110/210 automatically presents one or more survey questions to the user (e.g., the GP MD) who caused launching of the Me-Serving Search BOT 255 and who returned to examine the brought back contents 256. The posed survey questions may ask the user how satisfied he is with the returned results 256 and may ask further questions (if the user has patience for such) that will help the STAN_2 system improve its automated formulation of the Me-Serving Search BOTs (e.g., 255).

That is not necessarily the end of process however. In one embodiment, the material 256 brought back by the Me-Serving Search BOT 255 is automatically tested for its usefulness to other members of the TC or TCONE (216c) from which the first user launched that BOT. It could be that part or all of the brought back material is useful to them as well. This testing process includes passage of the brought back material 256 through a buffering or filtering outer layer 216b of the TC or TCONE (216c), where such buffering may employ automated filters and/or voting by selected members of the corresponding TC or TCONE (216c). If the voting and/or filtering ranks the material (in part or in whole) as being useful, it is absorbed into inner or outer planetary circles (e.g., the one between 216b and 216c) of the TC or TCONE according to a cross-correlation score that logically positions it in ranked relation relative to other absorbed content of the corresponding TC or TCONE (216c). (This process will be further detailed below as well.) While Me-Serving Search BOTs are generally instantiated and launched at the instigation of specific users or user groups, there are other kinds of Search BOTs (also denoted as 255) which are automatically instantiated and launched on behalf of a respective TC or TCONE (216c) on a regular basis and/or in response to various predefined triggering events (e.g., increased user activity detected at the respective TC or TCONE). These other Search BOTs, which may be referred to as TC-Serving or TCONE-Serving Search BOTs can be regularly and automatically bringing back cross-pollination data (e.g., 262/264/252) to their respective launch pads (a TC or TCONE) for assessment by the respective launch pads (e.g., by manual voting on and/or by automated filtering of returned package material) and for possible incorporation of the returned material into the TCONE and/or its associated topic nodes (TC's) based on the assessment. Accordingly, various ones of the TC's and/or TCONEs in topic space 215 of the STAN_2 system 220/110 are being periodically or even constantly updated by cross-pollination material being automatically brought back to those TC's and/or TCONEs by corresponding Search BOTs (a.k.a. a species of CPAP's) and/or by corresponding CPUP's (human agents, aided by spyware software 132s as shall be described in conjunction with 318 of FIG. 3A).

User-launched or TCONE-launched or TC-launched Search BOTs are one species of CPAP's. The STAN_2 system 220/110 can alternatively or additionally utilize other types of BOT's including Lurking BOT's, User-following BOT's and Web-Crawling BOT's. Briefly, Lurking BOT's (e.g., 116c of FIG. 1A) are assigned to hover at (to lurk at) a predefined external and content sourcing area of the Internet 101 such as for example, inside a particular room of a role playing game such as SecondLife™, and to behave therein as a NPC (Non-Player Character) if need be, and to simply collect data as it comes into that lurked at area and sift through the data looking for noteworthy indications of emphasis. The indications of emphasis can be predefined by the STAN_2 system and may include, but are not limited to, meta-tagged data, XML-tagged data; bolded, underlined, italicized, in-quotes, highlighted, all-capitalized or otherwise so differentially emphasized data, hyperlinked words and phrases, and so on. The Lurking BOT (e.g., 116c) returns such differentially emphasized data as CFi data to an automated Domains/Topics Lookup Service (DLUX) of the STAN_2 system 110 and in response, the STAN_2 system generates signals indicating the most probable topic nodes (a.k.a. TC's or topic centers) to which the CFi data (the differentially emphasized data returned by the Lurking BOT e.g., 116c) belongs. The probable topic nodes identification data (produced by the DLUX) is thereby logically linked to the lurked-at location (e.g., a SecondLife™ room, a website, a Podcast, a Tweet™ stream, etc.) which the Lurking BOT (e.g., 116*c*) was assigned to lurk at. A number of different subsequent actions can then follow. In one embodiment, the combination of the DLUX output signals (e.g., identifications of top T topic nodes) and the associated CFi data signals and the signal identifying the lurked-at location (e.g., SecondLife™ room) is automatically transmitted to automated Domain-specific Matching Service (DsMS) of the STAN_2 system and the DsMS automatically finds a matching one or more TCONEs to which it forwards the so-combined and re-package data. The receiving TCONE(s) (see 216*c* of FIG. 2 as an example) then use(s) automated and/or manual filtering means (buffer 216*b*) thereof to determine what to do with the so-packaged and received combination data. In one embodiment, the TCONE can absorb it, reject it, or redirect it to another spot (e.g., 216*n*) in the topic space 215 of the STAN_2 system. In one embodiment, the receiving TCONE automatically uses the so-packaged and received data for formulating a more sophisticated TCONE-Servicing BOT (e.g., 116*a*) which then goes out to investigate the associated data and content sourcing location in more detail for the purpose of bringing back more on-topic cross-pollination data (e.g., 262/264/ 252).

In summary, instantiated and activated Lurking BOT's (e.g., 116*c*) operate as if they were a dumbed down STAN_2 user who remains at one pre-assigned and content sourcing location on the Internet (e.g., a single and periodically refreshed webpage) and keeps feeding CFi's back to the system DLUX server(s) as new and noteworthy data appears at that assigned location. In one embodiment, associated dummy user profiles of the Lurking BOT (e.g., 116*c*) are automatically formed as an amalgamation of user profiles of real STAN_2 users, more specifically, of STAN_2 users who are known to frequent the lurked at site under their STAN_2 personas and/or under their alter ego personas (see 184 of FIG. 1B). The associated dummy user profiles of the Lurking BOT (e.g., 116*c*) may be automatically varied from time to time so as to provide some dynamic variation to the corresponding results. As taught in the here incorporated STAN_1 application, the DLUX server(s) automatically combine the user's profiles (e.g., CpCCp and DsCCp's) when automatically determining from the received CFi's what the most likely associated topic(s) is/are.

User-following BOT's (e.g., 116*e* of FIG. 1A) are another form of instantiated and activated BOT's and these assigned a particular one or more STAN_2 users (e.g., 131) to follow or one or more out-of-STAN users (e.g., 222 of FIG. 2) to follow (as best as such users can be followed) while those followed users utilize out-of-STAN content sources while not at the time being monitored by the STAN_2 system 110. More specifically, the User-following BOT's (e.g., 116*e*) may subscribe to various external platform services that allow its users (including permitted NPC users) to sign up for "following" and receiving alerts about the activities of certain followed other users. In other words, certain ones of external platforms provide follower-alerting notifications indicating new recent activities of the followed personalities. More specifically, in the LinkedIn™ system, registered members may sign up as "followers" of the other members. Then, when the "followed" other member joins a new discussion group or launches a proposed discussion, a notification of that new event is made available to his or her "followers". The User-following BOT's (e.g., 116*e*) of the STAN_2 system accordingly subscribe to such follow-notification services and periodically refresh or check in on their follower's-notification area in wait for the follow-notification alerts to appear regarding the being-followed users that have been assigned to them by the STAN_2 system. Since the aliases storing record 184 of FIG. 1B provides cross-linked external user names and ID's of users of the associated external platforms (e.g., FaceBook™, MySpace™, LinkedIn™, etc.), the STAN_2 system has ready access to external platform identifications of some users; and as will be seen below, can gather external platform identifications of identifications of other users through cross-pollination mechanisms actuated by the STAN_2 system.

In one embodiment, the to-be followed users of the User-following BOT's (e.g., 116*e*) include influential and/or famous persons or personas (see fTPP's 229 of FIG. 2). The User-following BOT's try to keep track of what new discussion groups or new other content sources their followed-users join and/or what older discussion groups or older content sources their followed-users frequent and report the same as CFi data back to the system DLUX server(s) of the STAN_2 system. The resulting combination data (CFi's plus probable topics plus identification of source) is then forwarded to corresponding automated Domain-specific Matching Service (DsMS) of the STAN_2 system and so on as is the case described above for the Lurking BOT's. User-following BOT's (e.g., 116*e*) may also gather differentially emphasized content output by their respectively followed users in various discussion group sessions or other Notes Exchange sessions and report the gathered data as CFi signals back to the system DLUX server(s) of the STAN_2 system, where after the CFi data is treated in similar fashion to the way that other such CFi data is treated.

In one embodiment, the results obtained from the feed-back data of the User-following BOT's (e.g., 116*e*) and/or the Lurking BOT's (e.g., 116*c*) are processed by automated Trending Data Store services of the STAN_2 system and respective trend projections are generated for the targets of those respective BOTs. As a result, trending projections for watched external sites (lurked at sites) and trending projections for watched (followed) users (including especially "influential" TPP or other users) are automatically produced by the STAN_2 system 110. These generated trending projections are then automatically cross-correlated by the STAN_2 system with those of alike, watched external sites (lurked at sites) and/or with those of alike, watched (followed) users to thereby generate more general trending projections for groups of alike watched targets. The more general trending projections may then be used by STAN_2 system operators to manually modify the STAN_2 topic space 215 by for example, creating special groupings of TC's or TCONE's. The special groupings are discussed elsewhere herein.

In one embodiment, Lurking BOT's (e.g., 116*c*) are assigned (via their mission control commands e.g., 116*d*) to scan through assigned sets of audio PodCasts that have XML files attached thereto and to report back as CFi's, the differentially treated content of the scanned audio PodCasts as meta-tagged by their respective XML files. In one embodiment, Lurking BOT's are assigned to scan through multi-media presentations (e.g., PowerPoint™ slides) and to detect differentially treated content therein and to report the same back as CFi signals to the STAN_2 system. The scanned through multi-media presentations may include video presentations that have XML and/or other semantic providing data logically linked to them. In one embodiment, the Lurking BOT's (e.g., 116*c*) keep track of the number of Notes Exchanges (e.g., back and forth talking points) generated by different users per unit of time (e.g., per 5 minute interval, per hour, etc.). When the Notes Exchanging rate exceeds a predetermined threshold for the watched site, the Lurking BOT automatically feeds that information back as a noteworthy CFi. In this way, the STAN_2 system can detect when discussions (or other Notes Exchanges) are becoming "heated" at various watched content sourcing locations on the Internet 101 and can automatically take further investigatory action as deemed appropriate for the corresponding nature of the watched location.

Web-Crawling BOT's (not shown, but similar to Lurking BOT's e.g., 116c of FIG. 1A) are also used in one embodiment of the STAN_2 system. Unlike Lurking BOT's, the Web-Crawling BOT's are commanded by their attached mission control data structures (e.g., 116d) to randomly step through randomly selected online content (if it is accessible to the public) and to look for differentially treated content therein and to then report the same back as CFi signals to the STAN_2 system for further analysis and use. The Web-Crawling BOT's may alternatively or additionally be commanded by their attached mission control data structures (e.g., 116d) to use one or more search engines (e.g., Yahoo™, Bing™, Google™) as a means of scouting out content having differentially treated content provided therein and to then report that differentially treated content back as CFi signals to the STAN_2 system for further analysis and use. In one embodiment, the feedback CFi signals of the Web-Crawling BOT's (not shown) are automatically cross-correlated with trending projections provided by the Trending Store services of the STAN_2 system (and in particular with trending projections of selected influential personas e.g., TPP's 229) and when there is a strong cross-correlation, this information is automatically forwarded to STAN_2 system operators for possible further action. By way of summary, it should be noted that the watched targets of Lurking BOT's and Web-Crawling BOT's can have specially differentiated content which is so identified as specially differentiated because the originators of that content chose to specially differentiate that content by bolding it, by otherwise highlighting it, by meta-tagging it, by attaching tagged semantics to it with use of XML data and the like, and so on. The target watching Lurking BOT's and Web-Crawling BOT's are thus often relying on the originators of the watched content to flag out what parts of the content are noteworthy and should be relayed back as CFi data. In one embodiment, however, target watching, Lurking BOT's and/or Web-Crawling BOT's may take periodic samplings of just randomly picked content portions of their watched targets and relay that back to the STAN_2 system as CFi data signals. In contrast to the Lurking BOT's (e.g., 116c), the User-following BOT's (e.g., 116e) can be thought of as relying on the greater intelligence of their followed users for determining what might be noteworthy information that warrants relaying it back to the STAN_2 system as CFi data signals. Moreover, the user's profile assigned to each User-following BOT (e.g., 116e) can be adaptively updated on trial and error or regression algorithm basis so that it begins to more correctly model the behavior of the targeted, BOT-followed user. As a result, decisions made by the STAN_2 DLUX server(s) in response to feedback CFi's of the User-following BOT's (e.g., 116e) can be more on target with respect to what topics the followed targets have in mind as they join new discussion groups, engage in heated discussions within previously joined discussion group and so on.

With presently available technology, automated BOT's cannot fully mimic the cognitions of real people when acting alone and/or in social groups. The ultimate source for information about socially significant events on the Internet 101 is thus the objectively determinable behaviors of people when acting alone and in social groups. Later below it will be explained (e.g., in conjunction with FIGS. 3A-3D) how real people can be enticed to function as on the ground feedback agents for the STAN_2 system especially when those persons (e.g., Thomas 132u2 of FIG. 1A) are not having their activities monitored so as to produce up- or in-loadable CFi and/or CVi signals for the STAN_2 system.

Before reaching that description however, reference continues here to FIG. 2 and more generally as it regards any STAN_2 user (e.g., 212) who has used his/her local data processing device(s) to navigate to a given topic node (TC) on the STAN_2 system's topic space map 215 and has optionally gained at least watching/lurking entry into one or more TCONEs thereat. That user (e.g., 212) can then and as a result of such browsing and navigating, get hold of the (optionally periodically updated) on-topic content data and/or links to on-topic content data and/or links to other on-topic or near-topic nodes provided not only within the STAN_2 space 215, but also; because some TC's or TCONE's (e.g., 216c) receive and absorb cross-pollination links (e.g., 261) to external on-topic discussion groups or other such external on-topic content sources (e.g., 226) of external platforms (e.g., 220), the user may be able to sometimes gain access to the on-topic material within the linked-to (261) external platform space 225. Of course, some external platforms only allow their own registered members (members only) to enter into and browse within their respective discussion group spaces (e.g., 225). In some cases, a first STAN_2 member may gain access into the members-only space (e.g., 225) of an external platform by having another STAN_2 member (e.g., 132' shown on plane 225 as opening the access door) vouch for the first STAN_2 member. In some cases, the external platform allows automated BOT's (e.g., NPC's or non-player characters) to enter their members-only space (e.g., 225) if the BOT is vouched for by a trusted and already-registered member (e.g., 132') of the external platform (e.g., 220). In one embodiment, the STAN_2 system provides an automated service whereby a first STAN_2 member seeking to gain otherwise blocked access to on-topic material in an external platform can send automated messages to STAN_2 users who are already-registered members (e.g., 132') of the external platform asking them to open the door (if possible) for the first STAN_2 member or otherwise convey to that first STAN_2 member relevant parts of on-topic material found in the external but on-topic discussion group or other external content source (e.g., 226). Given this access through the STAN_2 topic space 215 to both internal, and sometimes even external, on-topic content, the topic space browsing user can be enriched with a wide variety of information about the topic that is currently of interest to him or herself. Among the rich panoply of information that such a user (e.g., 212) can extract is the identity (e.g., user names) of other personas who are currently involved in the same topic of interest (e.g., that of topic node 219a).

In terms of a more specific next example of how browsing of the STAN_2 topic space 215 may be useful, suppose that a given user 212 is also a registered member of outside platform 220 and when logged into that outside platform 220, user 212 goes under the guise of user 222, where this alter ego persona 222 is a member of discussion group 224 but not of discussion group 223. There could be members of discussion group 223 whose interests (but not group membership) overlap with those of discussion group 224 where the overlap includes current interest in the topic of topic node 219*a*. (Just because they are interested in the "topic" of topic node 219*a* does not mean that the external platform members all make use of the STAN_2 system in the same manner that registered user 212 does. Accordingly, the rest of the members of groups 223 and 224 of external platform 220 may not know of each other's existence or of their overlapping current interest in the "topic" of topic node 219*a*.

By contrast, user 212 can learn of this overlapping interest even in the realm of external platform 220 if so-called cross-pollination packages (252, 254, 256, 262, 264) have been brought into one or more TCONEs (e.g., 216*c*) of the STAN_2 topics space 215 and those cross-pollination packages (e.g., 264) provide information about the identification of the overlapping-wise interested members (e.g., 223) of the external platform 220. The so-called cross-pollination packages (252, . . . , 264) may be carried into the TCONEs of the STAN_2 topics space 215 by automated agents (251, 253, 255, 260—represented as bumble bees in FIG. 2) generated and controlled by the STAN_2 platform 110/210 and/or such cross-pollination packages may also be manually brought in by unartificial (in other words, real and live) volunteer members of the STAN_2 system (who are aided by software, more specifically, downloaded; or more generally, in-loaded spyware programs like 132*s* which will be detailed below).

As already mentioned above, the unartificial volunteer members of the STAN_2 system are also referred to herein as CPUP's (Cross-Pollinating Un-artificial Persona) and the automated bumble bee agents (software agents) are also referred to herein as CPAP's (Cross-Pollinating Artificial Persona). It will be easier (and in some cases necessary) to first understand how the real and live volunteer members of the STAN_2 system (the CPUP's) operate before trying to understand how the CPAP's (bumble bee software agents) operate.

Firstly, it should be observed that some registered members (e.g., 132 of FIG. 1A) of the STAN_2 system 110/210 by happenstance are also registered members (even if under a different user names and/or passwords) of one or more of the external platforms. Because these multi-platform using users (e.g., 132) can easily gain entry into the outside platforms (even if under a different user name and/or password; i.e., "Thomas" instead of "Tom"), such multi-platform using users (e.g., 132) can be asked to volunteer to act as Cross-Pollinating Un-artificial Persona (CPAP's) on behalf of the STAN_2 system and to bring back cross-pollinating packages like 252, . . . , 264 of FIG. 2 to appropriate TCONEs of the STAN_2 system.

Although FIG. 2 shows automated software agents (CPAP's) 251, 253, 255 and 260 as carrying the cross-pollinating packages 252, . . . , 264, it shall soon become apparent that real person CPUP's (e.g., user 132) can also cause delivery of the cross-pollinating packages to the STAN_2 system. In one embodiment, there are at least three different kinds of cross-pollinating packages and there are at least three different kinds of CPAP's that go out in the field to find such packages and bring them back to the STAN_2 hive for possible absorption and use by the hive. The Me-Serving Search BOT (255) has already been mentioned above.

However, aside from BOT's that are launched at the behest of individual users and with mission guiding data structures 116*b* containing the individual user's search specifications, another kind of CPAP (a TCONE-Serving Search BOT, also identified at 255) is automatically and periodically launched from a respective TCONE (or automatically launched in response to a predetermined triggering event) with a mission guiding data structures (116*b*) containing machine-inferred desires of the TCONE membership. Background control and tracking programs within the STAN_2 system (a.k.a. SS2) may be continuously executing and scouring the topic space 215 for TCONEs that are most active, most popular, fastest changing (e.g., drifting) and so on. The background control and tracking programs (not explicitly shown, but understood to be instantiated across the fabric of the STAN_2 system 110; i.e. distributed through its cloud is SS2 110 is implemented as a cloud computing system) compare a pre-recorded previous top N (e.g., N=2, 3, 5, 10) topic-defining encodings (e.g., keyword, URL's) of the investigated TCONE against the current top N topic-defining encodings and uses a predefined scoring algorithm to assign a score to the amount of change (it could be 0). If there is a change score exceeding a predefined threshold, the current top N topic-defining encodings (or a subset thereof) are automatically loaded into a newly created mission guiding data structure (i.e. 116*b*) of a BOT and the BOT is automatically launched into promising external platform areas (e.g., 225) in search of external content that well cross correlates with the in-loaded current top N topic-defining encodings (or a subset thereof). Topic defining and/or on-topic content found at the external search areas is returned as a proposed cross-pollination (CP) data package (256) to the BOT launching TCONE (e.g., 216*c*). Contents of the presented CP data package (e.g., 256) are then processed by buffering launcher 216*b*. All or part of the presented CP data package may be rejected (254) or accepted on a ranked basis (voted on as being more or less currently on-topic) and thereafter absorbed into respective ranked inner and outer circles inside the TCONE. The more inner circles are deemed closer to the TCONE core 216*c* while the outer ones are, in terms of cross-correlation with core attributes of the core 216*c*, deemed to be less tightly cross-correlated to the core. Logical (virtual) positioning of absorbed material on the inner through outer circles indicates where in the cross-correlation spectrum they belong. Just at TCONEs can "drift" over time from one TC to another, absorbed topic defining and/or on-topic content within a given TCONE can drift from the inner planetary orbits (circles) to the outer ones, or vise versa as the nature of the TCONE changes over time. In one embodiment, aside from blanket rejecting the presented cross-pollination data (e.g., 254) or voting to accept it on a ranked basis, vote-eligible members of the TC or TCONE (216*c*) or an automated voting mechanism that emulates their behavior are/is given an option of voting to "Reject-But", where the "-But" part is that of indicating that while this rejected material is not currently on-topic for the launcher TC or TCONE (216*c*), and thus a genetic failure as regards the launcher TC or TCONE, some or all of the rejected material 254*a* should be nonetheless treated as a successful genetic mutation (successful by happenstance) and used to automatically create a new topic node 216*n* in the STAN_2 topic space 215 if such a different topic node 216*n* is not already present. If enough "Reject-But" votes/indications above a predefined threshold are cast for returning BOTs 253 bringing such "Reject-But" material 254*a*, the returning BOTs 253*a* and their corresponding "Reject-But" material 254*a* are automatically re-directed to the topic space area of the new topic node 216*n* and the Reject-But" material 254*a* is used to build the new topic node 216*n* while the genetically successful mission guiding data structures (i.e. 116*b*) of the re-directed BOTs (253*a*) are used as initial templates for re-birthing TC or TCONE-serving BOTs (also denoted as 255) form that new TC or TCONE (216*n*). In this way, when an emerging new topic begins to show up in the out-of-STAN domain (e.g., 220) and there is not yet a corresponding topic node in topic space 215 for that emerging new topic, the returning BOTs 253 bringing such "Reject-But" material 254*a* back are automatically diverted to the task of building the corresponding new topic node 216*n* in the STAN_2 topic space 215 and their reborn progeny (explained in FIG. 4C) are re-aimed to the task of servicing the new topic node 216*n* with cross-pollination data (e.g., 254) fetched from out-of-STAN sources (e.g., 120, 141, 144, . . . , 160, etc.).

Another type of search BOT, namely, the above-mentioned TC-Serving Search BOT (also identified at 255) is automatically and periodically launched from a respective TC (or automatically launched in response to a predetermined triggering event related to that topic center) with a mission guiding data structures (116*b*) containing machine-inferred desires of the current TC membership. Since the TCONE-Serving Search BOT has been described above, it is not necessary to repeat substantially the same explanation for the TC-Serving Search BOT. The latter serves the needs of the whole of the topic center (TC) rather than the inferred needs of an individual topic center owned note exchange (TCONE). Per the teachings already provided in the here incorporated STAN_1 application (see giF. 4B and giF. 3C thereof), In one embodiment of the STAN_2 system, substantially all nodes in the hierarchical topics tree have a basic same structure. In other words, essentially every domain node (and even the root node) can have the same internal data structure as its child nodes and essentially every child node can have the same internal data structure as its grandchild nodes, and so on until the leaf nodes are encountered. Leaf nodes point to the specific on-topic content (e.g., the TCONEs) of their respective specific topics. The hierarchical tree nature of the STAN_2 topics space 215 means (for that embodiment, other variations are possible) that the topic space 215 has a fractal organization as is hinted at by multi-cones layer 216*f* drawn within FIG. 2. Accordingly, not only can each lowest level topic node (e.g., a leaf TC) have TC-Serving Search BOTs automatically launched on its behalf by the background control and tracking programs (not explicitly shown), but also parent topic nodes and grandparent topic nodes and so on can also have similar such Search BOTs automatically formulated and launched to crawl the Internet 101 or specified areas thereof on behalf of the topic nodes of origin. Each topic node can have its own filter and vote buffer layer similar to 216*b* of the exemplary TCONE 216*c* and each topic node can have its own inner and outer placement circles for node-absorbed content similar to the cross-correlation orbits described for exemplary TCONE 216*c*.

It is to be noted that although at times the present disclosure describes a given TCONE as being hooped around or stacked over a corresponding TC or Z-pole see 219*a* of FIG. 2) that does not mean that all TCONEs are limited to being "owned" by only a single topic node (a.k.a. TC). It is fully within the contemplation of the present disclosure that one or more TCONEs can be simultaneously "owned" by (e.g., tethered to) two or more TC's. In one embodiment, the degree of ownership exercised by each TC to which a TCONE is tethered or moored is weighted in accordance with tether weighting factor signals stored in the DB 119 for and logically linked to the multi-owned TCONE. A given TCONE can for example "drift" back and forth from being more owned by one TC and later more owned by another. When various actions are described herein as being taken on behalf of a TCONE and with regard to its owning parent or grandparent node, it is to be understood that the owning parent or grandparent node may be deemed, in one embodiment, to be the majority stake holder who thereby controls on a winner takes all basis, or in an alternate embodiment, the described action operates on a pro-rata apportionment basis; where for example, overview topic definitions for a multi-owned TCONE are automatically derived as being a top 60% of such definitions (e.g., keywords) taken from a respective 60% owning TC, as being a top 30% of such definitions taken from a respective 30% co-owning TC, and as being a top 10% of such definitions taken from a respective 10% co-owning TC.

It is to be additionally noted that; while the automated formulation of TCONE-Serving Search BOTs and TC (topic node)-Serving Search BOTs has been described above as serving individual TCONEs and individual topic nodes found within the STAN_2 topic space 215, it is within the contemplation of the present disclosure to allow for operator defined "groupings" of specific TCONEs and/or specific topic nodes to be recorded and stored as such in the DB 119 of the system 110/210. It is within the contemplation of the present disclosure that the above described background control and tracking programs (not explicitly shown) will also service these operator formed groupings and that grouping nodes, similar in structure of data to that of topic nodes will be recorded and stored as such in the DB 119 of the system 110/210. In one embodiment, premium subscription members of the STAN_2 system are granted browsing access to specific ones or more of the specially formulated grouping nodes. (Normal topic nodes and their encompassed TCONEs are automatically formed and logically linked by actions of the STAN_2 user population. However, that user population may nonetheless fail to recognize special or eclectic connections as between disparate TCONEs and/or as between disparate TC's. The STAN_2 system operators may instead isolate those unrecognized eclectic connections; i.e. as between a TC dedicated to "economics" for example and another TC dedicated to "computer science and The Mythical Man Month" for example and formulate groupings for such apparently disparate topic nodes and/or apparently disparate TCONE's.

In one embodiment, individual users are enabled to formulate and save their own "groupings" of favorite TC's and/or TCONEs. One of these favorites "groupings" can be stored as the user's STAN_2 Home page. When the user opens up this STAN_2 Home page, he sees a topic space map (like 215) but showing the local neighborhoods of only his specified favorite TC's and/or TCONEs. He can observe if a new TC or TCONE has recently moved into the local neighborhood of one of his "favorites" and he can browse the new TC or TCONE (assuming it allows general browsing or participating entry—if it does not, it may not even show up on the user's Home page). Alternatively or additionally, the user may quickly jump in from his Home page into (for browsing purposes) one of his specified favorite TC's and/or TCONEs. A user may of course have more than one such Home page and the STAN_2 system may automatically pick the appropriate Home page and display it upon log-in based on the detected mood, environment, etc., that the logging-in user is detected to be in.

Another kind of "personal grouping" which the user can specify is his history grouping of recently used TC's or TCONE's, where the user can specify the storage depth (how many TC's and/or TCONE's) and whether it should be TC's alone, TCONE's alone or both.

Yet another kind of "personal grouping" which the user can specify is his filtered history grouping of recent and, for example, heavily focused upon TC's or TCONE's, where the user can again specify the storage depth (how many TC's and/or TCONE's), whether it should be TC's alone, TCONE's alone or both, and what the filtering parameters are to be applied by the automated filtering mechanism (e.g., how intense of a focusing upon qualifies as above threshold and/or what other filtering criteria are to be applied.) In one embodiment, when the user first activates STAN_2 operations in his local data processing device (e.g., hand held computer/phone), rather than immediately going into monitoring mode and feeding back content source recommendations (e.g., chat opportunities) based on currently up- or in-loaded CFi's, the STAN_2 operations first feed the user with recommendations based on at least one of his Home Page TC's and/or TCONE's, his unfiltered history of TC's and/or TCONE's and a user-selected one of his filtered history of TC's and/or TCONE's. In one embodiment, if active interest monitoring (see 312 of FIG. 3A) is turned off by the user, the STAN_2 operations automatically revert to the boot-up mode of displaying content source recommendations based on his Home, unfiltered history or selected filtered history of TC's and/or TCONE's. Only if the user completely shuts off the banner mechanism (315) by clicking on the banner close tool (315xx in FIG. 3A) does the STAN_2 recommendations supplying mechanism shut off in such an embodiment.

Having described several different types of Service-providing BOT's above, it is worthwhile to here note some of the different types of packaged content that such BOTs (e.g., 260, 251, 255, 116a, 116c) may bring back to the hive upon their return from a search and retrieve mission (one defined by the attached mission guiding data structure (i.e. 116b, 116d). Bubble 264 represents a first of the possible different types of cross-pollinating packages and, as can be seen in FIG. 2, this first package type (264, and with help of its payload-carrying CPAP or BOT or in some cases a CPUP) conveys identification information from external platforms such as a user's external user name and external password (optional), and such as an external Group Discussion name and/or ID number and/or ID of discussion thread from an external platform. In one embodiment, each conveyed ID (in the type 1 package 264) that is used in an external platform has attached to it an indication of where it came from (e.g., from which specific external platform (e.g., FaceBook™, MySpace™, LinkedIn™, etc.) if not also from which specific discussion group or which specific discussion thread or other subarea of the external platform it was obtained. In the above-described FIG. 1B, it was already explained how a user (e.g., 132) can convey his own external user name and external password (optional) from one or more external platforms (e.g., 120/220) into the STAN_2 system 110/210. And it has also been already described above with reference to FIG. 1B how the STAN_2 system can then automatically import the external user names (but not passwords) of his friends, buddies, email contacts and so forth if user 132 gives permission for such automated importation of external user ID's. When so importing external user names, one embodiment also attaches to each imported external ID an indication of where it came from so as to thereby inform any software program, or other entity looking at it, as to what specific external platform the imported ID applies if also not informing as to what specific members group and so on.

By using a slightly different procedure than 170 of FIG. 1B, the same user (e.g., 132) can be asked to manually convey or to let the STAN_2 system automatically import the names and/or other identifications (e.g., group numbers) of external platform groups that the user has listed in his external user's account(s) or external profiles or external service providing resources (e.g., MS Outlook™, CRM (Customer Relationship Management) databases, etc.). The conveyance of such information into the STAN_2 system 110/210 helps to expand the user-to-user associations (U2U) which the STAN_2 system can then automatically make as between a STAN_2-monitored first user and his external friend names and/or external favorite group names. Then, in FIG. 3A, when that STAN_2-monitored user (e.g., 132) has his monitoring function turned ON (see box 312 of FIG. 3A), the STAN_2 system can not only automatically make on-topic content recommendations in upper scrollable banner 315 (e.g., recommended chat rooms to join into based on current CFi's), but the STAN_2 system can also automatically inform the user (132) of how many and/or which of his external friends, buddies, contacts, CRM-clients or customers, etc. are already joined into and/or have been co-invited to join into the recommended chat opportunities. Color coding may be used to differentiate between already inside versus co-invited to join friends. More specifically, under chat room recommendation 315b (for identified topic A2), the STAN_2 system 110/210 has also downloaded (or in-loaded) to the user's computer (or up-in the cloud virtual instantiation thereof), information indicating that two (2) of the user's FaceBook™ friends are already inside that chat room, or have been similarly invited to enter that chat room, where one or both such indications (invited versus entered) appear in subscripting info-plate 315b1. By right clicking on plate 315b1, the user may learn of the external user names of those friends and their status relative to the room (e.g., have they already entered and started participating or are they merely in the invited but not yet joined mode?). Similarly for next chat room recommendation 315c (for identified topic C3), the STAN_2 system 110/210 has also downloaded to the user's local display screen 300, information indicating that three (3) of the user's LinkedIn™ contacts are already inside that chat room and that one (1) of them is a member of the Discussion Group number 7 to which he happens to belong. The latter information appears in subscripting info-plate 315c1. By right clicking on plate 315c1, the user may learn of the external user names of those LinkedIn™ contacts and/or of the external names of those LinkedIn™ discussion group(s) if they are already not yet listed on plate 315c1. In the same or an alternate embodiment, similar and/or additional information of this nature may be provided when the user hovers his mouse cursor icon (e.g., 335) over the chat room recommendation (e.g., 315c) and/or right clicks over the content recommendation (e.g., 315c).

When a user's encodings (e.g., focused upon keywords, tags, URL's, facial expressions etc.) are being actively monitored by the STAN_2 system, where for example such active monitoring is continuously indicated to the user by a blinking indicator or the like (and optionally where rate of blink indicates rate of CFi's or CVi's being then up- or in-loaded), the data being thus provided by the user's monitored activities to the STAN_2 system can provide cross-pollination data to the STAN_2 system if, for example, the user is visiting an external content source (e.g., he is playing a new Zynga™ role-playing game, i.e. like Farm-Ville™) that has not been previously recorded as being logically linked to a current topic that the STAN_2 system deems to be on the user's mind. In that case, depending on how 'influential' the given user is deemed to be to the current topic node and/or depending on how many other users have similarly begun to focus on the same or a similar new content source, the STAN_2 system may automatically and responsively link an identification (e.g., URL) of the new content source and/or an abstract derived from that source to the current topic node (or Notes Exchange session, a.k.a. TCONE) that is deemed to be currently associated with the most probable topic(s) the user has in mind and thus incorporation of new, cross-pollinating content takes place even without the user's conscious awareness of it. However, sometimes the user decides to turn the STAN_2 active monitoring OFF (see 312' of FIG. 3B) and/or forgets to turn it on (see 312 of FIG. 3A), in which case when the user comes upon potentially relevant and new cross-pollinating content, the STAN_2 system will not be able to acquire it through the active monitoring and background intake process.

Still referring to FIG. 3A, it will now be explained how a now-still-being-monitored STAN_2 user (e.g., 132) can be asked to volunteer (318a) to bring back to the STAN_2 system even from his STAN_2 un-monitored activities, yet more information (beyond his external aliases of record 184), which this time can include those of cross-pollination package type 2 (associated keywords, tags, meta-tags, MetaWeb™ entity identifiers, etc.) of bubble 262 where the latter can also be conveyed by the illustrated CPAP 260 or by a STAN-REP with help of in-loaded spyware (132s— to be described below). (Explanation: MetaWeb™ entity identifiers incidentally are meta-tag like buried identifiers that may be used in place of or in addition to keywords where such MetaWeb™ entity identifiers act to remove some of the ambiguity that may otherwise be present in keywords with multiple meanings. It is to be noted that mere removing some of the ambiguity that may otherwise be present in a keyword may not of itself reveal the specific topic that a user is most likely to be subjectively and intently thinking about.)

But before explaining the popped-out Please-Volunteer pane 318, one additional mechanism, 315ss of the STAN_2 user interface will be described. Mechanism 315ss of FIG. 3A represents an opaque or optionally translucent and thus "shadow"-like pull down window shade (a.k.a. 'shadow shade') that may be unscrolled and rescrolled at the user's behest. Various mouse gestures and/or finger gestures (on touch pad or touch screen) may be pre-programmed to initiate the window shade unscrolling (partial or over entire display, whole unscrolling) and rescrolling (partial or whole) operations of mechanism 315ss. Of course, pre-programmed hot keys or pop out menus may also be used. Although not shown (due to space limitations in the drawing area of FIG. 3A), when the full unscroll in shadow mode operation of mechanism 315ss is instigated by user action (and sometimes automatically by a user permitted script), the display is operated to give the impression that a translucent screen is being pulled down over the original screen area the user is viewing. This translucent screen (not shown, and whose degree of translucency can be controlled by the user) has on it translucent images of the chat opportunities (e.g., 315b) and/or of other content source recommendations (e.g., 315a) being then provided by the STAN_2 system. However, unlike the case of the partial opaque unscroll mode shown in FIG. 3A, when full unscroll in shadow mode is actuated, each displayed chat opportunity (e.g., 315b) and/or of other content source recommendation representing glyph (e.g., 315d) moves to translucently overlie the on-main-screen content (e.g., pane 317) to which that translucent recommendation glyph most closely associates with. More specifically, chat opportunities glyphs related to general Topic 'A' (such as glyphs 315a and 315b for example) will appear to float translucently over content pane 317 (also logically linked to general Topic 'A'). Similarly, chat opportunity representing glyph 315d (and its associated gadgets if those are being displayed) will appear to float translucently over content pane 330a which; like glyph 315d, is most logically linked to general Topic 'D' (and more specifically, to subtopic D2). A variety of user input actions may be preprogrammed to indicate that they apply to either the main screen or the pulled thereover translucent shadow screen. Accordingly, a user may not need to move his finger, stylus, or other pointing/actuating device far away from an item (e.g., 330a) on the main screen in order to activate and operate on a corresponding shadow screen item (e.g., TC flag 315e) for drag-and-drop operation (e.g., 336e described elsewhere herein) or opening or other activity. In one embodiment, when the scrollable recommendations showing mechanism 315ss is fully scrolled up (and optionally minimized with tool 315mm), the blink rate monitoring warning area 312 and/or sliding volume and importance scales (not shown) optionally provided thereon let the user know what volume and/or rate of incoming recommendations he is not seeing due to the scrolled up (or minimized) state of showing mechanism 315ss and what min/max and/or average importance ratings (e.g., temperature) of the current recommendations are.

As mentioned elsewhere herein, in one embodiment, just because CFi-based monitoring (312) is turned off, that does not mean that the STAN_2 automatic recommendations function is turned off. In one embodiment, as long as the user does not click on the close-banner-function tool 315xx, the illustrated one banner 315 continues to supply content source recommendations; except that in this case the recommendations in that banner 315 are based on at least one of the user's Home Page of TC's and/or TCONEs, his recent History Page of TC's and/or TCONEs, or another filtered subset of T' TC's and/or TCONEs where T' is set by the user to an appropriate value such as his Top 3 or Top 5 favorites and the filtering function is also programmably established by the user to, for example, provide his Top T' of most heavily focused upon TC's or his Top T' of most heavily participated in TCONE's.

Although FIG. 3A shows only one un- and re-scrollable banner 315 at the top of the screen 300, in one embodiment, a user may alter the STAN_2 operation settings of his local data processing device (e.g., 131a) so as to have multiple recommendations-providing banners like 315 running at the same time, for example all in minimized mode (in a bottom screen tray area 315tt in the form of minimized recommendations-providing banners such as Bannr2 and Bannr3 for example). Each recommendations-providing banner (e.g., Bannr1-Bannr3) can have its recommendations driven on a different basis. More specifically, if in FIG. 3A and for one embodiment the user hovers his cursor (335) over the question-mark tool (adjacent to banner-minimizing tool 315mm), the user's data processing device (e.g., 131a) automatically responds by showing what the driving basis of that banner (e.g., displayed top banner Bannr1 315) is, where in the illustrated example, the hover-provided indication 315hh shows that Bannr1 (a.k.a. 315) is currently being primarily driven on the basis of the user's current CFi's. However, if the user had hovered over minimized and in-tray (in 315tt) Bannr2, the corresponding hover-provided indication (not shown) might have shown that the latter recommendations-providing banner (Bannr2) is being primarily driven on the basis of the user's specified Home Page TC's and/or TCONE's. If the user had instead hovered over minimized and in-tray (in 315*tt*) Bannr3, the corresponding hover-provided indication (not shown) might have shown that the latter recommendations-providing banner (Bannr3) is being primarily driven on the basis of the user's specified, recently heavily focused upon history grouping of TC's and/or TCONE's. Any one or more of the minimized and in-tray (in 315*tt*) banners may be de-minimized and moved to a user-picked location on screen. For example, the user may elect to stack a plurality of de-minimized and recommendations-providing banners (e.g., Bannr1-Bannr3) one just below or even slightly overlapping the next. The user may elect to differently color code his different banners so that he can easily tell them apart.

In one embodiment, the user may design and store a recommendations-providing banners defining page (not shown) where the latter displays a grid of minimized banner boxes like those of tray 315*tt*, each with its own unique color perhaps and each with its own unique name if desired. The user may right click on selected ones of these minimized banner boxes and choose an Add-Now to main screen function where upon the selected banner will be activated into its recommendations-providing mode and appended to tray 315*tt*. Another chooseable selection that the user has shown to him when right clicking on a banner box in his stored recommendations-providing banners defining page (not shown) is Change Auto-Trigger and Other Settings.

The latter, optional function can be user activated so that different recommendations-providing banners become activated or de-activated in automatic response to different triggering events, such as for example, detected time and place. More specifically, assume the user (e.g., Tom) has certain daily habits. When he gets up in the morning at home, he likes to read (or view) the latest news and gossip about his favorite sports teams. Later, when he gets to the office and has his second cup of morning coffee, he likes to read (or view) the latest news and gossip about his favorite financial topics and his favorite world politics topics. Then in the afternoon he likes to catch up on the latest news and gossip concerning his career. In one embodiment, that user (e.g., Tom) can pre-establish and store different personal groupings of his favorite TC's and/or TCONE's, for example a first whose corresponding content source recommendations will automatically cause a corresponding and activated recommendations-providing banner (e.g., Bannr2) to display recommendations regarding the latest news and gossip about his favorite sports teams. The user can program the banner box that is driven on the basis of this first personal grouping to be automatically activated (triggered on) in response to machine system detection that he is at home (e.g., based on GPS readings) and it is morning and it is a weekday; but to shut down (become de-activated) by 12 noon. Continuing with the example, the user (e.g., Tom) can pre-establish and store a second personal groupings of his favorite TC's and/or TCONE's so that the latter will cause the corresponding and activated recommendations-providing banner (e.g., Bannr3) to display recommendations regarding the latest news and gossip about his favorite financial topics and his favorite world politics topics. The user can program the banner box that is driven on the basis of this second personal grouping to be automatically activated (triggered on) in response to machine system detection that he is at the office (e.g., based on GPS readings) and it is morning and it is a weekday; but to shut down (become de-activated) by 3:00 PM. A third personal groupings of his favorite TC's and/or TCONE's and activation criteria for the banner box driven by it can be similarly formulated and stored so as to meet his personal desires for seeing career related news after lunch and so on.

When it is explained above that the displayed recommendations of illustrated Bannr1 (a.k.a. 315) are being primarily "driven" by currently uploading (or in-loading) CFi's; as is indicated by the illustrated hover-over response 315*hh* of FIG. 3A, it is to be understood that current user CFi's are being fed to one or more DLUX servers (not shown) of the STAN_2 system and the DLUX servers are then responsively generating signals indicating the probable topic nodes whose topics are probably the ones on the mind of the monitored user. Thereafter, the STAN_2 automated DsMS sub-systems (the automated Domain-specific Matching Services) are converting the probable-topic-of-interest signals received from the DLUX('s) into corresponding content source recommendation signals (e.g., chat opportunity indicating signals) which are then ranked and the top ranked ones are displayed horizontally across illustrated banner 315 at a user pre-selected recommendations presenting rate. The term, "primarily" as used in conjunction with how a banner is being driven is to be understood as indicating that there could be other, secondary drive mechanisms, for example, an occasional "surprise me" recommendation may be displayed even though the uploaded CFi's did not directly cause the same to be generated.

On the other hand, when another displayed banner (say Bannr2) is said herein to being in a mode where it is primarily driven on the basis of the user's specified Home Page TC's and/or TCONE's, then generally speaking there will be no need to use the STAN_2 DLUX's (the automated Domains/Topics Lookup Services inside 110) because at least the broader topics of current interest will have already been pre-specified in the user's Home Page of favorite TC's and/or TCONE's by the favorite TC's recorded therein. Moreover in the case where it is a favorite TCONE that is pre-specified in the user's Home Page of favorites, there may also be no need to use the STAN_2 automated DsMS sub-systems (the automated Domain-specific Matching Services) because a co-compatible chat opportunity or alike content source (if it still exists—some chat rooms can close and disappear) will have already been picked out and specified. However the relative rankings of the Home Page TC's and/or TCONE's (assuming those TCONE's have not closed or drifted far away) is still a variable to be played with because the user may prefer to rank some topic centers (TC's) as being more favored than others within his Home Page and some TCONE's as being more favored than others recorded within his Home Page. To this end, in one embodiment of the STAN_2 system, the user is given the option of logically attaching different preference weights to the respective TC's and/or TCONE's recorded within his Home Page. Then, as between the various TC's recorded within his Home Page, the more heavily weighted and thus more heavily preferred will be submitted to the STAN_2 automated DsMS sub-systems more frequently (at least on average even if not so consistently) than the less heavily weighted and thus relatively less preferred; and as a result, recommendations (e.g., 315*b*, 315*c*) based on the user's more heavily preferred TC's will on average tend to appear more often on the user's, Home-Page driven banner (e.g., Bannr2; shown as minimized in tray 315*tt*) and content source recommendations based on the user's less preferred TC's will on average tend to appear less often.

In one embodiment, even where the user has recorded specific TC's in his Home Page as being the preferred TC's of interest, when the Home Page driven banner (e.g., Bannr2) is active, the STAN_2 system nonetheless automatically submits the identified favorite TC's of the user's Home Page to its DLUX's (the automated Domains/Topics Lookup Services inside 110) with a request that the DLUX's lookup other TC's with substantially similar topics. The submission of the user's current Home Page favorite TC to the DLUX's may be accompanied with, and logically linked to, a submission to the DLUX's of the user's recorded, recent topics of interest (rTOI's). The rTOI's may be used by the DLUX's to better determine what other TC's are closest in topic space 215 to the user's Home Page favorite based on the user's recent history. Typically, a user's interests do not jump discontinuously from one topic to a completely new topic overnight. Instead they tend to evolve over time and have some continuance from recent topics of interest (rTOI's). Accordingly the DLUX's may use the user's rTOI's in combination with the user's Home Page identification of what is his Home Page favorite TC('s) to better identify what other TC's in the STAN_2 topic space 215 are more likely than not to be of further interest to that same user.

When the DLUX's of the STAN_2 system lookup the additional TC's that are probably interrelated to the user's Home Page favorite TC('s), in one embodiment, the DLUX's take into account a recent recorded history of the so-called captains and mutineers of the Home Page listed TC as such compares to the date when the user's Home Page favorite TC('s) were recorded as such in his Home Page. Recall that most TC's (except the fixed reference point ones) can drift over time just as TCONE's can drift over time in the usually changing STAN_2 topic space 215. Accordingly, the TC that the user recorded as being his favorite a month ago may no longer be the same positioned TC because during the month it drifted to a new position in the STAN_2 topic space 215. The DLUX's may conclude, based on when this user last visited the Home Page identified TC, that the user intends to navigate to a topic space position corresponding to where his listed TC was a month ago, when the old captains of the TC were in charge as opposed to a new topic space position that the Home Page identified TC has drifted to ever since the mutineers took command two weeks ago. In one embodiment, rather than offering just content sources (e.g., chat opportunities) derived from his Home Page identified TC (when Bannr2 is activated), the STAN_2 system also automatically offers as recommended alternative content sources, those derived from TC's that remained in the original topic space vicinity of the Home Page identified TC (e.g., a month ago) before it drifted. When the user preferentially picks one choice over the other, the STAN_2 system can use this as an adaptive learning experience (e.g., using neural net adaptive technology for example) to know for the next time what content source recommendations to offer more aggressively when the Home Page identified TC drifts yet again (e.g., in one month in the future).

Similar to the way that Home Page identified TC's are managed, if the user chooses to differently weigh his favorite TCONE's (if any) recorded on his Home Page of favorite TC's and/or TCONE's with one particular skew or another, the recommendations displaying sub-system (not shown) will automatically favor the making of the more heavily weighted TCONE's over the less weighted ones. In one embodiment, however, a fair chance mechanism is incorporated into the automated ranking and selecting mechanism of the recommendations displaying sub-system (not shown) and operated such that even the lowest weighted of the favorite TCONE's on the Home Page shows up (e.g., drops into a displayed newspaper-like column) on Bannr2 with a frequency corresponding to its relative weight as compared to the weights of the more heavily weighted TCONE's recorded within the user's Home Page. The deemed hottest recommendations will remain displayed on the banner (e.g., Bannr2) and thus if and when it is given such a fair-chance, a recommendation for the lowest weighted of the favorite TCONE's rises up from under the least hot of the already displayed recommendations. A similar, fair chance mechanism is incorporated into the automated TC submitting mechanism that automatically submits the user's favorite TC's of his Home Page to the STAN_2 automated DsMS sub-systems so that over the long haul, the DsMS will provide content source recommendations for display on Bannr2 where those recommendations are derived from the user's least weighted, but nonetheless favorite, TC on a frequency basis corresponding to its relative weight as compared to the weights of the more heavily weighted TC's recorded within the user's Home Page.

Also similar to the way that the possibility of drift by the Home Page identified TC's is managed, one embodiment of the STAN_2 system automatically submits the Home Page identified TCONE's to the DsMS services with a request that the latter automated Domain-specific Matching Services nonetheless locate other TCONE's similar to the Home Page identified TCONE's. This is done for at least two reasons. Firstly, a Home Page identified TCONE that was recorded into the Home Page say a month or two ago may have drifted significantly in topic space 215 since new captains took over. Secondly, the Home Page identified TCONE of say two months ago may no longer exist or its participants may have abandoned it and it now floats as a ghost ship in the STAN_2 topic space 215. What the user is typically desirous of is a now active TCONE that substantially matches what the old TCONE used to be. Accordingly the STAN_2 system automatically gives the user a choice as between the old TCONE and one or more fresher TCONE's that substantially match the attributes of the old TCONE (the one recorded in the user's Home Page) but are more recently active with users and also more conform to the user's recorded recent history of the topics of interest (rTOI's). Additionally, since the DsMS services tend to provide recommendations that are more in tune with the user's current mood and currently activated profiles, content source recommendations provided through use of the DsMS services will tend to be more in tune with what the user wants now (e.g., a TCONE with a hot debate raging therein) as opposed to what the user may have wanted a month or two ago when the Home Page identified TCONE was recorded in that Home Page.

In one embodiment, the STAN_2 system also provides an automated, "surprise me" function wherein, rather than using the assigned and recorded weights of the favorite TC's and/or TCONE's on the user's Home Page (or less drifted away equivalents thereof), the system randomly picks out TC's from the Home Page to periodically forward to the DsMS services and/or randomly picks out TCONE's from the Home Page to periodically forward to the recommendations displaying sub-system (not shown) that populates the corresponding banner (e.g., Bannr2, Bannr3, etc.) with scrolled-in (e.g., scrolled-down into newspaper-like columns) recommendations at a user-selected or automatically-selected recommendations making rate. The automatically-selected recommendations making rate may be based on various importance ranking algorithms wherein the user's known preferences for certain influential other users (e.g., TPP's) and/or known preferences for certain topics causes the scrolling (e.g., replacement) rate to decrease when the associated "temperature" or heat rises; this typically indicating that discussions over a certain favorite topic of the user's are heating up and the user will probably want to have that recommendation kept in view. At the same time, temperature gauge (not shown) in region 312 might show the increased "hotness" thereby alerting the user to what is going on.

In summary, a user can program any one or more of his locally-used data processing devices (132a, 132b, etc.), if their available resources so permit, to operate in automatically triggered multi-banner mode and one of those banners (e.g., Bannr2) may be feeding recommendations primarily based on the user's Home Page of favorites while another of those banners (e.g., Bannr3) may be feeding recommendations primarily based on another pre-weighted grouping of TC's and/or TCONE's specified by the user or even by STAN_2 operators if the user elects to use one of the editor's choices groupings to drive one of his activated banners. In such cases, the one or more recommendations-providing banners (e.g., 315, Bannr2, Bannr3) that unfurl on the user's screen (300) will appear as if they are like personalized television-channel-guide scrolls that are custom made for him, with the scrolling-in recommendations made within each banner offering him more detailed and on-respective-topic(s) content as well as in-tune with mood and surroundings content (e.g., with each news-paper column like and scrolled down new recommendation being like a content supplying channel in its own respects) for him to pop open and probe deeper into if he so chooses. These personalized television channel guide-like banners will appear to intelligently change according to time and the place he happens to be at (as well as perhaps his current mood) thanks to the automated place and time banner triggering mechanisms as well as mood and past history detecting mechanisms. Stated otherwise, in one embodiment, the user may program certain ones of the multiple banners to be automatically activated and de-activated based on his mood changes as detected by his up- or in-loaded CFi's as well as being based on time, place and/or other triggering encodings. Of course, display of the STAN_2-recommended chat opportunities and/or other content sources need not be in the form of scrolling marquee-style banners like 315. The recommendations could, for example, pop up one at time at a rate of one changed recommendation every 30 seconds in a Picture-Picture (PiP) grid that has, say 4 squares and each square is dedicated to a respective and currently activated, drive basis means (e.g., one being the user's currently uploaded CFi's, the second being user CFi's uploaded 4 hours ago, the third being TC's and/or TCONE's of his Home Page and the fourth being another personal groupings of his favorite TC's and/or TCONE's).

Now finally referring to the Please-Volunteer pane 318 of FIG. 3A, assume that while an in-STAN user (e.g., Tom 132u1) is doing research online on a given topic of interest to him (let it be called topic 'A'), where the research is conducted under the auspices of an external content provider (in this case FaceBook™ as is indicated in open window 317), the user (Tom) has his STAN_2 monitoring function turned ON. In one embodiment, the state of that active monitoring is displayed to him by status box 312 (optionally blinking and/or optionally having rate and importance gauges (not shown) included therein). Assume the STAN_2 system has determined from recent intense activity by the user (132; for example from his recently uploaded Tom's CFi's) as well as his historically tracked past activities that the user (Tom version of 132) may be classified as a potential evangelist for topic 'A'. Since the user is detected to now be again intensely involved with topic 'A', but taking a short break (in a machine-detected user idle mode); the STAN_2 system automatically pops open a somewhat intrusive proposal as shown by pushed dialog box 318. There could be various reasons why the STAN_2-monitored user will agree to becoming a so-called STAN-REP with regard to topic 'A' when the latter topic is covered by content appearing on an external platform such as FaceBook™. One reason for volunteering is that the potential evangelist (Tom) for topic 'A' may wish to promote discussion about topic 'A' (it could for example be a political cause Tom strongly believes in) among a greater number of people and that alone is reason enough for agreeing to be a STAN-REP for topic 'A'. Alternatively or additionally, the STAN_2 system may offer various types of incentives such as lottery prize opportunities or accomplishment-based prizes (e.g., being pictured as the STAN-REP of the Month to his peers) for participating STAN-REP's who produce above average results. For example, monetary and/or subscription level enhancement prizes may be given out to participating STAN-REP's who are voted by members of their respectively serviced TC's or TCONE's as having brought in the best and most useful cross-pollination data (CPD) this month, week, day, etc.. The awarding of such prizes may be communicated to other STAN-REP's so as to encourage the rest to try harder. In one embodiment, and of importance, the BE-A-STAN-REP proposal 318 is pushed onto this particular registered member (e.g., Tom 132u1) of the STAN_2 community because he is proficient in two or more languages that are highly useful for the topic being covered by the particular STAN_2 system node (or TCONE) from which he will be launched (similar to how a CPAP is launched—see FIG. 4B) and/or he is proficient in an esoteric technical aspect of the topic and/or in esoteric technical or slang jargon used with respect to the topic. By way of example, let it be assumed that Topic A is a technical one which is covered by German and Swedish periodicals as well as technical peer-reviewed journals written in English. (Note the optional German and Swedish discussion groups in discussions space 225 of FIG. 2.) If the user who is being invited to BE-A-STAN-REP (318) in FIG. 3A is proficient in one or both of German and Swedish as well as English, he may be particularly of value to the other members of the launching TC or TCONE (e.g., 216n) who are not equally proficient in one or both foreign languages because he can identify topic relevant content within the foreign language using discussion groups and he can cause that foreign-based content to be returned to the hive, for optional automated translation by the STAN_2 system before it is presented as a post-translation proposed cross-pollination data package (262/264/252) for possible absorption by the launching TC or TCONE (e.g., 216n). As a result, English-only conversant members of Tom's on-Topic 'A', favorite TCONEs or TCs may have intelligible access to on-topic information from the foreign language using content sources thanks to Tom's ability to use multiple languages and Tom's willingness to serve as a STAN-REP.

The pushed proposal window 318 (e.g., "Please volunteer") has an external language specifying area 318aa in it. The illustrated example indicates that the system is asking the would-be-volunteer (Tom) to serve as a STAN-REP for English-only discussion groups in the named external platform (e.g., FaceBook™) However, if the would-be-volunteer's personal profile records (e.g., Tom's active CpCCp or active DsCCp's—see giF. 1B and 1C) indicate he is generally proficient in one or more foreign languages, or better yet he is (as is indicated in his active DsCCp's) proficient in an on-topic highly technical and/or esoteric aspect of the one or more foreign languages (where technical jargon in foreign languages may not be known to lay speakers of those languages just as technical aspects of English; i.e. those relating to chemistry, physics, advanced math, etc. may not be understood by lay speakers of English), then the pushed proposal window 318 could have alternatively and automatically asked in region 318aa for the would-be-volunteer to serve as a STAN-REP for German-only or combined German and English discussion groups in the named external platform (e.g., FaceBook™). The proposed language combinations may be trilingual as well as bilingual. The proposed language options of window region 318aa may alternatively or additionally indicate a desired technical jargon proficiency as well as language proficiency. For example, and even though not shown in FIG. 3A, window region 318aa might have indicated a need for proficiency in English AND Biochemistry or a need for proficiency in Japanese AND Computer Science, and so on. The method of presenting the "Please Volunteer" proposal 318 may vary depending for example on the nature of the local data processing device (e.g., 132a) that the proposed-to user (e.g., Tom) is using when the proposal is made. More specifically, if the local data processing device is set to use an audio-only interface (because Tom is driving his car at the time, the "Please Volunteer" proposal and responses thereto may be carried out in an audio-only mode. On the other hand, if the local data processing device the proposed-to user (e.g., Tom) is using at the time the proposal (318) is made has a relatively small viewing screen (e.g., it is a small palm held device), different parts of the proposal may be presented in sequence and voice-over audio explanations may be provided at the same time to the user (e.g., Tom) to make it more clear what is being proposed and why and what alternative options are available.

In one embodiment, the would-be-volunteer (Tom) may activate the scroll down options tool (the down-pointing triangle) in the variable language proposing region 318aa to thereby pick an alternate option. More specifically, with such a pick, the would-be-volunteer may be indicating back to the STAN_2 system, 'Thank you for asking. However, although my profile indicates I am proficient in technical Russian as well as in Quantum Mechanical Physics, I am not feeling up to such a challenge and instead I am willing to volunteer only for English and Newtonian Physics'. If after that, the user hits the OK pushbutton 318b, the STAN_2 system may approve the counter offer or it may politely turn him down.

Before moving on to describe other virtual pushbuttons of popped up pane 318, it is to be noted that just as there may be need for would-be-volunteers to serve in multi-lingual environments (e.g., English and Korean) and/or in highly technical subareas of specified languages (e.g., Chinese and Semiconductor Fabrication expertise); in the case of some topic areas there could be a desire for would-be-volunteers who are proficient in two or more areas of expertise that are normally far apart from one another. By way of example, consider the well known book in computer science by Fredrick R. Brooks, entitled "The Mythical Man-Month", 1995 (ISBN 0-201-83595-9). It describes how adding more workers to a software development project can not only fail to speed up completion of the project, but may very well slow it down severely or cause the project to fail all together. Consider also for sake of example, an area of economic study known as transaction cost theory and Managerial-Behavioral theories. In one sense transaction cost theory and the like can cross-correlate with aspects of The Mythical Man-Month. Typically, computer science professionals flock into discussions mostly with other computer science professionals and economics theorists flock together mostly with other economics theorists (per the adage, birds of feather flock together). However there may be instances where a discussion group on computer science (e.g., discussing The Mythical Man-Month) may be drifting in terms of discussed topic toward confluence with a discussion group on economics (e.g., that happens to be discussing Managerial-Behavioral and transaction cost theories). In such a case it may be useful to members of both groups to merge their discussions. However, a competent cross-disciplinary person is often needed to bridge the language chasm between the two disciplines. More specifically, the computer science professionals may use a first language "frame" that is unique to computer scientists and the economics theorists may use a different second language "frame" that is unique to them, whereby only a competent-in-both cross-disciplinary person can serve as a living Rosetta Stone, so to speak and thus help create a cross-frame dictionary (see briefly 406c of FIG. 4C) that allows the two otherwise disparate groups to beneficially exchange notes with one another. Incidentally, the examples given above of cross language and cross discipline capabilities are to be viewed as non-limiting examples. A given volunteer such as Tom may be someone who can speak in a lay-person's terms or in a specific type of slang while also being proficiently conversant in a highly technical area and that would-be-volunteer might be willing to serve as a go-between simplifier or translator for a first group of lay-persons whose topic of discussion centers about a subject having the highly technical area at its core. In one embodiment, the STAN_2 system automatically recognizes this special attribute of the would-be-volunteer (Tom) from his personal profile records and asks him to volunteer on this basis by locating external content that correctly explains the highly technical area in terms that are understandable by lay members of his home TCONE (e.g., his favorite in-STAN discussion group, i.e. 216n on this Topic 'A').

To summarize therefore, in accordance with one aspect of the present disclosure, proposal defining region 318aa of popped up pane 318 can present the would-be-volunteer (Tom) with a cross disciplines proposal (as between two or more normally disparate disciplines). Once again, the reason that the STAN_2 system would be proposing such an esoteric, cross-disciplines proposal to a given one of its users is because that user's personal profile records (e.g., Tom's active CpCCp or active DsCCp's—see giF. 1B and 1C) indicate he is proficient to a predefined desired level in both disciplines. If the would-be-volunteer accepts (e.g., by activating the OK button 318b), then later, when he is responding to STAN-REP survey questions (see 320b of FIG. 3C), he will be helping the STAN_2 system to develop and store a cross-disciplinary and Rosetta Stone-like, lookup table (see again 406c of FIG. 4C) whereby keywords, tags etc., of a first identified discipline are cross-correlated to keywords, tags etc., of a second identified discipline. This recorded cross-disciplinary, Rosetta Stone like lookup table may be later used to compile and augment mission guiding data structure (i.e. 116d' of FIG. 4B) for launched CPAP's where the cross-disciplinary augmentation allows a launched Cross-Pollinating Artificial Persona (CPAP) to automatically find external cross-disciplinary Notes Exchanging nodes (e.g., external discussion group sessions) where members of the otherwise disparate discussion groups (NE's) may benefit from exchanging cross-pollination material with one another.

Still referring to FIG. 3A, some of the virtual pushbuttons in box 318 are substantially similar to those described above for dialog box 182 of FIG. 1B and thus their function need not be described again, namely, pushbuttons 318*b*, 31*bc* and 318*d*. Introduction message 318*a* informs the user that he is being asked to volunteer to be a special envoy or representative for the STAN_2 system (optionally in a foreign language and/or special discipline) but while he is operating in semi-monitor-free mode within an external platform (FaceBook™ in this example) and he appears to be focused upon topic 'A' while under auspices of the external platform (FaceBook™ in this example). By activating virtual pushbutton 318*g*, the user can get more information about what this means (including information about potential prizes for agreeing to serve as a STAN-REP). Additionally, in one embodiment, right clicking (Rt.Clk.) on introduction message 318*a* provides help and/or more information.

Activation of pushbutton 318*e* (Not This Topic) lets the STAN_2 system know that the user (e.g., Tom 132*u*1) wants to be an evangelist (a STAN-REP) because he is passionate about a certain topic (e.g., a different political cause), but not this specific topic 'A'. Basically, he is letting STAN_2 know that it guessed wrong as to what his greater topic of passion is. Perhaps it is topic 'D' or more specifically, sub-topic 'D2' of open frames 330*a* and 330*d* where he had just been doing some research using the GoogleWave™ and Google-Goggles™ tools respectively. (GoogleGoggles™ is a search engine tool that receives images as input rather than search words and returns associated webpages or the like as its results. See results panel 330*g* of FIG. 3B. GoogleWave™ is project collaboration tool which can return collaborative research results such as in panel 330*c* of FIG. 3A.) In response to the user pressing pushbutton 318*e*, the STAN_2 system may present a next dialog box (not shown) asking for information about what alternate topic the user has in mind. In one embodiment, the STAN_2 system has predefined criteria for who may or may not operate as a STAN-REP while soloing inside an external platform (e.g., FaceBook™, LinkedIn™, etc.) and may politely refuse the user's offer to volunteer as a STAN-REP for the alternate topic if the user has insufficient credentials in that alternate topic (e.g., not enough of a historical record evidencing probable proficiency, trustworthiness, etc., in that topic 'D'). In one embodiment, there is higher level or STAN-SUPER_REP, which level is occupied by especially trusted and reputable registered members of the STAN_2 system who are allowed to operate essentially as free-ranging human bumble bees; to go anywhere they like and bring back any sort of new cross-pollination data they want and present it to the DLUX servers and/or to any topic node they choose. When a STAN-SUPER_REP presses 318*e* (Not This Topic) or next described 318*f* (Not This SN), the STAN_2 system lets the STAN-SUPER_REP define whatever alternate topic and/or alternate external platform he/she chooses because the STAN-SUPER_REP is pre-designated by system operators to be a free-roaming representative who is trusted to pick out any online content he/she deems to be noteworthy as a linking package to be brought back to the STAN_2 collective hive. The STAN-SUPER_REP's unlimited ability to choose any alternate topic and/or alternate external platform with depression of pushbuttons 318*e* and 318*f* applies more to FIGS. 3B-3D as shall soon be appreciated. In one embodiment, the STAN-SUPER_REP can self-initiate the posed survey popups of FIGS. 3B-3D (popups 320, 320*b* and 320*c*) rather than waiting for an accepted and downloaded (or in-loaded) spyware program (132*s*) to automatically push the surveys onto the then out-of-STAN user (e.g., Thomas 132*u*2).

Activation in FIG. 3A of pushbutton 318*f* (Not This SN, not this social network) lets the STAN_2 system know that the user (e.g., 132) wants to be an evangelist (a STAN-REP) because he is passionate about this certain topic 'A', but he does not want to be the STAN-REP inside the specific external platform (e.g., FaceBook™) that he happens to be using in window 317 but rather a different platform. In one embodiment, right clicking (Rt.Clk.) on various pushbuttons or messages whose function the user does not fully understand (e.g., PB 318*f*) provides help and/or more information about the function and options of the right clicked-on entity. In response to the user pressing pushbutton 318*f*, the STAN_2 system may present a next dialog box (not shown) asking for information about what alternate platform the user has in mind and optionally presenting the user with a list of plausible selections. In one embodiment, the STAN_2 system has predefined criteria for who may or may not operate as a STAN-REP while soloing inside specific ones of external platforms and may politely refuse the users offer to volunteer in the alternate platform if the user has insufficient credentials in that topic (e.g., not enough of a historical record evidencing probable proficiency in that topic 'A' or not a STAN-SUPER_REP) so as to warrant him becoming a volunteer STAN-REP (a CPUP) while soloing in certain external platforms for which the STAN_2 system operators indicate (through pre-programmed software) that they want more credentialed CPUP's.

Figure 3B:
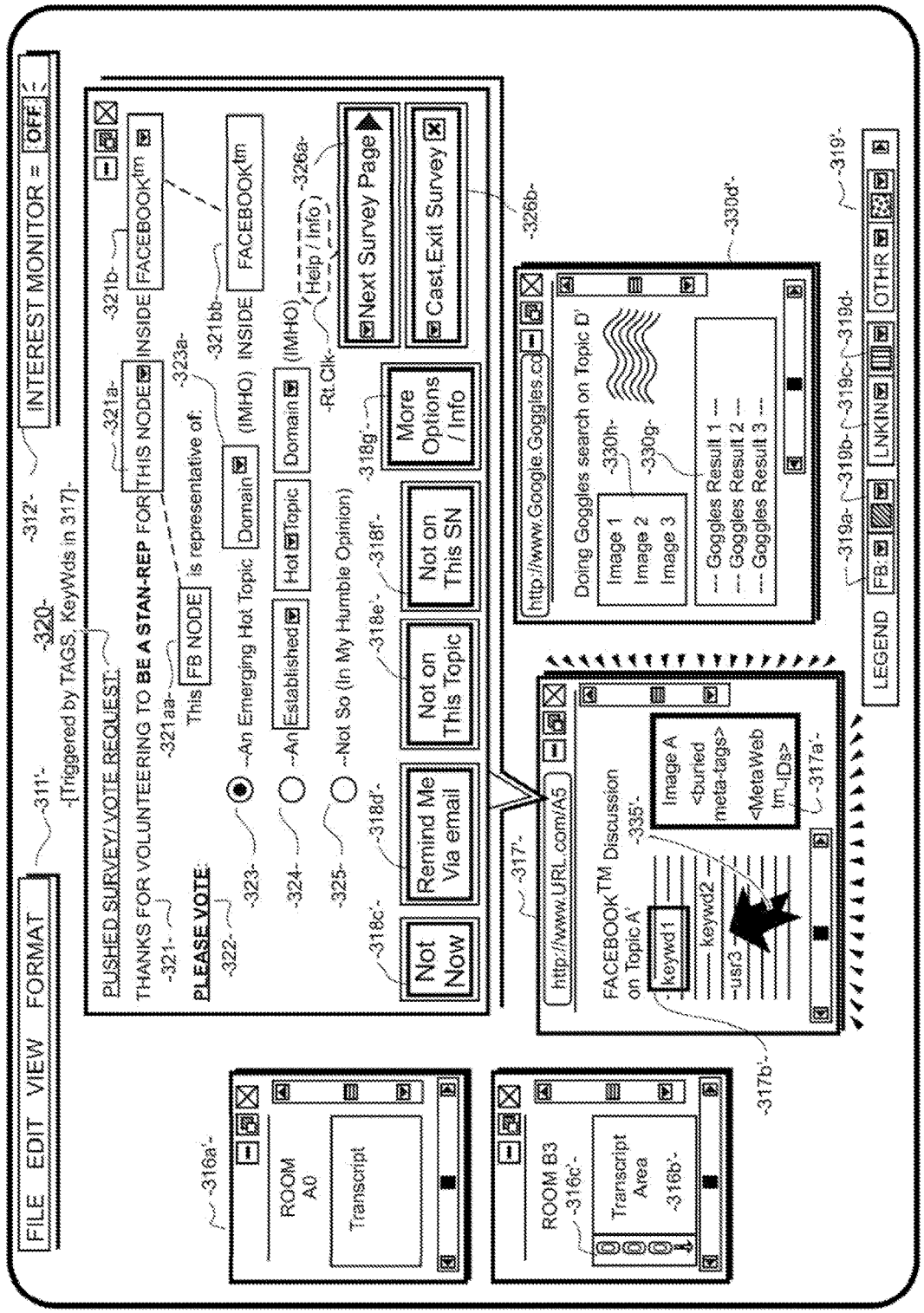
FIG. 3B is a diagram showing a first on-screen presentation wherein STAN_2 monitoring (e.g., CFi uploading) is turned off and an enlisted cross-pollinating un-artificial persona (CPUP) is nonetheless surveyed about attributes of potential cross-pollinating material which might warrant being linked into.

Before moving on to FIG. 3B, it is to be observed in FIG. 3A that one embodiment of the STAN_2 system 110/210 downloads (or in-loads) chat opportunity recommendations (or tweet viewing opportunities other on-topic content source accessing opportunities) like 315*a*, 315*b*, 315*c*, 315*d* with additional information objects tacked onto the content source recommending (e.g., chat opportunity) glyphs. The tacked on, additional information objects may include one or more of: (a) an indication (e.g., 315*b*1) of how many friends, buddies, contacts, etc. from an external platform are already logically linked to the recommended content source (e.g., to chat opportunity 315*b*, because they accepted and/or because they were co-invited); (b) an indication (e.g., 315*c*1) of how many or what external groups (e.g., Group 7 in plate 315*c*1) are logically linked to the recommended content source by virtue one or more of their members being logically linked to the recommended content source, and if so, optionally indicating how such members of the group are so linked (e.g., accepted or merely co-invited); (c) an indication of what topic the recommended content source (e.g., chat opportunity 315*c* identified as tied to topic C3) focuses on; and (d) an identification of important/famous// influential people (e.g., Ken54(TPP) in plate 315*d*1) who are currently logically linked to the recommended content source (e.g., chat opportunity 315*d*), where importance may be as deemed (predefined) by the individual user (e.g., 132) viewing the screen 300 and/or importance may be defined as deemed so by a group of people whom the individual user has pre-identified to the STAN_2 system as being his delegated selectors of important people to follow. As already explained above, TPP means Tipping Point Person and in one embodiment, the system flashes a special TP icon 315*f* to help the user intuitively appreciate the significance of who is being identified as an influential and followed-persona (e.g., Ken54) that is now deemed to be logically linked to the given chat opportunity (or other recommended Notes Exchange session). Upon seeing the flashing TP icon 315*f*, the user may instantly think to himself, "Why if Ken54 is now logically linked to that recommended content source (e.g., chat opportunity 315*d*), then I definitely want to look in on it right now". In that case the user may immediately double click inside the border of recommendation glyph 315d so as to add that chat room to his left panel of already opened and being followed chat rooms (316a, etc.). In one embodiment, there is also a temperature gauge icon 315g that is movably attached to the central body of the recommendation glyph 315d. It indicates how "hot" the recommended content source (e.g., chat opportunity D2) currently is based on a weighted sum of heating and cooling attributes that may be logically linked to that recommended content source, for example due to certain pro and con (for and against) influential persons now being engaged in a heated Notes Exchange session within that recommended content source. In one embodiment, the user may use his cursor to move a probe tip (hatched triangle area) of the temperature gauge icon 315g to instead contact the TC flag 315e and thereby indicate how "hot" the associated topic center currently is. Or the user may move the probe tip to instead contact a gadget representation of a specific persona (e.g., Ken54) or group name (see 315c1) to thereby cause the temperature gauge icon 315g to instead indicate how "hot" the associated persona is or how "hot" the associated named group is. The algorithm for determining current temperature may vary as a function of the entity being probed and/or as a function of the user who is doing the probing. For example, current temperature of a probed TC flag 315e may be made a function of how many influential (e.g., TPP) personas are currently logically linked to the topic center (as being co-invited or as actually having joined in) and what amount of heating (positive attribute) or cooling (negative attribute) 'energy' the weighted aggregate of influential (e.g., TPP) personas is currently casting on that topic center (for example with thumb up or thumb down votes or with their current CVi votes—see giF. 2B). The gauge shown temperature may alternatively indicate how hot of a debate is going on inside the recommended content source (e.g., chat room). Some STAN_2 users may wish to keep track of where the hottest debates are on a given topic rather than where the largest number of general other users are or where the largest number of influential users (e.g., Ken54) are flocked together. The machine-implemented algorithm for detecting hottest debates may use a statistical variance function to automatically determine how spread apart the debating parties are in their positions and it may use various weighting factors so as to give recognized influential debaters more weight than unrecognized debaters. In one embodiment, premium subscription members of the STAN_2 system can custom tailor their own 'temperature' and 'energy' attributing algorithms according to their desires. Basic subscription members may have to rely on template 'temperature' and 'energy' attributing algorithms provided by operators of the STAN_2 system.

Suppose the user (e.g., Tom) sees the flashing TP icon 315f and/or a hot indication on gauge 315g, but the user is at the moment too busy to open the recommended content source (e.g., chat room) and in the same instant the user thinks to himself, "Why if Ken54 is now logically linked to recommended content source (e.g., chat opportunity 315d)—or if its 'temperature' is above 80 degrees—, then I definitely want to look in on it, but not just right now". In that case the user may drag and drop the content recommendation (box 315d) into a saved (e.g., favorite or recent) content sources area of a resources saving-and-retrieval tool such as scrollable tool 336. At a later time when the user is not fully occupied by a priority task, he can unscroll the saving tool 336 and try to pop open the saved content source (e.g., 315d). In some instances, the saved content source (e.g., if it is an on-the-fly opened and closed chat room) may not be later accessible to him for any of numerous reasons (e.g., it no longer exists; it has reached its room population limit and so on). However, the user is not without recourse in such a case. An alternate option for the user when, for example he is too busy, is to not pop open the recommended content (e.g., chat room 315d), but to instead click on a tape recording option icon 315r and thus cause the STAN_2 system to record at least a transcript of part of the Notes Exchange session (e.g., chat 315d) for the user so the user can review it later. In one embodiment, a menu pops up asking how long of a recording the user wants. In one embodiment, the STAN_2 system automatically emails the user to remind him he has a recorded transcript now available for review. Yet another alternate option for the user when, for example he is too busy, is to not pop open the recommended content (e.g., chat room 315d), and not to save a link to the recommended content (e.g., by drag and dropping only box 315d into saved content sources area of tool 336), or to not initiate and save a recording of the recommended content (e.g., by activating icon 315r), but to instead drag and drop TC (topic center) flag 315e; whose being-dragged copy is shown as phantom flag 315e' into the saved topic centers area of save-and-retrieve tool 336.

At the later time when the user is not fully occupied by a priority task, he can unscroll the saving tool 336 and pop open the saved transcript recording; or saved topic center identification (315e'); or saved combination (Combo) of source, topic center and/or attached TPP's. When he does so, the STAN_2 system responsively causes a 2D or 3D topic space map similar to what is shown in 3D region 215 of FIG. 2 to be automatically displayed to the user. The displayed map is by default zoomed in on the local neighborhood of the topic center (e.g., Z-pole 219a) of the topic to which the earlier recommended chat room (315d) primarily belonged. In one embodiment, the earlier recommended chat room (315d) is highlighted as being hooped around or strongly tethered to that primary topic center (e.g., Z-pole 219a) or as having drifted (216d) to a nearby other topic center (e.g., Z-pole 219b). With the various on-topic content sources (rings; e.g., chat rooms) in view, the topic map viewing user (e.g., Tom 132) can attempt to enter those that seem most promising to him (not necessarily the originally recommended room 315d). As earlier explained, some of the displayed content sources (rings; e.g., chat rooms) may deny him participant level entry or any entrance at all for any of various reasons (e.g., room population limit has been reached, the room is reserved for a private chat, etc.).

Yet another option for the user who sees the Ken54(TPP) notification in plate area 315d1 (where TPP is understood to flag out a Tipping Point Person) is to left or right click on an attached BuzzMe gadget icon (not shown at 315d, but similar to 315c4 of displayed recommendation glyph 315c). A left single or double click will automatically formulate a Me-Serving BOT (see also 255 of FIG. 2) with launch guides derived by automated algorithms of the STAN_2 system based on its current understanding (from up- or in-loaded CFi's) of what the user probably intends as the search strategy for such a Me-Serving BOT where the search strategy (detailed below in conjunction with FIGS. 4C-4D) includes a search for external content sources similar to those (of same kind and similar encodings) as that now exemplified by the recommendation/invitation 315d. A right click on the attached BuzzMe icon of 315d (not shown at 315d, see instead 315c4) will give the user more detailed options in a pop out menu to pick from for thereby more specifically tailoring his to be instantiated and launched Me-Serving BOT (e.g., 255) according to his likings. However, in the case where the user is too busy at the moment, this latter option may be counterproductive. In either case, the STAN_2 system signals the user that a corresponding Me-Serving BOT (e.g., 255) has been, or soon will be formulated (instantiated) and launched on his behalf (the task is appended to a to-do list of the STAN_2 system as data processing bandwidth allows) with the understanding that the user will receive an email and/or alike other notification when the launched BOT (255) returns with its search results.

It is to be understood that when the flashing TP icon 315*f* was displayed to the user, another option he had was to drag and drop a copy of the TP icon 315*f* into a saved Tipping Point People (TPP) region of the save-and-retrieve tool 336. This has the effect of allowing the user to later declare Ken54 as an influential and preferably followed, other user (preferably followed for everything or preferably followed only for a predefined one or more topics). In one embodiment, the user may pick one of a predefined plurality of 'energy' (e.g., heat-) radiating profiles for attachment to his virtual version of the influential persona (e.g., Ken54). The 'energy' or 'heat' radiating profile may define how much positive or negative influencing 'heat' energy the influential persona (e.g., Ken54) is deemed to project onto nearby topic centers when that influential persona is interacting with a topic center that is in the TC neighborhood (where distance is measured according to a distancing function of topic space 215). When potential chat opportunities or the like are later analyzed and scored in the background by the STAN_2 system for possible recommending to the user (e.g., 132), those that feature a preferably to-be-followed (or avoided) persona (e.g., Ken54) as being logically linked to them or as having a high aggregate temperature due to aggregated heating by positive radiations or cooling by negative virtual radiations being projected thereto (e.g., with 1/r or 1/r2 or other radial distance decay) will have their ranking scores increased by a predetermined or proportional amount (e.g., +20 points) or appropriately decreased if the effect is a negative one. Premium subscription users of the STAN_2 system may be given the option to develop more complex scoring rules for various ones of preferably followed personas (e.g., Ken54) and cross-associated topics or topic centers. In one embodiment, one of the options included in the right-click pop out menu of the BuZZ-Me icon (e.g., 315*c*4) is that of searching for external and/or internal content sources that feature the followed influential persona (e.g., Ken54) and/or other such influential personas (e.g., Jeff67, Seymour89). One of optional search templates that may be automatically or manually in-loaded into a Me-Serving BOT (e.g., 255); or into another form of such BOT, is one that looks to detect if a multitude (exceeding a predefined threshold number) of followed, influential personas (e.g., 229 in FIG. 2) are flocking towards (where such 'towards' flocking is denoted by path 229*a*) a specific TC neighborhood (e.g., 219*a*). If that is found to be the case, then the influencer's heat-seeking search template operates to automatically home in on such a hot spot (e.g., 219*a*) and optionally on external platform rings (e.g., 226) pointed to by the in-STAN hot spot (e.g., 219*a* when TPP's 229 flock to it). As already mentioned, bounce back path 229*c* allows a topic space browsing user to seek out influential personas (e.g., 229) who are now flocking, or have in the past flocked to a particular TC (e.g., 219*a*) or TCONE (e.g., 216*c*). The topic space browsing user who seeks out the influential personas (e.g., 229) may want to send a question or other online message to those influencers (229; e.g., Ken54, Jeff67, Seymour89, Jim32, Gid10) about the same or a related topic. In one embodiment, the STAN_2 system automatically generates a template email or the like addressed to the desired influencers.

Still referring to FIG. 3A, in one embodiment, if the user holds down a special key such as the Control key when dragging his cursor from the vicinity of a STAN_2 recommended content source (e.g., 315*d*), then a plurality or all of the associated objects (e.g., TC flag 315*e*, TPP 315*d*1, Group ID (in 315*c*1), link to the recommended content source, partial transcript, etc.) may be simultaneously dragged and dropped into respective 'Combo' save-and-retrieve subareas of the save-and-retrieve tool 336.

In one embodiment, the user is given the option of color coding various parts of different icons that have been downloaded (or in-loaded) from the STAN_2 system into his local data processing device (e.g., CPU-3 132*a*). In one embodiment, a color coding options tool bar 319 is automatically displayed to the user. Within this color coding options tool bar 319, the user is given the options of selecting colors, hatchings, textures and so on for respective ones of displayed icons of text in the STAN_2 driven recommendations banner 315. For example, if plate 315*b*1 is indicating the presence of FaceBook™ friends, then at least a portion of plate 315*b*1 will be colored, textured, blinked, etc. in accordance with one or more selections made by the user in scroll down menu 319*b*. Adjacent and counterpart scroll down menu 319*a* of course lists the attribute that is to be so tagged with color and/or other graphic markers (e.g., highlighting). Companion scroll down menu 319*c* and 319*d* show other example where the user is causing indicators related to the LinkedIn™ external platform to be different colored and/or otherwise marked. In scroll down menu pair 319*ef*, the user can pick other attributes and associated color and/or other graphic markers (e.g., highlightings). The OTHR attribute does not have to be the identification of another external platform. It could instead be an identification of a topic center (TC) or of a topic domain within which one or more topic centers (child topic nodes) reside. It could instead be an identification of a single or predefined group of followed personas (e.g., Ken54). In one embodiment, the user has the option of increasing or decreasing the number of ancillary icon objects (e.g., 315*d*1, 315*e*, 315*f*, 315*g*) that are displayed in banner area 315 so as to thereby make the banner area less cluttered or more detailed as desired. And of course, the user has the option of minimizing the recommendations banner area 315 to a bottom, top or side tray as may be preferred.

Referring to FIG. 3B, it is assumed here that user 132 has virtually pressed the OK pushbutton 318*b* of FIG. 3A at an earlier time. Of importance, in the environment 301 of FIG. 3B (also environment 132*e*2/132*u*2 of FIG. 1A), the volunteering user (CPUP 132, who was "Tom" but now is calling himself "Thomas") is not being directly monitored by the STAN_2 system 110/210 anymore (by way of CFi's or CVi's). The monitoring status box 312' indicates that interest monitoring is turned OFF (and in the illustrated example, scrollable opportunities banner 315/315*ss* is thus no longer displayed). Either the user 132 has just turned it off or he shut down his computer and at a later time logged into external platform 120 but not into platform 110.

Something happened between the time when the volunteering user (CPUP 132, then calling himself "Tom" in environment 132*e*1) pressed the OK pushbutton 318 of FIG. 3A and the time when the pushed survey 320 of FIG. 3B appears. In that interim time the STAN_2 system 110/210 automatically (but with user 132's knowing permission) caused a spyware program 132*s* to be downloaded (or in-loaded) from the STAN_2 platform 110 and via secured messaging link 132*m* into the user-designated physical or virtually instantiated CPUs (e.g., 132*b*) where the latter will be interfacing on a sometimes not-STAN_2-monitored basis with the external platform 120. The latter happens when user 132 is logged on as "Thomas" (for example) into the external platform 120 but not into platform 110 as "Tom". The downloaded spyware program 132*s* is not as capable as the full STAN_2 system 110 (e.g., a cloud computing supported system) to automatically determine what topic of interest Thomas (132) is currently focusing upon when flying solo inside of external platform 120. In one embodiment, for example, the spyware program 132*s* does not upload (or in-load) CFi's or CVi's to the STAN_2 system. The down or in-loaded spyware program 132*s* is however configured to have some modicum of intelligence and to selectively intrude on Thomas with a predefined and pushed survey 320 when one of a few predetermined triggering events happens, such as when certain predefined keywords (e.g., keywd1 317*b*') appear while at the same time an unmonitored Thomas (132) is logged into a predetermined external interest group (e.g., 224 of FIG. 2). In one embodiment, it has been predetermined beforehand that general topic "A" of FIG. 3A (or sub-topic A4) is more likely than not to come up when Thomas (132) is logged into that predetermined interest group (e.g., 224 of FIG. 2). Otherwise the downloaded spyware program 132*s* remains substantially dormant and just periodically checks to see if Thomas (132) is logged into that predetermined interest group (e.g., 224 of FIG. 2). The downloaded spyware program 132*s* may occasionally also use secured channel 132*m* (FIG. 1A) to see if there are any updates for it to be downloaded (or in-loaded) from the STAN_2 platform 110 into CPU-4 (132*b*).

In the state where survey dialog box 320 is being presented to the user (Thomas 132) in FIG. 3B, it is the downloaded spyware program 132*s* and not the full STAN_2 system that is controlling the survey. It is assumed for the case of FIG. 3B that user Thomas (having logged in via interface 128 into platform 120 with user ID 132*u*2) is deeply embroiled in a social networking exchange inside platform 120 with other users of that external platform 120. Thomas is probably not thinking about the STAN_2 system and its needs. But at this time, the downloaded spyware program 132*s* detects that Thomas is logged into the predefined external users' group 224 and that one or more of predefined keywords (e.g., 317*b*') have been recently used to an extent exceeding a predefined threshold in the highlighted window 317' (the window, frame or pane where within members of the predefined external users group 224 are exchanging notes). Incidentally, the survey triggering algorithm does not have to be based on keywords or keywords alone. It could be alternatively or additionally based on predefined meta-tags, or on predefined MetaWeb™ entity identifications, and so on and these may be buried inside a subframe 317*a*' of the highlighted window 317'.) In response to this unique set of survey triggering circumstances, the downloaded spyware program 132*s* automatically causes the intrusive survey dialog box 320 to be pushed into the attention area of the user (Thomas). (Or if the user interface is purely audio at the time, the intrusive survey akin to dialog box 320 may be in purely audio format.) The displayed content in the survey dialog box 320 is a function of not only the user having earlier pressed pushbutton 318*b* (OK) in FIG. 3A and the accepted spyware program 132*s* having been downloaded (or in-loaded) into Thomas's computer 132*b*. The displayed content of survey box 320 is also a function of various keywords, meta-tags, MetaWeb™ ID's (buried in 317*a*'), etc. being picked out by the downloaded spyware program 132*s* as being present in the FaceBook™ driven user window 317' (now highlighted by action of the spyware program 132*s*) that is currently the basis of the pushed survey 320. Pushbutton options 318*c*' through 318*g*' have already been described with reference to FIGS. 1B and 3A and thus do not need repeated explanation here. Introduction message 321 reinforces for the volunteering user (CPUP 132, a.k.a. Thomas) the nature of the task he is being asked to undertake and for whom he is being asked to do this (for STAN). The user has been recently using window of frame 317' that is being driven by an external platform (FaceBook™ in this example) and now a survey triggering event such as presence of one or more keywords such as 317*b*' (keywd1) within the subject window 317' are highlighted by operation of the spyware program 132*s* to thereby show the volunteered user (CPUP 132) what content triggered the spyware program 132*s* to present the pushed survey proposal 320.

Different external platforms use different terminologies or metaphors for marking off different parts of their virtual geographies. The "THIS NODE" descriptor in selection box 321*a* of message 321 may not be the best descriptor for FaceBook™ and instead may have said THIS WALL or THIS GROUP. In one embodiment, the user can pick a different terminology and can right click to get more information or options in selection box 321*a*. Selection box 321*b* reinforces the identity of the external platform (FaceBook™ in this example). In some embodiments, the user (e.g., a STAN-SUPER_REP) may select a different external platform name as being the more correct name for the platform that is driving the content originally shown in window 317' (before spyware program 132*s* starts highlighting some of it). The choices made in selection boxes 321*a* and 321*b* are mirror copied into associated boxes 321*aa* and 321*bb*.

A first voting (or survey question) 322 presented to the volunteering user (CPUP 132) inquires as to whether what is happening inside the now highlighted window 317' is worthy of further attention. In other words, does it represent an emerging hot topic or hot topic domain in the being-surveyed-about FaceBook™ environment (e.g., discussion group 224)? There is no need at this time to define what the topic or topic domain is. The survey 320 is merely testing to first see if the surveyed user (Thomas) merely "feels" that something of attention worthy value is now happening inside highlighted window 317'. (Unlike human in-the-field agents like Thomas, automated CPAP's cannot "feel" and thus they cannot provide emotion-based evaluation of what is developing in external discussion group windows such as 317'.) It should be recalled that STAN_2 monitoring is OFF (per box 312') at this time and therefore the STAN_2 system cannot be aware of what is now happening inside window 317' or how the STAN-(SUPER or regular)-REP user 132 is responding to it (feeling about it) emotionally and/or otherwise based on uploaded ones of his CFi's and CVi's because the latter are not being uploaded into the STAN_2 system. However, since the downloaded spyware program 132*s* detected that a usage threshold has been crossed by the user as he interacts with content inside window 317', that could be indicative of an important and survey-worthy new development in the subject social networking space (e.g., 224) or not. The STAN_2 system 110 is relying on Thomas to report back about it via the secured messaging provided by communications link 132*m* of FIG. 1A and via the survey process being mediated by the downloaded spyware program 132*s*. The simple vote options in FIG. 3B allow Thomas to quickly indicate (with a simple turn on of radio button 323 for example) that in his humble opinion (IMHO) this is an emerging and hot topic "domain" or a hot topic "node" (if selection of later is made in box 323a). Alternatively, Thomas may vote (with radio button 324) that the activity currently developing in window 317' represents merely an already established "warm" (not shown selection that is nonetheless chooseable) topic domain per the default options presented in voting line 324. It could also be deemed a "cold" or "old" topic by Thomas. Alternatively, Thomas may vote (with radio button 325) for the none-of-the-above option. This locally cast and recorded vote is eventually reported back to the STAN_2 system via messaging link 132m (when STAN_2 has spare bandwidth for such low priority information being down or in-loaded into to it from metaphorically, out-in-the-field spyware programs 132s).

The spyware-pushed first survey page 320 provides the user (Thomas) with a pushbutton option 326b of casting the first vote and immediately thereafter quitting the survey so as to thus not be bothered by further survey questions at this time. In response to such a survey quitting action, the downloaded spyware program 132s collects the identity of the surveyed user (Thomas), the identity of the associated external platform (e.g., FaceBook™), the identity of the discussion group (224) that triggered the survey push 320, an identification of current users inside that discussion group if possible, and the time date and time of the vote as well as Thomas's cast voting information and eventually relays it back to the STAN_2 system 110 (as a cross-pollination data package—explained below). Many volunteered STAN-REP users like Thomas will also be reporting back with their ID's, their votes and their respective impressions about the same and/or other external discussion sessions (e.g., 226). The STAN_2 system will be automatically collecting all these votes and impression reports, sorting them (e.g., as to topic center of origin of the volunteer), weighting them (e.g., according to who are more influential or more trustworthy STAN-REP users and who less so), summing and normalizing the weighted and counted votes and developing trending maps or histograms that will help the STAN_2 system to automatically or with aid of its human operators, determine where the trending-to-hot discussions and/or topics are out there in the STAN_2-not-monitored external content space (not-monitored because no STAN_2 user is focusing upon that external content area with his or her SS2 monitoring switch 312 turned ON). However, a top priority of the STAN_2 system remains that of first servicing its currently logged-in members, collecting their CFi's, CVi's, and responsively making automated content source recommendations to them. As mentioned, the surveying of user impressions (e.g., Thomas's) about content found on external platforms (e.g., 120) is a lower priority task and is carried out as, and if, spare bandwidth becomes available within the data processing resource banks of the STAN_2 system 110/210. Since the spyware program 132s can record its collected data and wait until the STAN_2 system flags that it is ready to receive spyware program messages (because spare bandwidth is now available), the STAN_2 system is not unduly burdened with having to deal in real time with reports at the instant they become available from the many, out-in-the-field spyware programs 132s.

Figure 3C:
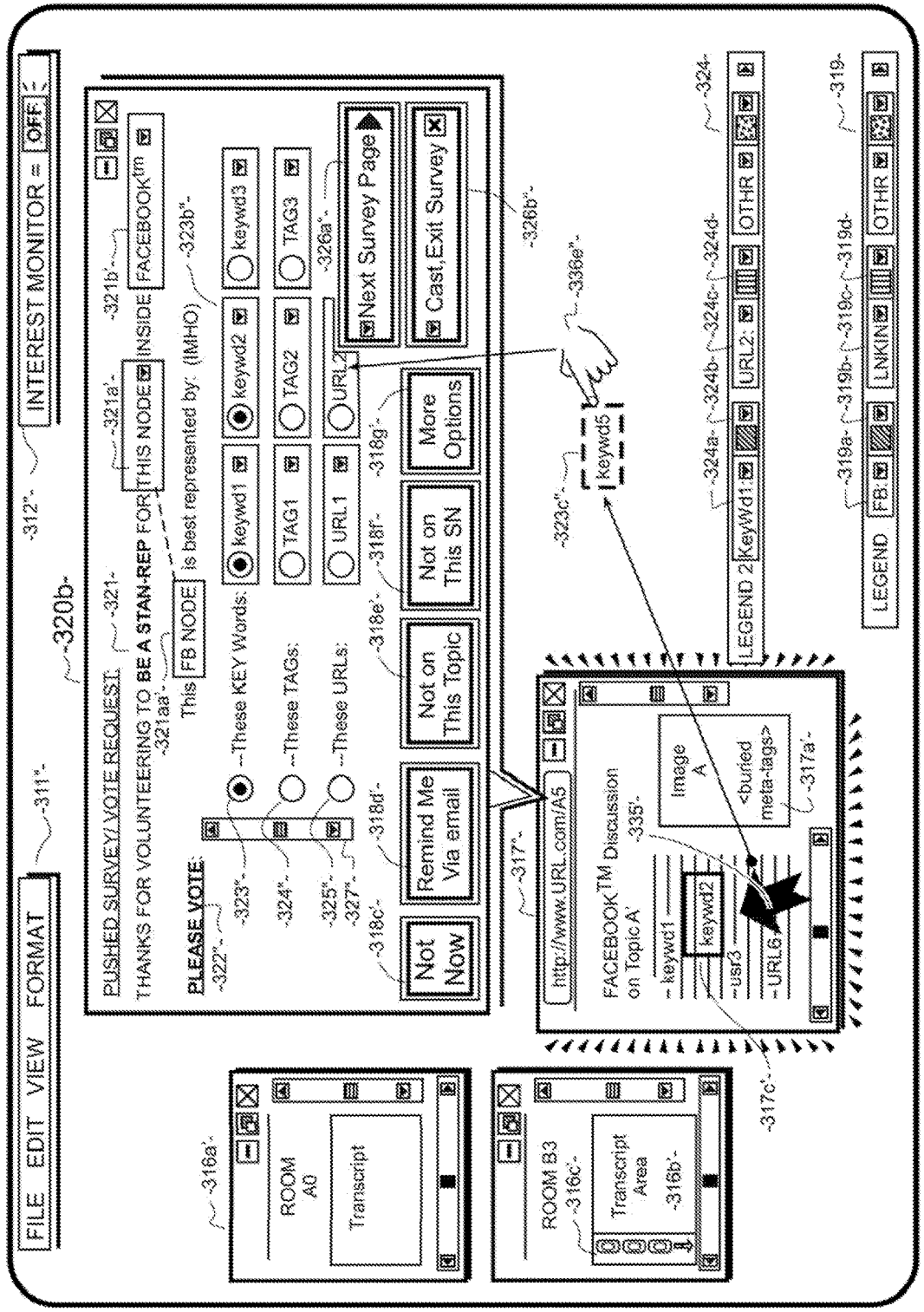
FIG. 3C is a diagram showing a second on-screen presentation wherein STAN_2 monitoring is turned off and the enlisted CPUP of FIG. 3B is further surveyed about attributes of the potential cross-pollinating material.

Still referring to user actions in FIG. 3B, if on the other hand, the user (Thomas) virtually presses pushbutton option 326a, the downloaded spyware program 132s responsively presents a next survey page such as page 320b shown in FIG. 3C. In this next surveying box (320b) the downloaded spyware program 132s is gathering more detailed information; for example, which words and/or other content inside highlighted window 317" does Thomas think/feel are best representative of what is going on inside of window 317"? Again, the spyware program 132s is not asking Thomas to do any deep thinking at the moment and to insightfully define or describe the topic of discussion that is emerging in the social networking (SN) exchange happening inside highlighted window 317". The downloaded (or in-loaded) spyware program 132s may automatically provide default suggestions such as keywords (e.g., 317c') that it has automatically picked out of highlighted window 317". This may help reduce Thomas's workload if and when he decides to respond to the popped open survey window. (Thomas may elect to minimize the window—by using a minimize icon in the upper right corner—and to get back to the survey shortly afterwards.) Although default suggested keywords (e.g., 323b") are displayed when the survey 320 is popped open, a scroll down option is provided in each checkable vote box like 323b" to thereby allow Thomas to pick something else or to copy and paste (or drag and drop) another part of highlighted window 317" (e.g., the being dragged object 323c") so as to make it a checked on vote option in place of those suggested by the spyware program 132s.

Voting line 324" lets Thomas indicate which of possible 'TAG' words that can be associated with highlighted window 317" is or are in his humble opinion (IMHO) best representative of what is going on inside the highlighted window 317". Similar to the pick or drag-and-drop option for keywords (323c", 336e"), the spyware program 132s lets Thomas choose or fill in (e.g., by drag-and-drop or type-in) alternate vote responses in place of the default ones originally displayed in the TAGs voting line 324".

Voting line 325" lets Thomas indicate which of possible hyperlinks (e.g., URL's, universal resource locators) appearing in highlighted window 317" (e.g., URL6) is or are best representative of what is going on inside the highlighted window 317". Similar to the drag-and-drop option for keywords (323c", 336e"), the spyware program 132s lets Thomas fill in alternate vote response in place of the default ones originally displayed in the key Users voting line 325".

In one embodiment, a displayed scroll bar 327" lets Thomas scroll down to see other, vote-upon options and he can choose which to vote on and which to ignore as he sees fit. For example, the other vote-upon options may ask: which images are best representative (for possible submission to GoogleGoggles™ or an equivalent tool). In one embodiment, when Thomas clicks on a vote line (not shown) directed to "buried" meta-tags, "buried" MetaWeb™ identifiers and so on, the locations of those "buried" objects are indicated on his screen 302 by highlighting or flashing of corresponding pixels in target window 317". In one embodiment, scroll bar 327" lets Thomas scroll to a representative users voting line (not shown, but see also FIG. 3D) that lets Thomas indicate which of possible user names appearing in highlighted window 317" is or are best representative of what is going on inside the highlighted window 317". Similar to the drag-and-drop option for keywords (323c", 336e"), the spyware program 132s lets Thomas fill in alternate vote response in place of the default ones originally displayed in the key Users voting line (not shown). In one embodiment, when a user name (e.g., usr3) is picked up from a window (317") that is being driven by an external platform (e.g., 120), the identification of that external platform (e.g., FaceBook™) is concatenated to the picked up user name (e.g., usr3) and the concatenated combination is what is sent back to the STAN_2 system as part of the votes or survey answers gathering operation. This is done because a same user can have respective different user names on respective different platforms and thus a "Ken54" (for example) on a first platform (e.g., 142) may not be the same person as a "Ken54" on a second platform (e.g., 144). It is to be understood that when users are identified by the STAN_2 system according to their user name, the identification generally includes something more than just the raw user name (e.g., "Ken54") so that the specific person being referenced by that user name is correctly pointed to (as best as can be practically done). In one embodiment, the displayed scroll bar 327" is configured to present survey questions of more complex or difficult nature the further down the vertical that Thomas scrolls. The more difficult questions may ask Thomas to start defining the general and specific topic nodes (of topic space 215) that the current discussion in target window 317" is most nearly connected with.

With regard to identifying STAN_2 topic nodes, in one embodiment, a finite subset of the topic nodes in topic space 215 of FIG. 2 are made unmovable and are assigned respective fixed root locations in that space 215 and are assigned fixed virtual distances as between each other. (A root location is a 3D point and does not have to reside on the Z=0 plane.) It should be recalled that in general, most topic nodes (whose locations are represented in FIG. 2 for example by Z-poles such as 219*a* and 219*b*) can migrate in position within the topic space 215 due to shifting moods of the membership population that currently occupies and controls the TCONEs (rings) that are logically hooped or strongly tethered to the respective topic nodes (a.k.a. topic centers or TC's). Members of a given TCONE or a given topic center can vote to move their respective TCONE or whole topic center to a different topic domain if they so choose. Accordingly, a general purpose topic center is a variable and movable software entity (as represented by physical and not elusively transitory signals). Nonetheless, a finite number of unmovable and fixed in location (in topic space 215) Z-poles are virtually created in accordance with one embodiment for the purpose of serving as reference points around which the variable and movable other entities may orbit or move between. In other words, the finite set of unmovable root points and/or Z-poles may be viewed as if they were fixed stars (or virtual GPS satellites) in an otherwise constantly shifting sky dome. In one embodiment, the finite set of unmovable root points or Z-poles are defined as MetaWeb™ like entities and are assigned MetaWeb™ or equivalent identifications that can be universally used by participants of the Internet for pinpoint wise pointing to those unmovable root points or Z-poles in the STAN_2 topic space 215. In one embodiment, neighborhoods around the unmovable root points or Z-poles (e.g., MetaWeb™ pinpointed points/poles) may be defined by providing one or more virtual radius values as measured relative to surrounding fixed root points or Z-poles. In this way a topic "neighborhood" that surrounds a fixed root point or Z-pole may be specified. Specific points and/or micro-neighborhoods in the STAN_2 topic space 215 may also be specified by triangulating as between three or more of the GPS-like, fixed root points or Z-poles.

While the above discussion regarding root points, Z-poles and topic space (215) might be argued by others to be "abstract", the inventors here are directing this disclosure to the non-abstract and machine-implemented carrying out of these teachings wherein real physical signals (e.g., electromagnetic signals) are physically transmitted through and as between real physical machines (e.g., computers, servers, cloud computing centers) and stored in physical memory devices thus transforming the memory devices from one physical state to another). The inventors here are directing this disclosure to the non-abstract and machine-implemented carrying out of these teachings wherein real physical and not-elusively transitory signals, that consistently represent the here described virtual entities, are used, stored and interacted with one another and/or in accordance with pre-defined, non-abstract instructing signals (e.g., software) that control the actions of non-abstract instructable machines so as to actually effect the outcomes described herein. As such, unsupported allegations (if any) about the present disclosure being directed to un-useful and abstract arts are to be seen as being wholly without merit.

Figure 3D:
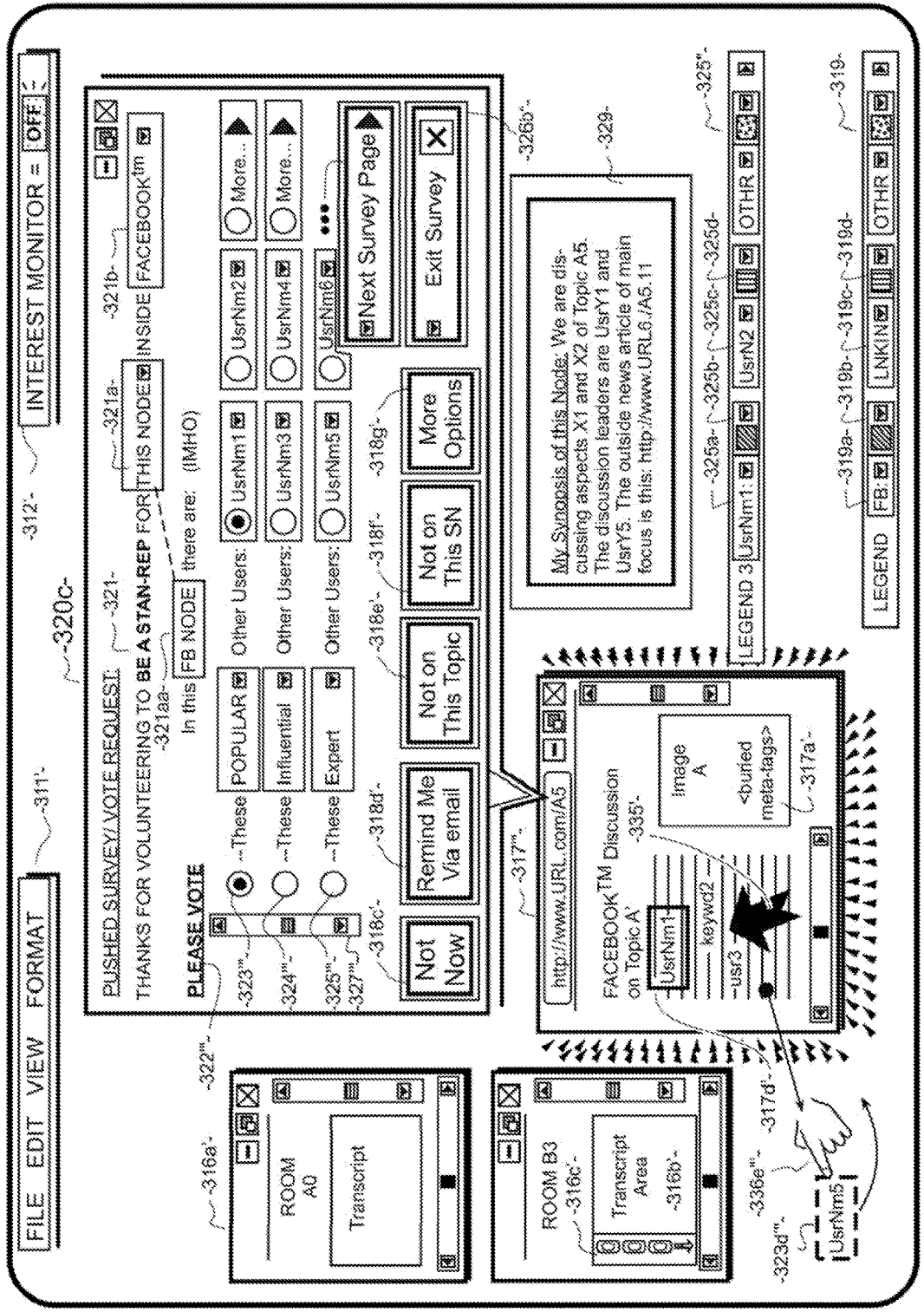
FIG. 3D is a diagram showing a third on-screen presentation wherein STAN_2 monitoring is turned off and the enlisted CPUP of FIG. 3B is further surveyed about attributes of the potential cross-pollinating material.

Before moving on to the next survey taking screen 303 of FIG. 3D, attention is redirected here to the multi-platform, multi-framework depiction of FIG. 2. The Z-direction axis of frame 210*xyz* of topic space 215 may be viewed as having points disposed therealong which represent any selected ones or combinations of potentially differing attributes of each of the TCONE's (or rings) that hooped around (or tethered to) respective ones of the Z-poles (only a few shown as such at 219*a* and 219*b* so as to avoid illustrative clutter). One of the potentially differing attributes of each of the TCONE's, as may be represented by spaced apart points on the Z-axis of frame 210*xyz*, can be maximum number of participating members allowed at one time inside the Notes Exchange activity (the "NE" part of the TCONE acronym) of the corresponding TCONE. Since respective TCONEs can be formed with many different and respective values for such participating populace limits, the TCONE's may be viewed as being stacked with larger sized ones of allowable population on the bottom and smaller ones towards the top to thereby create the impression of a cone formed by an ordered stacking of the hoops (rings) as shown for example at 219*a* in FIG. 2. However, at least some TCONEs may be deemed to have no thickness in the Z-direction. Accordingly any desired number of TCONEs with a chat room population limit of say 5 members maximum may be stacked about a Z-pole (or strongly tethered to that Z-pole) without taking away Z-direction space that is usable for other attributes of the respective TCONEs.

Another attribute that is assignable to the different TCONEs is that of minimum required (and possibly also maximum allowed) "expertise" in the topic of the topic center owned note exchange (TCONE). Level of expertise in the given topic, like room population, may be viewed as defining the radius of the respective TCONE. For example, a Notes Exchange (NE) session that requires a very high level of expertise (and for example into languages) might be symbolized as having a very small hoop radius while a Notes Exchange session that allows for a relatively broad class of people to participate (e.g., expertise level from beginner to novice, intermediate and so forth and in only a single lay-person's language) might be symbolized as having a relatively larger hoop radius and thus cone structures with such variations of hoop radius might be displayed to a user when the user navigates to the topic space 215 (via connection path 218) so that the user may perceive it as a sorted and thus organized set, the various options available to him or her when viewing a topic center neighborhood or browsing through the STAN_2 topic space 215 in search of a Notes Exchange (NE) session that the user might want to view and/or enter into as a Notes Exchanging participant.

In one embodiment, a STAN_2 user (e.g., 212) who is viewing a STAN_2 generated display of the STAN_2 topic space 215 may variably reset the Z-axis of frame 210*xyz* to represent any one or more attributes in a desired ordered fashion, for example as a multivariate combination of average historical room population and average level of participant expertise. In one embodiment of a STAN_2 generated display of its topic space 215, at least some of the 3D cones displayed as each primarily belonging to a respective topic center (to a Z-pole) are composed not just of stacked hoops of changing radius but as stacks of layers each having cones in that layer (see 216*f* as an example of such a cones-containing layer) where the mini-cones in each layer may have individual TCONEs. This approach may be fractal-wise carried out to an Nth degree where N=2, 3, etc. For example, if N=3, each macro cone has layers of mini-cones and each mini-cone has its own plural layers of micro-cones where the micro-cones finally are formed of stacked TCONE rings. It is within the contemplation of the present disclosure incidentally to display the STAN_2 topic space 215 with methods that show more than 3 dimensions at a time. For example, time sequenced snapshots of the topic space 215 may be displayed wherein the attribute represented by the Z-axis switches from one displayed snapshot to the next. Color coding may be used to differentiate between one snapshot and the next as they are displayed in round robin fashion.

With that explained, the connection between FIG. 3B and FIG. 2 can now be better explained. The surveyed user (e.g., Thomas) was acting as a more intelligent (and "feelings" capable) substitute for a CPAP like 260. By answering the various questions of survey page 320*b* (FIG. 3B), the surveyed user, together with the automated survey return action of the spyware program 132*s*, was gathering up cross-pollination data (262 and 264) from an external platform node (e.g., 226) wherein an external group (e.g., 224) was engaged in a Notes Exchange session (e.g., chat room discussion, blog comments, etc.). The surveyed user was being used for bringing that human-evaluated (voted on) cross-pollination data (262 and 264) back to the hive (to the STAN_2 system 110/210), and more specifically back to the topic center (or TCONE) from which his alter ego (Tom) came for processing and possible absorption by that TC or TCONE of origin.

More specifically, either a CPUP (e.g., Thomas plus the spyware program 132*s* loaded in his computer) or a CPAP (shown as BOT bee 260) returns to the hive with new cross-pollination data (262 and 264). Then that data is automatically analyzed by the STAN_2 system to determine what topic nodes it might belong to (if it is raw CFi data such as provided by Lurking BOTs like 116*c*) and/or if a topic center (TC) does not already exist that corresponds to the cross-pollination data, whether a new topic center (e.g., 216*n*) should now be instantiated to receive that returned data package. Usually the answer is yes, a topic node already exists, because Thomas (132 in FIG. 1A) originated from a STAN_2 topic center to begin with (unless in the rare exception, Thomas is a free ranging STAN-SUPER_REP). The logical linking of Thomas to one or a limited few STAN_2 topic centers happened in FIG. 3A when Thomas pressed the virtual OK button 319*b* and agreed to be a STAN-REP for a specified topic (e.g., Topic A) and for a specific external platform (e.g., FaceBook™). At that time, the STAN_2 system automatically recorded in its database (119) the association between the ID of the volunteering STAN_2 user (Thomas, actually operating as Tom at that point but whose alternate UBID-2 is obtainable from alias lookup record 184 of FIG. 1B) and the topic he or she was agreeing to be surveyed on and the external platform (e.g., FaceBook™) for which the surveys will be conducted. Accordingly, when the spyware program 132*s* in Thomas's physical or virtually instantiated CPU automatically reports back with Thomas's ID and the ID of the external platform and the ID of the external discussion group (e.g., 224), the STAN_2 system can automatically generate a corresponding logical link (e.g., 261) and record it as such in its DB 119 where the link extends between the external discussion (e.g., 226) and/or the external discussion group (e.g., 224) and the topic center (e.g., 216*n*) from which Thomas originated when he originally volunteered to be a STAN-REP. In one embodiment, the volunteering user has limited access to his STAN-REP account and can perform various system allowed actions such as temporarily de-volunteering or trying to change his volunteer parameters (e.g., the ones established in FIG. 3A).

After either a CPUP (e.g., Thomas plus the spyware program 132*s* loaded in his computer) or a Searching-type CPAP (BOT bee 260) returns to the hive with new cross-pollination data (262 and/or 264 and/or 252 as shall soon be described) and presents that new cross-pollination data to a corresponding topic center (e.g., 216*n*), in one embodiment, that presented cross-pollination data (pCPD 262/264/252) is not immediately absorbed into the topic node itself and/or into specific TCONE's (rings) of the TC (e.g., 216*n*). Instead, vote-eligible members of the TC and/or TCONE may first inspect and vote on the admissibility and value (ranking) of the presented cross-pollination data (262/264/252). Alternatively or additionally, a data buffering program provided by the STAN_2 system for each TC or TCONE may first or substitutionally inspect and vote on the admissibility and value (ranking) of the presented cross-pollination data (262/264/252), where after if the automated filtering is not a substitutional one, live members of the TC and/or TCONE may elect to further inspect and vote on the admissibility and value (ranking) of the presented cross-pollination data. Accordingly not all pCPD (presented cross-pollination data such as 262/264/252) is absorbed and logically linked to a core center (216*c*) of the TC or TCONE to which it is brought by a CPUP or CPAP. Some pCPD (e.g., 254) may be wholly or partially rejected by the surrounding buffer (216*b*) of the corresponding core center (216*c*) of the respective TC or TCONE. Presented cross-pollination data 254 of rejected (and dejected) BOT 253 represents an example of such wholly or partially rejected data. Repeated rejections (e.g., to a BOT with inherited, software-DNA like that of BOT 253) may operate to reduce populations of search BOTs having constantly turned down software-DNA (software defined search characteristics) that brings back the wrong kind of presented cross-pollination data (262/264/252). Repeated acceptances, on the other hand, may operate to increase populations of search BOTs having consistently approved software-DNA that causes the BOT to bring back the right kind of presented cross-pollination data (262/264/252) to the TC or TCONE (e.g., 216*c*) from where it was born (instantiated and launched). This aspect will be more clearly understood when step 451 of FIG. 4C is detailed below.

More specifically in FIG. 2, CPAP 251 (but it could instead be the spyware program 132*s* of Thomas's physical local or remotely instantiated machine 132*b*) is shown bringing back one or more so-called cross-pollination package(s) 252 where the payload inside the cross-pollination package(s) 252 can be any type of potentially useful cross-pollination data (CPD) such as, but not limited to: (a) a chosen URL (e.g., URL6 of FIG. 3C) that is believed to be on-topic with regard to the core topic of the destination TC or TCONE (216*c*) and is further believed to be new for that TC or TCONE; (b) a chosen keyword (e.g., 323*c*" (keywd5)

of FIG. 3C) that is believed to be on-topic with regard to the core topic and further new for that TC or TCONE; (c) a chosen meta-tag or overt tag (e.g., 324" of FIG. 3C) that is believed to be on-topic with regard to the core topic and further new for that TC or TCONE; (d) a chosen user name (e.g., usr3 of FIG. 3C) that is believed to be important with regard to the core topic of the destination TC or TCONE (216c) and further new relative to other user names already logically linked to that TC or TCONE; and (e) an identification of a chosen external discussion group (e.g., 224) and/or of a chosen external discussion thread (e.g., 226) or subthread and/or an identification of alike other external content that is believed to be of value to the core topic of the destination TC or TCONE (216c), new for that TC or TCONE (not yet represented therein by a logical link) and thus worthy of partial or wholesale absorption by the destination TC or TCONE (216c). More generally, the payload inside the cross-pollination package(s) 252 can be any type of potentially useful, on-topic "encoding" or on-topic content that might be valuable for incorporating into the CPAP or CPUP launching TC or TCONE (216c) or for incorporating into another TC (e.g., 216n, where n is for "new" here) that may not have yet even been created within the STAN_2 topic space 215. (See again the above description of re-routing path 253a.)

In one embodiment of the STAN_2 system, there is instantiated a so-called "double-cross" pollination operation which may be at least some of the time automatically executed (as data processing bandwidth permits) when a returning BOT (e.g., 255) brings back a payload (e.g., 264 plus 262) containing one or more native user names (such as may appear in a transcript area 316b of FIG. 3A) and brings back encodings (e.g., produced Notes, keyword etc.) that are logically linked to those native user names; where each native user name or other equivalent user identification is based on the user account that is native to the source external platform from where the CP data (254) came from. (That source external platform will be referred to here also as the first external platform.) The logically cross-linked encoding(s) that are thus associated with the native user name and/or other native user ID may be the full comment (a Note) that the native user made in an external discussion thread (e.g., in transcript area 316b or its equivalent) or a full other Note presentation the native user provided or a synopsis thereof or a set of primary encodings extracted therefrom. The logically cross-linked encoding(s) are automatically tested by the STAN_2 system to determine how well they cross-correlate with current top encodings or other attributes (e.g., Top N encodings, Top P pointers, or Top Q drift indicators) of the returned-to launcher TC or TCONE (216c). If the cross-correlation(s) is/are above predefined threshold(s), the STAN_2 system searches its database (DB 119) for an aliases lookup record (e.g., like 184 of FIG. 1B) that reveals not only the identification of the target native user on the first external platform—from where the payload (264+262) came—but also reveals alter ego identifications of the same user on other external platforms and/or within the STAN_2 system itself. Then, as data processing bandwidth allows, TC or TCONE-Serving BOTs are launched toward those other external platforms and/or within STAN_2 itself with instructions to search for substantially contemporaneous Notes (e.g., discussion group contributions) made by the identified target user when in his or her alter ego form on the other (secondary) platforms. These are brought back by the launched TC or TCONE-Serving BOTs (255) and tested (e.g., voted on by buffer layer 216b) for possible relevance the launcher TC or TCONE (216c). In one embodiment, the targeted native user of the first external platform is automatically first asked for permission (one time or always) by the STAN_2 system to use his alter-ego personas (of the other/secondary platforms and to use the thereto-attributed content contributions. In one embodiment, the targeted native user may elect to have his alter ego other ID's automatically converted into "Anonymous" or the like before such is introduced for possible cross-pollinating absorption into the launcher TC or TCONE (216c) space of the STAN_2 system. If the targeted native user allows his alter ego ID to be shown to STAN_2 users, after viewing the retrieved external content, those STAN_2 users may elect to instigate a chat proposal (or other form of proposed Notes Exchange) with the original author(s) by means of a contact bounce back tool (not shown) made available to them by the STAN_2 system. In other words, and for purpose of summarizing this "double-cross" pollination operation; once a relevant outside user name is found (relevant to the current TC or TCONE, e.g., 216c), the STAN_2 system automatically uses its internal cross-aliases records (e.g., 184) to lookup the alter-egos of the same person inside STAN_2 and/or on yet other external platforms and the STAN_2 system then automatically performs a seek to those internal or yet other external sourcing areas to see if yet further and well cross-correlated cross-pollination data (262/264/252) can be brought back from the yet further content sources.

It is worthwhile to step back at this point and look at the bigger picture presented by FIG. 2. With the help of cross-pollinating CPAP's (e.g., 255, 260) and/or CPUP's (e.g., Thomas), a logical link such as 261 can be established within the STAN_2 system (in the form of linking data pointing to an external node) as between a Notes Exchange session or node (e.g., 226) of an external platform (e.g., 220/120) or a corresponding Notes Exchanging group (e.g., 224) of people and a TC or TCONE (e.g., 216n or 216c) within the topic space 215 of the STAN_2 system 110/210 and/or with a corresponding Notes Exchanging group (e.g., 213) of people who are users of the STAN_2 system and who are logically linked to the in-STAN TC or TCONE (e.g., 216n). This can occur because an entity (e.g., Thomas 132u2) who was at the time of focusing upon relevant content (in FIG. 3B), NOT being monitored by the STAN_2 system (through use of uploading CFi's and CVi's). Nonetheless there is detection (e.g., by spyware program 132s) of external material which could be of value to a particular TC or TCONE (e.g., 115x of FIG. 1A) from which TC/TCONE (e.g., 216c) this unmonitored entity (e.g., Thomas 132u2 or CPAP 116a, a.k.a. CPAP 117) was originally launched. In the case of the unmonitored human agent (e.g., Thomas) the cross-pollination data (262/264/252) was collected by means of a timely and automatically presented survey proposal (e.g., 320 of FIG. 3B) which the unmonitored human agent (e.g., Thomas) agreed to respond to either immediately then (e.g., in FIGS. 3B, 3C and 3D—where FIG. 3D will be described shortly) or at a later time (e.g., by pressing Remind Me button 318d').

Next, in the here overviewed process, the survey responses automatically came back to the TC or TCONE (e.g., 216n or 216c) of origin of the surveyed person (e.g., Thomas). The survey-answering responses contained information (physical data signals) which allowed the survey-answering responses to be tested for cross-correlation with expansion/evolution needs or desires of the returned-to TC or TCONE (216n or 216c). Those expansion/evolution needs or desires may include, but are not limited to, a desire to attach new keywords (e.g., 323"), new tags or meta-tags (e.g., 324"), new hyperlinks (e.g., 325"), new images (not shown), and/or identifications of new external platform users (e.g., usr3 of FIG. 3C) to database records of the STAN_2 system that define or are otherwise logically linked to the returned-to TC or TCONE (216n) so that the value and/or up-to-datedness of the absorbing TC or TCONE is enhanced. Those expansion/evolution needs or desires of the launcher TC or TCONE (e.g., 216c) may further include, but are not limited to, a desire to detect and possibly link to (261) external platform Notes Exchange sessions (e.g., 226) and/or external platform Notes Exchanging groups or individuals (e.g., 224) whose current topics of interest may closely overlap with current topics of interest of the returned-to TC or TCONE (216n) or with current topics of interest of STAN_2 users (e.g., 212) who reference the returned-to TC or TCONE (216c).

In terms of a more concrete and specific example, suppose that in-STAN user 212 operates his local data processing device (e.g., 132a, or its remotely instantiated equivalent) to navigate via a browse connection like 218 (see also 315e of FIG. 3A) to a corresponding TC or TCONE represented by circle 216n of FIG. 2. Suppose further that in-STAN user 212 is also (perhaps in an alter ego form) a member of external platform discussion group 223. But this user 212 (a.k.a. member of 224) does not yet know about the existence of external discussion group 223 on external platform 220. Suppose however, that when in-STAN user 212 is browsing about TC or TCONE 216n, he discovers the cross-pollination link 261 back to not only external platform node 226 and perhaps from there back to external discussion group 224 (if platform 220 allows the STAN_2 system 210 to obtain back link 228 from 226 to 224) but also he discovers other cross-pollination link (not 261) from TC 216n back to yet another external discussion group 223 of external platform 220.

As a result of this activity, the in-STAN user 212 who (perhaps in an alter ego form) is a member of external platform discussion group 224 has used the topic center (TC) based data structure of the STAN_2 system to locate overlapping discussion group 223 (or its node similar to 226 but not referenced) on the external platform 220 where beforehand user 212 was not aware of the same; even though discussion groups 223 and 224 are on the same external platform 220 and share at least some topic of common interest!

The reason that members of discussion groups like 223 and 224 may not know of each other's existence is because the discussion groups space 225 of external platform 220 is flat. Notes Exchange sessions (e.g., discussion threads) are not logically tethered or hooped to a common topic center (topic node) in external space 225. Accordingly, a first discussion by members of discussion group 224 may take place in node 226 and may center on Topic 'A' (assume for the moment it is also the topic of STAN_2 TC or TCONE 216n) while another discussion by members of discussion group 223 may simultaneously take place in a spaced apart node (far from 226) in flat space 225 and may also center on the same Topic 'A' and nonetheless members of discussion groups 223 and 224 may not know of each other and of their concurrent overlapping interest in a same topic (e.g., 'A'). This is so because discussion groups space 225 is flat and its Notes Exchange sessions (e.g., rings) are dispersed about that flat space in an often non-topical manner (e.g., chronologically ordered). It may very well be that one or more members of discussion groups 223 and 224 may greatly benefit from being joined (electronically or otherwise) with a member or more of the other group. The presence of a commonly linking and on-topic, topic center like 216n of the STAN_2 system 220 makes such cross discussion group pollination possible. Although FIG. 2 shows just one logical link 261 being established between in-STAN node 216n and out-of-STAN node 226, it should be apparent now that, just like a first go-between CPAP 260 or CPUP (e.g., Thomas) helped create cross-platform link 261 between nodes 216n and 226, yet other go-between CPAP's 260 or CPUP's would likely create a cross-platform link (like 261) between in-STAN node 216n and the other out-of-STAN node (not 226) whose members (223) are discussing the very same topic 'A'. Thus the STAN_2 system can serve as a intermediating or joining mechanism that allows external but separated discussion groups (e.g., 223, 224) on a same external platform (e.g., 220) or even sometimes on different external platforms (e.g., 146, 147, depending on usage restrictions of the external platforms) to join with one another when they have a common topic of interest (e.g., Topic 'A'). In other words, thanks to the cross-platform cross-pollination activities of go-between CPAP's (e.g., 260) or CPUP's (e.g., Thomas 132u2), joinder of persons having a common topic of interest can take place as between members of external platforms as long as one of the members is a STAN_2 user (e.g., 212) who takes advantage of the STAN_2 browsing function that allows STAN_2 user (e.g., 212) to browse within the STAN_2 topic space 215.

By the same token, members of different groups (e.g., 213, 214) in the STAN_2 membership space 211 may be connected with one another when a member of a first of the groups visits the common topic center (TC, e.g., 219a) and learns of the existence of and common topic of interest by the other group.

Referring to FIG. 3D, aspects thereof will now be described in greater detail. The higher and/or emotive/social intelligences (IQs) of the human volunteer (Thomas) may be exploited more fully with the nonlimiting further examples given in FIG. 3D (screen 303). Firstly, the spyware program 132s may pop up a synopsis requesting, data entry box like 329. Originally, and in one embodiment, this box 329 is substantially empty except that it starts with the suggestive text: "My synopsis of this node is:". Then the volunteer (e.g., Thomas) fills in the rest. For example, he provides a definition "A5" of what he thinks the topic is and as set of aspect definitions X1, X2 which he believes are aspects of the so defined topic. Next he identifies the topic or discussion group leaders by their user names as they appear in the highlighted external platform transcript area 317'''. In one embodiment, he can simply drag-and-drop any desired user name (e.g., UsrNm5 at 323d''') from out of external platform transcript area 317''' and into any of his response areas including synopsis-providing area 329 and/or voting areas under request 322'''. Additionally, in the exemplary synopsis providing area 329, the volunteer is show to have identified a key outside content source (URL6/A5.11) that he believes to be the main focal point of the discussion group at this time.

In an alternate embodiment, the spyware program 132s may provide template cues in synopsis providing area 329 for the volunteer to complete. They may be similar to but perhaps not as smooth flowing as the illustrated response in FIG. 3D of the user's typed (and copy and pasted) synopsis 329. For example, a more heavily cued synopsis template may still include the introduction line but with further hints such as: "My synopsis of what is happening in this node (URL.com/A5) is as follows:", where this is followed by a next line, "The primary topic is (fill in the blank, or accept default answer). The next more heavily cued template line after that may say: "A secondary or subsidiary topic being discussed here is (fill in the blank, or accept default answer). This may be followed by: "Major aspects of the primary or secondary topics are: (fill in the blank, or accept default answers). This may be followed by: "The top 2 or 3 contributors to this discussion group are: (fill in the blank, or accept default answers)." This may be followed by: "The top 2 or 3 outside news or other articles we are discussing are: (fill in the blank, or accept default answers)." And so on; as may be appropriate for the nature of the highlighted Notes Exchange session 317'''.

In the exemplary voting area, a first proposed voting request 323''' may ask the volunteer (Thomas) to identify who he thinks (IMHO) are the most "popular" personas in the highlighted Notes Exchange session 317'''. An alternate choice tool (down triangle) in the attribute describing box (illustrated as showing "POPULAR") allows the volunteer to change it to show a different attribute. Originally some of the answers in vote line 323''' are prefilled with default answers guessed at by the spyware program 132s based on what currently appears inside the highlighted Notes Exchange session 317'''. The human volunteer (Thomas) may of course change these selections by picking from readily available drop-out menus or by way of a drag-and-drop operation (e.g., 336e''').

In the exemplary voting area, a next proposed voting request 324''' may ask the volunteer (Thomas) to identify who he thinks (IMHO—In My Humble Opinion) are the most "influential" personas in the highlighted Notes Exchange session 317'''. Once again, the user can alter the voting question and/or the default provided answers. Generally, the first few presented voting questions will be relatively easier to answer and then if the volunteer so chooses, he can use scroll down tool 327''' to scroll down to more difficult or complex questions about social interactions that the volunteer sees or feels as occurring within the highlighted Notes Exchange session 317'''. The more difficult or complex questions may include: who in your opinion are the top three captains of this Notes Exchange session (in order, 1,2,3)?; who in your opinion are the top three mutineers of this Notes Exchange session (in order, 1,2,3)?; who in your opinion are the top three Tipping Point Mavens of this Notes Exchange session (in order, 1,2,3)?; who in your opinion are the top three Tipping Point Salesmen of this Notes Exchange session (in order, 1,2,3)?; who in your opinion are the top three Tipping Point Connectors of this Notes Exchange session (in order, 1,2,3)?; and so on. At any time after having responded to as few or as many vote-like questions about the highlighted Notes Exchange session 317''', the user may hit the Exit Survey Button 326b'' and thus cast whatever votes he has checked and end the survey session. It is within the contemplation of the disclosure that the survey-taking panes like 320b (FIG. 3C) and 320c (FIG. 3D) may provide answering opportunities in other formats besides check boxes; fill in the blanks format for example. When the Exit Survey Button 326b'' is virtually depressed, the spyware program 132s records all the answers given by the volunteer and packages the same for transmittal back to the STAN_2 system along with other appropriate information such as the ID of the volunteer, the time and date of the survey, the identification of the highlighted Notes Exchange session 317''' and perhaps samples of content found therein, the synopsis 329 provided by the volunteer and other useful survey data as deemed appropriate for the nature of the surveyed volunteer and the nature of the highlighted Notes Exchange session 317''' over which he is being surveyed.

In one embodiment, the spyware program 132s also provides the volunteer with highlighting tools such as the illustrated 325'' whereby the user can elect to temporarily or more permanently highlight various internal objects within the highlighted Notes Exchange session 317'''. This may include adding differently colored highlightings to different user names per illustrated options 325a, 325b and picking different other objects (e.g., keywords, unburied tags, buried but temporarily unburied meta-tags like in 317a' and so on) to differentially highlight these with desired colors and/or texturings per the illustrated OTHR option.

While in one embodiment, Lurking BOT's are expected to behave as if flies on the wall at the external platforms and not to actively participate in discussion group exchanges of external platforms, in some embodiments, Lurking BOT's and the like are instantiated so that they do interact, at least in the role of survey takers that ask questions similar to those asked of the STAN-REP in FIGS. 3B-3D. In some instances, Lurking BOT's may launch their own discussion group proposals (e.g., solo-launched ring 206 of plane 221) where the BOT-launched proposal is in the form of a survey-taking opening question such as: With regard to sub-topic D2, who in your opinion are the most influential participants in this (lurked at) discussion group? The responses, if any, are then fed back as CFi's to the STAN_2 DLUX server(s).

Figure 4A:
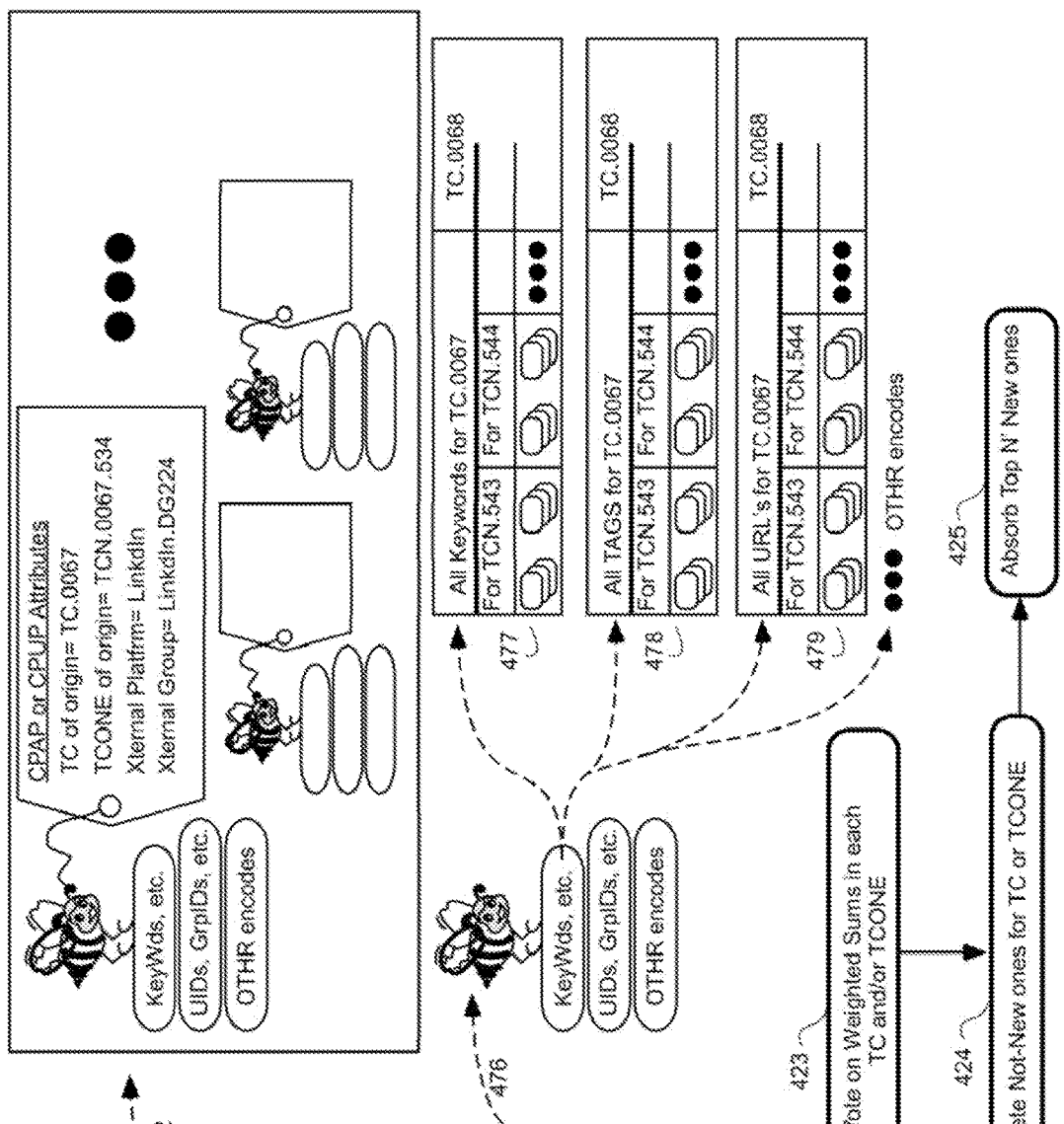
FIG. 4A is a combination flow chart and data structure showing diagram illustrating how incoming cross-pollination material may be processed in accordance with one embodiment.

Referring to FIG. 4A, when large numbers of presented cross-pollination data packages (pCPD 262/264/252) are returned to the hive from the various, reporting in CPUPs (e.g., Thomas) and or Search-BOTs it can be overwhelming for system resources and/or vote eligible members of receiving TC's or TCONE's (e.g., 216c) to individually process each presented CPD package. An automated process 401 by way of which pCPD packages can be more efficiently selectively absorbed and/or rejected will now be explained with reference to FIG. 4A.

Step 410 (Begin) is repeatedly activated as data processing bandwidth allows. In step 411 each received pCPD package is given a unique (but temporary) identification number and stored in system memory for further processing. These unique (but temporary) identification numbers will follow each of to be broken-apart pieces of the each package (which happens in 416) so that proper weighting can occur in to be performed step 418. In step 412, and as data processing bandwidth allows, the internal contents of the buffered pCPD packages are automatically validated and/or repaired. Validation may include verifying that the reporting back CPUP or CPAP is a valid one and not a transmission damaged or spoofed one and verifying that various URL's provided therein are valid ones and not pointing to inappropriate content and verifying that various keywords or other encodings provided therein are correctly spelled and do not present inappropriate content. The automated fixing operation may include repairing spelling errors or machine-detectable grammatical errors in the user's synopsis and so on.

Step 414 sorts the validated and repaired CPD's are hierarchically sorted according to their TC or TCONE (e.g., 216c) of launched origin. The hierarchy is according to that currently used in the STAN_2 topic space 215. In this way the otherwise randomly received CPD's are now collected into groups for respective processing according to the desires or needs or nature of the TC's or TCONE's (e.g., 216c) into which they may be ultimately absorbed (or not).

Step 416 parses apart the CPD package pieces according to type (e.g., keywords, tags, external user names, etc.) while retaining for each parsed piece the temporary ID provided at step 411 and stores the parsed pieces (or pointers to them or tokens representing them) in an orderly manner as shown by table structures 477-479. In other words, the storage scheme indicates which parsed pieces are being presented for voting thereon and/or for automated filtering (by buffer layer 216b) for the whole TC and then for individual TCONE's that are hooped on or primarily tethered to that TC.

In step 418, pre-voting weights are logically attached to the parsed pieces. The weighting scheme may vary and may be based on the identification of the carrier (CPAP or CPUP) who brought the package, on the identification of the external platform from where the package contents were obtained or derived, on the identification of certain influential (e.g., TPP's) persons with whom some of the package pieces are linked to, and so on.

In pre-voting step 421 the respectively weighted and parsed pieces of each sorted storage bin of storage structures 477, 478, 479, etc. are summed, first as for each individual topic center node or TCONE and then for the hierarchically overlying parent node.

In step 423, votes on the weighted sums are carried out, first on the basis of the child topic nodes or TCONE's and then for each successively higher topic node in the topics tree as deemed appropriate. The number of times that a same keyword, tag, etc., has been presented for absorption counts on a one-to-one basis in this particular voting form. If frequency of presentation is not to be evaluated on a one-to-one basis, then a count of redundant keywords, tags, etc. may first be taken and the counts may adjusted on a non-linear basis whereafter the counts are used as further weights and redundant copies of same keywords, tags, etc. are deleted before the vote is taken.

In step 423, it is determined which of the presented cross-pollination data pieces (keywords, tags, etc.) are not new for each respective, potential recipient (TC or TCONE) listed in table structures 477, 478, 479, etc. Although a given keyword, tag, etc. may not be novel for a first TC or TCONE, it may nonetheless be novel for a sibling such entity. In one embodiment, the weightings ascribed in step 418 (and optionally in step 423) vary as a function of which TC or TCONE the offering is being presented to for possible absorption. In one embodiment, after a first voted is taken on behalf of each TC or TCONE, a second round of voting is carried out for those potentially accepting TC's or TCONE's where the offering is novel (as determined within step 424 for example) and where the second round of voting is a function of voting results generated by sibling TC's or TCONE's. Then after the first and/or second rounds of voting complete, the sorted and parsed offerings are ranked according to their respective votes and in step 425, those meeting or exceeding predetermined thresholds of the respective TC's or TCONE's are absorbed and logically positioned at inner core or more outer ranking rings (see 216c of FIG. 2) of the respectively absorbing TC's or TCONE's. The acceptance and rejection results are feedback as genetic affirmations or reducers for the mission guiding data structures (i.e. 116d' of FIG. 4c) so that a next round of instantiated and launched BOT's will tend to get more affirmations and less reducers. As mentioned above, in one embodiment it is possible for rejecting TC's or TCONE's to cast Reject-But votes whereafter the package contents of a rejected BOT (e.g., 253a of FIG. 2) are re-directed to another data processing mechanism that uses the Reject-But contents 254a to build a brand new topic node (e.g., 216n).

Figure 4B:
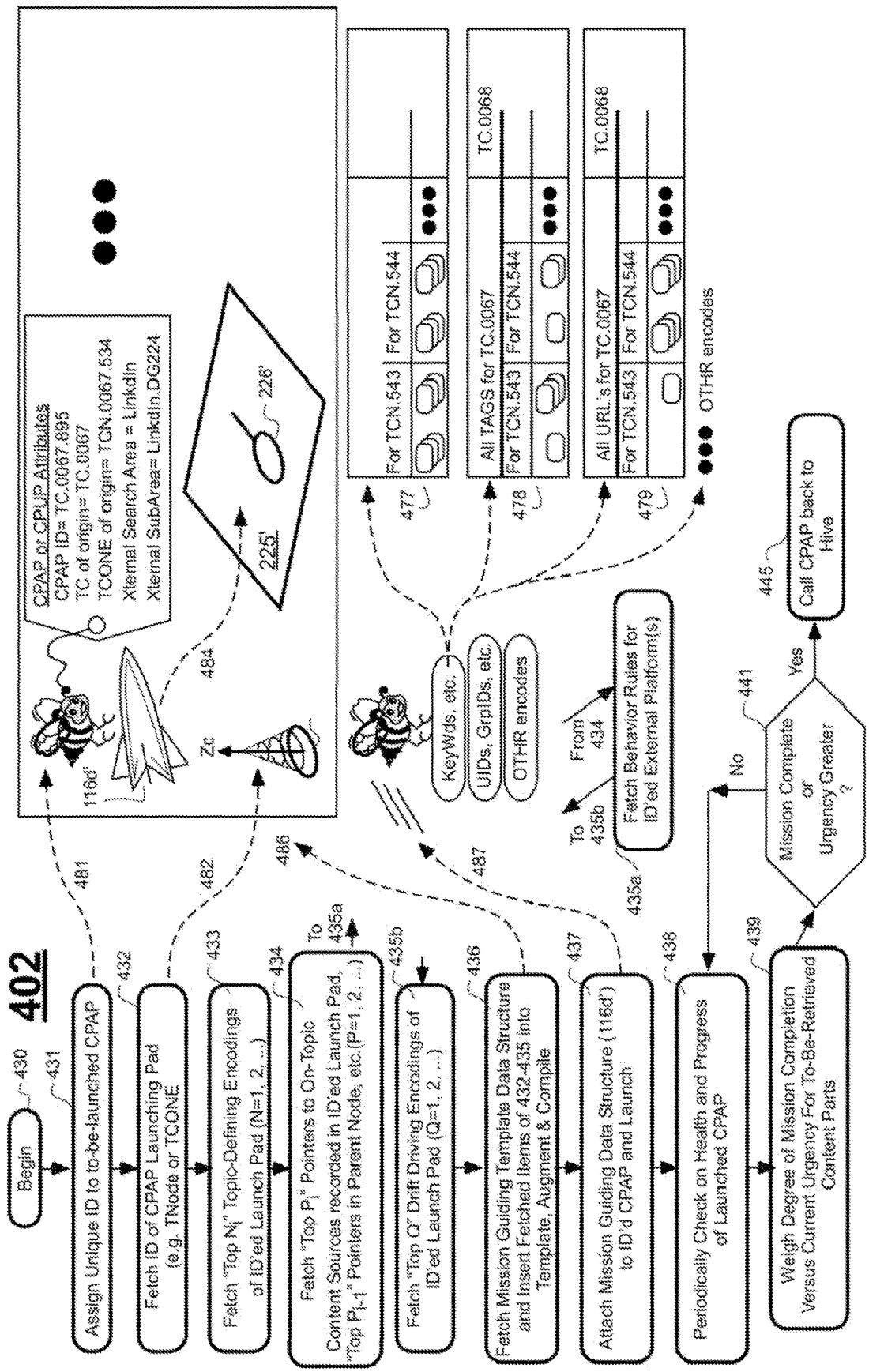
FIG. 4B is a combination flow chart and data structure showing diagram illustrating how the mission guiding data structure of a to be launched CPAP is formulated.
Figure 4C:
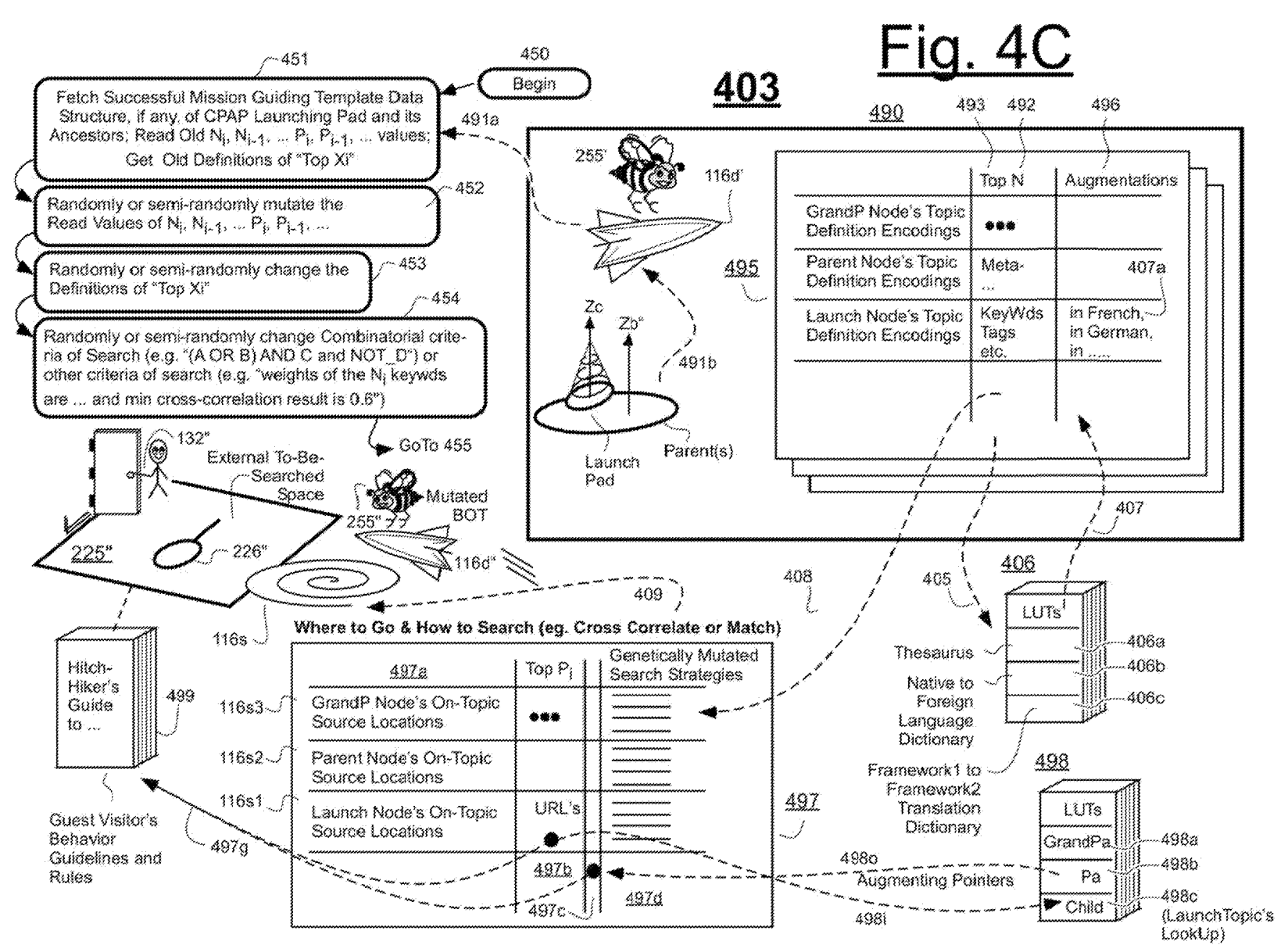

Referring to FIG. 4B, it will now be described how the mission guiding data structures (i.e. 116d') of TC or TCONE-Serving BOT's may be instantiated prior to launch. Machine-implemented and automated process 402 begins at step 430. At step 431, a unique ID is assigned by the STAN_2 system to the to-be-launched CPAP (a.k.a. BOT).

At step 432, the identification of the TC or TCONE (e.g., 216c) on whose behalf the BOT is to be launched, is obtained and logically linked to the being instantiated mission guiding data structure (i.e. 116d'). At step 433, the so-called Top N; topic defining encodings of the identified launch pad (TC or TCONE) of step 432 are fetched. Here N; may vary for each type of topic defining encoding, be it a keyword, a tag, a meta-tag and so on. More specifically, N; might be Top 3 for keywords but at the same time Top 5 for tags. Also the definition of what is meant by "Top" can vary on an encoding type by encoding type basis. "Top" may mean most often repeated irrespective of which launch pad user is repeating it. On the other hand, "Top" may alternatively mean used by the greatest number of unique members within the TCONE or by the greatest number of TCONE's primarily owned by a launching TC. "Top" may yet alternatively mean that it is rated as such by one or more influential members (e.g., TPP's) within the TC or TCONE (e.g., 216c) or that a largest number of such influential members use it. These are nonlimiting examples of how the definition of "Top N" can be varied aside from the value of N also being varied.

At step 434, a similar process is undertaken for so-called pointers (P) that are going to direct the to be launched BOT as to where in the vast landscape of the Internet 101 to search. Generally the plurality of P pointers are URL's taken respectively from the launch point (could be a TC or a TCONE) and its ancestors (e.g., parent, grandparent TC's). Once again, the definition of "Top P" can be varied and aside from that the value of P also being varied on a contributor by contributor basis. In other words, "Top P" for BOT launching child need not mean the same thing or have same value P as "Top P" for the parent of grandparent node of the BOT launching child.

After the potential search areas have been identified in step 434 as being the respective "Top P" pointers of respective child and/or parent and/or grandparent node, corresponding behavior rules (see also 499 of FIG. 4C) are fetched in step 435a. These behavior rules instruct the BOT (after it is instantiated and launched) how to behave when it arrives and begins searching or lurking at a target site on an external platform. Should it operate as a lurking and unseen watcher and gatherer or as a more active survey taker? What special navigation steps does it need to exercise if at all when using the public interface provided by the external platform? Does it first have to sign in and provide a valid password? Does it have to navigate to a particular "wall" or "discussion group" or other such construct of the being-visited external platform? Does it have to follow special protocols in order to join new groups within the being-visited external platform? Does it have to dress in a special avatar uniform that is prescribed by the being-visited external platform for NPC's? Questions like these and the alike are accounted for by the fetched behavior rules of each targeted external platform area that is to be searched by the BOT and/or lurked at.

In subsequent step 435b, the "Top Q" drift direction encodings of the launching pad TC or TCONE are fetched. Once again, the definition of "Top Q" can be varied and aside from that the value of Q also being varied on a contributor by contributor basis. The drift direction encodings may indicate to the Search BOT what variations from the Top N topic definitions of step 433 should be pursued when searching for fresh cross-pollination material. As mentioned earlier, each TC or TCONE may have its most dominant "captain" type members who are trying to keep the boat moored to one place in topic space 215 or are trying to keep the boat drifting in a captain-preferred direction. On the other hand, the same figurative boat (it could be TCONE or TC in this case) may have its most dominant "mutineer" type members who are trying to change the boat's primary mooring and/or are trying to change the boat's drift direction to a new direction other than the captain(s)-preferred direction. The fetched "Top Q" drift direction encodings (they could be tags, meta-tags, URL's etc.) may those of the captains and/or of the mutineers.

In subsequent step 436, a template mission guiding data structure is fetched from a library of such structures stored and maintained by the STAN_2 system. The template mission guiding data structure has a foundational structure for defining a search strategy, but it does not have the variables defined by the "Top N", "Top P" and/or "Top Q" permanently encoded therein. Accordingly at step 436, the results of steps 433-435b are appropriately inserted into respective blank or default-wise pre-specified spots of the fetched template mission guiding data structure. Optionally, a so-called augmenting step (which will be detailed in conjunction with FIG. 4C) may be carried out within step 436. The filled-in and optionally augmented template mission guiding data structure is then compiled to thereby instantiate the mission guiding data structure (i.e. 116d' of FIG. 4B). Dashed association path 486 indicates that the corresponding BOT is now tagged with its launching pad TC-of-origin or TCONE-of-origin identification data (per association paths 481 and 482) and with its instantiated the mission guiding data structure (i.e. 116d'), where the latter may guide (dashed path 484) to search area 225' and/or more specifically, into discussion ring 226' of an identified external platform (e.g., 220).

If not yet done in step 436, in subsequent step 437, the instantiated mission guiding data structure is logically linked to a corresponding and instantiated BOT agent (software agent) and they are activated, thereby launching them (metaphorically) on their virtual journey through the Internet so as to search in and/or lurk in the targeted external territory (e.g., discussion ring 226').

Step 438 tasks the STAN_2 operating system with periodic checking in on the health and mission progress of the launched BOT. If the launched BOT freezes up for any reason, the STAN_2 operating system may try to unfreeze it, and if not successful, the STAN_2 operating system may alternatively launch another copy of the previously launched BOT.

In step 439 a periodic test is undertaken to see how far along in its mission the launched BOT is, with this being weighed against possible urgency pings for returned content, where the urgency pings may come from members of the launching pad TC or TCONE, who by their uploaded CFi's and/or CV's may be indicating a desire to see fresh new material which the launched BOT is expected to bring back from its respectively targeted search zone (e.g., discussion ring 226').

In step 441, it is periodically determined if the mission appears to be complete or if urgency for incomplete results exceeds a predetermined threshold. If yes, the launched BOT is recalled back to the hive (step 445). If no, the BOT is allowed to remain lurking or searching in its respectively targeted search zone (e.g., discussion ring 226') a little bit longer.

Referring to FIG. 4C, now details of one automated process 403 for genetically mutating the mission guiding data structures (i.e. 116d') will be described. Search and lurk BOT's that persistently return pCPD's whose contents are all rejected are re-instantiated at progressively decreasing rates over time until their populations die out if not success is attained. Search and lurk BOT's that receive acceptances are re-instantiated more often, but nonetheless competition is maintained as between different strains of BOT's that service a same launching pad TC or TCONE so that the more successful BOT's are rewarded with increased or sustained populations. That said, at the same time in one embodiment, mutations of both successful and unsuccessful BOT's are also instantiated and launched so as to provide a potentially wider variety of cross-pollination material.

In FIG. 4C, mission guiding data structure 116d' represents the virtual DNA of a corresponding successful BOT (one whose pCPD was at least partially accepted). In step 451 (after begin step 450 of machine-implemented and automated process 403 is carried out) the old virtual DNA of the corresponding successful BOT is read out. Dashed path 491a also represents this reading of old DNA process.

In step 452 the values of one or more of the old virtual DNA parameters are varied either randomly or semi-randomly, where semi-randomly indicates that additional steps are taken to more intelligently decide which of the old virtual DNA parameters are to be varied and if so to what extent and in what direction, increasing or decreasing? The more intelligent decision making may be based on trends uncovered in previous trial and error, random mutations. In step 453, a similar mutation is undertaken for definitions of Top Xi, where Xi can be Ni, Pi, Qi or another like parameter. In one variation, one of steps 452 and 453 is occasionally bypassed. In step 454, the old search algorithm is also randomly or semi-randomly varied. For example, a previously used combinatorial search specification (e.g., (A OR B) AND C AND (NotD)) is varied slightly as to its named variables and/or utilized logical operators and/or their order of evaluation. As another example, a previously used cross-correlation search specification (e.g., one that attributes weights for cross-correlations of respective keywords and/or tags) where weights are varied and/or thresholds are varied. After the results of steps 451-454 are obtained a new template mission guiding data structure is filled in with the mutated results in step 455a of FIG. 4D.

Before explaining FIG. 4D, a recap is provided here of the possible mutations to old mission guiding data structure 116d' before it is re-instantiated as mutated and launched new item 116d". The one or more variables that can be mutated include: 1) What is value of $N_i$, $N_{i+1}$ (of parent), $N_{i+2}$ (of grandparent node), etc.?; 2) What is meaning of "Top" when a "Top $X_i$" is specified?; 3) What augmentations are to be added into table column 496 of table data structure 490 of FIG. 4C?; 4) What is the logic (see again step 454) of the search algorithm?; 5) When performing the search in a target area, is the search BOT to spiral (116s) inwardly from a more general and wider search area to a more specific and thus narrower search area or, vise versa, spiral out from specific destination 116s1 to a more general and thus wider outer orbital 116s3 when searching in targeted external platform space 225"?. As may be appreciated, there is some overlap between the steps shown in FIG. 4B (see 436, 437) and steps shown in combined FIGS. 4C-4D.

Referring to step 456 of FIG. 4D and also to corresponding Lookup Table (LUT) 406 of FIG. 4C, there may be instances in which better search results (e.g., higher rated pCPD's) are obtained if the topic defining encodings obtained directly from the launching pad TC or TCONE and/or it ancestor(s) (Parent, Grandparent, etc.) are augmented with additional such encodings. The case where a search into a foreign language or multi-language target zone is to be conducted by a BOT has already been discussed above. Thus the benefit of using a native-to foreign language LUT 406*b* to insert equivalent foreign language augmentations (e.g., 407*a*) for the native language encodings obtained directly from the launching pad TC or TCONE should now be apparent. Moreover, the case where a search into a different disciplinary area (e.g., from computer science Man Month to economics counterpart) has already been discussed above. Thus the benefit of using a Frame1-to-Frame2 Rosetta Stone like LUT 406*c* to inserting equivalent augmentations as used in a different but nonetheless related disciplinary area should now be apparent. By similar token there may synonyms and/or antonyms provided from a Thesaurus-like LUT 406*a* that can provide useful augmentations. For example, sometimes it is beneficial to search for the opposite of a given original encoding. Of course the outputs of Thesaurus-like LUT 406*a* may be subsequently passed through LUT's 406*b* and/or 406*c* so as to obtain yet further augmentations. One of the mutation driven variables may be a variable number specifying how many augmentations are to be used in step 456.

Referring to step 458 of FIG. 4D and also to corresponding data transfer flow 408 of FIG. 4C, the combination of (or a selected subcombination thereof) of the directly obtained topic defining encodings and their augmentations are inserted into corresponding fill-in blanks of the optionally mutated search algorithms in column 497*d* of table data structure 497. (Mutation of the optionally mutated search algorithms was described as being optionally carried out in step 454.)

Column 497*b* of table data structure 497 was filled in with the Top $P_i$, $P_{i+1}$, $P_{i+2}$, etc. pointers of the respective child launching pad TC or TCONE and its ancestors after step 453 completed. Thereafter, a second set of augmenting LUTs 498 may be used to add respective augmenting pointers by reading in the Top Pi, $P_{i+1}$, $P_{i+2}$, etc. pointers of the respective child launching pad TC or TCONE and its ancestors via intake path 498*i* and outputting corresponding augmenting pointers via output path 498*o*. The output augmentations 498*o* (which are stored into column 497*c*) can be ones that were elsewhere in the STAN_2 system determined to provide alternate websites and/or other content sources that are relatively similar, but not entirely the same as the corresponding input ones (498*i*) of LUTs set 498.

After columns 497*b* and 497*c* of table data structure 497 are filled in, they are used to fetch the appropriate behavior guidelines and rules 499 for the to-be instantiated and launched BOT. As mentioned above, the guidelines and rules 499 instruct the instructable BOT how to function and behave when operating in the domain of external space 225". In some instances, behavior protocol may require the BOT to seek assistance of a STAN-REP such as 132" for letting the BOT in through a limited entry door of the targeted space 225". Of course cooperation agreements with operators of the external platform may need to be reached before some of these activities can be undertaken.

For sake of completion, FIG. 4D also shows the compile and launch step 459 and the periodic health check up step 460 for the launched BOT.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of example, it is understood that the configuring of a user possessed data processing device (e.g., 131*a*, 131*b* of FIG. 1A) to provide a user interface for interfacing with the STAN_2 system in accordance with the present disclosure (e.g., in accordance with FIGS. 3A-3D) can include use of a remote computer or network subsystem and its respective software (e.g., 110 of FIG. 1A and its downloadable spyware program 132*s*) to carry out download of and activation of interfacing software into the user possessed data processing device (e.g., 131*a*, 131*b*. A computer-readable tangible medium (e.g., hard disk, optical disk, flash drive etc.) or another form of a software product or machine-instructing means (including but not limited to a downloading of (or in-loading of) manufactured instructing signals over a network (e.g., 101) may be used for instructing an instructable machine (e.g., 132*a*, 132*b*) belonging to a user or to system operators to carry out various activities described herein, where the activities can include selective activation of one or more of various user interface functions described herein as being provided to users of the STAN_2 system and/or as being provided to its system operators. As such, it is within the scope of the disclosure to have an instructable machine carry out, and/to provide a software product adapted for causing an instructable machine to carry out machine-implemented methods that use encodings of a user's physical and/or logical environment to automatically determine most probable topics of interest on that user's mind, to automatically determine what other users and/or content sources the SS2 user is currently co-compatible with and to accordingly and automatically provide the SS2 user with content source recommendations in accordance with those determinations.

RESERVATION OF EXTRA-PATENT RIGHTS, RESOLUTION OF CONFLICTS, AND INTERPRETATION OF TERMS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. § 120 and/or 35 U.S.C. § 251.

The invention claimed is:

1. An information enhancing method for use with a first social-topical networking system and with external platform systems that are external of the first social-topical networking system and provide social interaction services, where the first social-topical networking system maintains in a memory thereof, a communally-controlled topic space populated by spatially and/or hierarchically organized topic nodes each having respective topic defining data logically associated therewith, wherein the maintained topic space is communally-controlled due to automatically repeated updating thereof based on automatic uploads of current focus-indicating records for, and based on explicit and/or implicit votes of plural users of the first social-topical networking system, the updating being in terms of at least one of spatial and/or hierarchical organization of the topic nodes within the topic space and in terms of the topic defining data that is logically associated with respective ones of the topic nodes, the method comprising:

causing instantiation, within a machine system having processors, of a software agent that is structured to be able to search for, find and convey potentially new or different, and thus potentially informationally enhancing data signals to the first social-topical networking system for potential addition at least into a specified portion of the communally-controlled and automatically repeatedly updated topic space of the first social-topical networking system of corresponding data items represented by the potentially informationally enhancing data signals, where information represented by the potentially informationally enhancing data signals is potentially new or different relative to information represented by a current version of the topic defining data of at least one of the topic nodes of the automatically and repeatedly updated topic space;

causing the instantiated software agent to begin searching for and collecting from the one or more external platform systems that provide social networking services, potentially new or different, and thus potentially informationally enhancing data items found by the agent in the one or more external platform systems, causing the instantiated software agent to begin conveying the collected potentially new or different, and thus potentially informationally enhancing data items by way of said potentially informationally enhancing data signals to the first social-topical networking system; and causing initiation of a determination as to whether one or more of the conveyed and potentially informationally enhancing data items is new or different relative to information currently represented by the topic defining data of the at least one of the topic nodes of the communally-controlled and automatically repeatedly updated topic space.

2. A machine-assisted process of obtaining one or more answers to posed questions, the process comprising:

submitting a question to a first social-topical networking system having a question processing program, wherein the first social-topical networking system is one that uses at least one processor and maintains in a memory thereof, a topic space populated by spatially and/or hierarchically organized topic nodes each having respective topic defining data logically associated therewith and wherein the maintained topic space is automatically repeatedly updated by the first social-topical networking system in terms of at least one of organization of the topic nodes within the topic space and the respective topic defining data that is logically associated with respective ones of the topic nodes;

interacting with the question processing program so as to converge on one or more of the topic nodes in the topic space of the first social-topical networking system, where the one or more converged on topic nodes are those whose respective topic or topics are well connected with a topic that the first social-topical networking system guesses as being intended by the posed question;

receiving from the system question processing program a list of Tipping Point Mavens or other consensus-wise elected experts who are logically linked by the first social-topical networking system to the converged upon one or more topic nodes and whose works of expertise match one or more of keywords, tags and/or URLs associated with the posed question;

picking a subset of the listed experts; and automatically forwarding the posed question to the selected subset of experts.

* * * * *